United States Patent
Yun

(10) Patent No.: US 11,657,783 B2
(45) Date of Patent: *May 23, 2023

(54) DISPLAY DEVICE AND OPERATING METHOD THEREOF

(71) Applicant: LG ELECTRONICS INC., Seoul (KR)

(72) Inventor: Jaesun Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,321

(22) Filed: Sep. 28, 2021

(65) Prior Publication Data

US 2022/0013086 A1 Jan. 13, 2022

Related U.S. Application Data

(63) Continuation of application No. 15/687,037, filed on Aug. 25, 2017, now Pat. No. 11,164,544.

(30) Foreign Application Priority Data

May 23, 2017 (KR) .................. 10-2017-0063604

(51) Int. Cl.
*G09G 5/14* (2006.01)
*H04N 21/431* (2011.01)
(Continued)

(52) U.S. Cl.
CPC ............. *G09G 5/14* (2013.01); *G06F 1/1647* (2013.01); *G06F 1/1652* (2013.01);
(Continued)

(58) Field of Classification Search
CPC .................. G09G 5/14; G09G 2320/10; G09G 2340/0407; G09G 5/005; G09G 5/391;
(Continued)

(56) References Cited

U.S. PATENT DOCUMENTS 9,778,835 B2 10/2017 Lee
9,860,474 B2 1/2018 Park et al.
(Continued)

FOREIGN PATENT DOCUMENTS

EP 3 136 223 A1 3/2017
KR 10-2012-0058050 A 6/2012
(Continued)

OTHER PUBLICATIONS

Iridian Office Action dated Jun. 12, 2021 issued in corresponding application No. 201937044867.

*Primary Examiner* — Phi Hoang
*Assistant Examiner* — Scott E Sonners
(74) *Attorney, Agent, or Firm* — Birch, Stewart, Kolasch & Birch, LLP

(57) ABSTRACT

A display device including a housing; a display unit accommodated in the housing; and a control unit configured to cause the display unit to operate in a speaker mode to play a song while the display unit is fully inserted in the housing, receive an image display command, according to the image display command, withdraw the display unit and display a first content corresponding to the image display command in a first region of the display unit, and display a second content of an audio controller for controlling the speaker mode in a second region of the display unit.

11 Claims, 61 Drawing Sheets

(51) Int. Cl.
*G09F 9/30* (2006.01)
*G06F 1/16* (2006.01)
*G06F 3/16* (2006.01)
*H04N 5/64* (2006.01)
*G06F 3/0482* (2013.01)
*G06F 3/04847* (2022.01)

(52) U.S. Cl.
CPC ............ *G06F 1/1654* (2013.01); *G06F 3/167* (2013.01); *G09F 9/301* (2013.01); *H04N 21/431* (2013.01); *G06F 3/0482* (2013.01); *G06F 3/04847* (2013.01); *G06F 2203/04803* (2013.01); *G09G 2320/0606* (2013.01); *G09G 2340/0442* (2013.01); *G09G 2354/00* (2013.01); *G09G 2380/02* (2013.01); *H04N 5/64* (2013.01)

(58) Field of Classification Search
CPC ..... G09G 2340/0442; G09G 2340/045; G09G 2340/14; G09G 2354/00; G09G 5/38; H04N 21/43615; H04N 21/4532; H04N 21/4122; H04N 21/4312; H04N 21/47202; H04N 21/482; H04N 5/445; H04N 21/4316; H04N 21/4622; G06F 2203/04803; G06F 3/048; G06F 3/0482; G06F 3/14; G06F 17/30017; G06F 2203/04806
See application file for complete search history.

(56) References Cited

U.S. PATENT DOCUMENTS

| | | |
|---|---|---|
| 10,216,398 B2 | 2/2019 | Woo et al. |
| 2013/0127918 A1 | 5/2013 | Kang et al. |
| 2013/0271661 A1 | 10/2013 | Kimura et al. |
| 2013/0305184 A1 | 11/2013 | Kim et al. |
| 2014/0180537 A1* | 6/2014 | Ng ........................ G06T 13/00 345/173 |
| 2014/0359493 A1 | 12/2014 | Hong et al. |
| 2015/0153777 A1 | 6/2015 | Liu et al. |
| 2015/0195620 A1 | 7/2015 | Buchner et al. |
| 2016/0112667 A1 | 4/2016 | Park et al. |
| 2016/0306534 A1 | 10/2016 | Woo et al. |
| 2017/0061932 A1 | 3/2017 | Kwon et al. |
| 2017/0103735 A1 | 4/2017 | Oh et al. |
| 2020/0076940 A1 | 3/2020 | Kim et al. |

FOREIGN PATENT DOCUMENTS

| | | |
|---|---|---|
| KR | 10-2013-0056674 A | 5/2013 |
| KR | 10-2014-0144029 A | 12/2014 |
| KR | 10-1510717 B1 | 4/2015 |
| KR | 10-2016-0123620 A | 10/2016 |
| KR | 10-2016-0136174 A | 11/2016 |

* cited by examiner

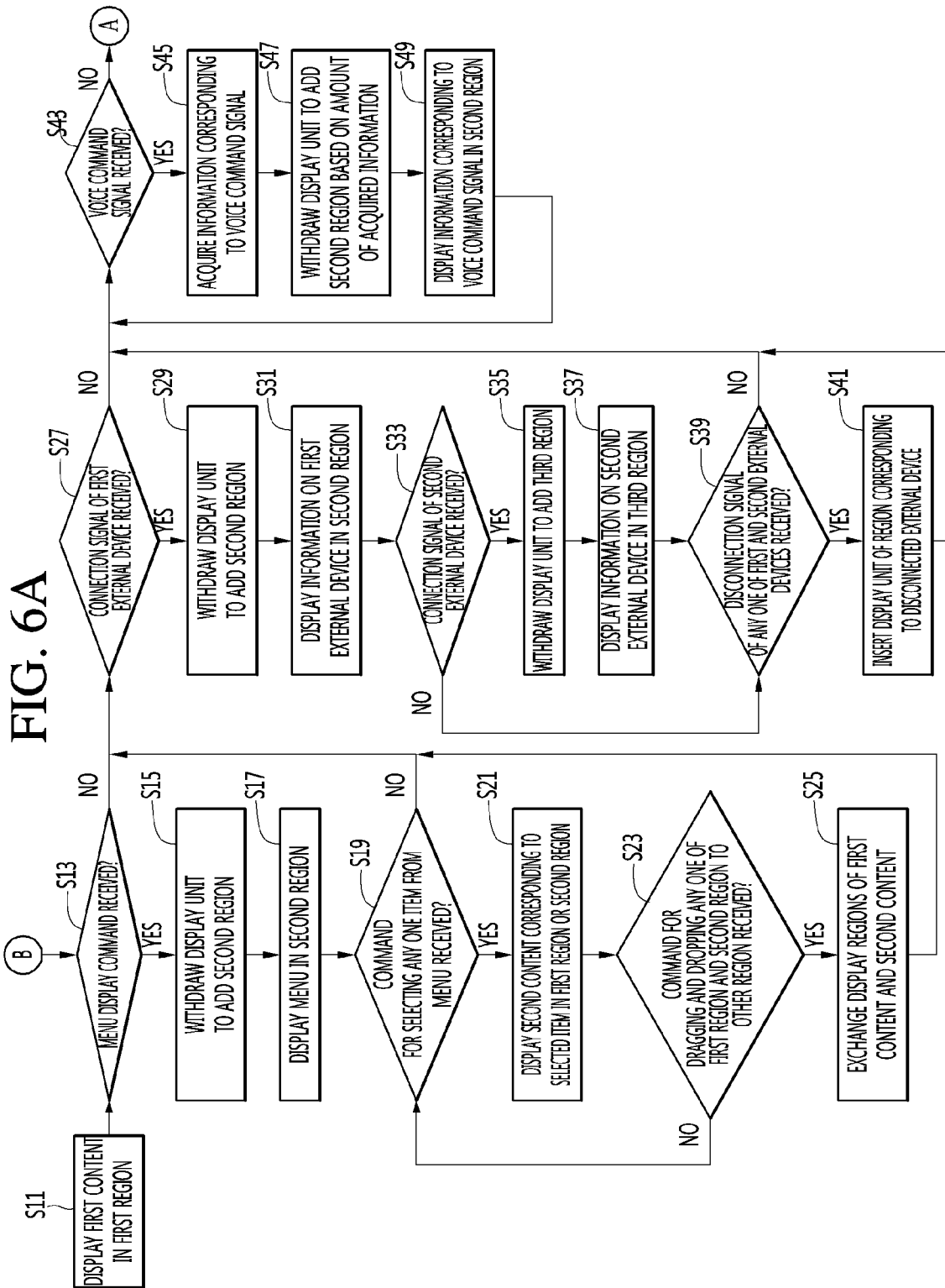

DISPLAY DEVICE AND OPERATING METHOD THEREOF

CROSS-REFERENCE TO RELATED APPLICATIONS

This application is a Continuation of U.S. application Ser. No. 15/687,037, filed Aug. 25, 2017, which claims the benefits of priority to Korean Patent Application No. 10-2017-0063604 filed on May 23, 2017, which are herein incorporated by reference in their entirety.

FIELD

The present invention relates to a display device and, more particularly, to a display device including a flexible display.

BACKGROUND

A display device has a function for receiving, processing and displaying an image viewable by a user. The display device receives a broadcast signal selected by a user from among broadcast signals transmitted by a broadcaster, divides a video signal from the received signal, and displays the divided video signal on a display.

Recently, with development of broadcast technology and network technology, various functions have been added to the display device and performance of the device has been improved. That is, the display device has been developed to provide a variety of content to a user in addition to broadcast content. For example, the display device can provide game playing, music, Internet shopping, customized information, etc. using various applications as well as programs received from a broadcaster. In order to perform such functions, the display device may be connected to other devices or a network using various communication protocols to provide ubiquitous computing to the user. That is, the display device has evolved into a smart device enabling connectivity to a network and ubiquitous computing.

Recently, a flexible display having sufficient elasticity has been developed. Such a flexible display can be rolled into the main body of a display device. The display device includes such a flexible display. Further, the display device may include a rollable display unit having an outwardly protruding area changed by winding or unwinding the display in a direction guided by a guide bar. By using the rollable display unit, the display device can have a more compact structure.

SUMMARY

An object of the present invention is to provide a display device for providing a convenient user experience and user interface to a user using the properties of a rollable display unit, and a method of operating the same.

According to an embodiment of the present invention, a display device including a housing, a rotatable guide bar accommodated in the housing, a display unit withdrawn from or inserted into the housing according to rotation of the guide bar, and a controller configured to display first content in a first region withdrawn from the housing, to withdraw the display unit to add a second region if a second-content display command is received, and to display second content in the second region.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 6A and 6B are flowcharts illustrating a method of operating a display device according to an embodiment of the present invention.

DETAILED DESCRIPTION OF THE PREFERRED EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

The display device described in this specification refers to a TV, a smart TV, a network TV, a hybrid broadcast broadband television (HBBTV), an Internet TV, a web TV, an Internet protocol television (IPTV), digital signage, a desktop computer, a smartphone, a laptop computer, a digital broadcast terminal, a personal digital assistant (PDA), a portable multimedia player (PMP), a navigation system, a slate PC, a tablet PC, an ultrabook, a wearable device, etc. including a rollable display unit. Here, rollable display unit means that a display unit may be rolled in the form of a roll and may include a flexible display, a foldable display, etc.

Figure 1:
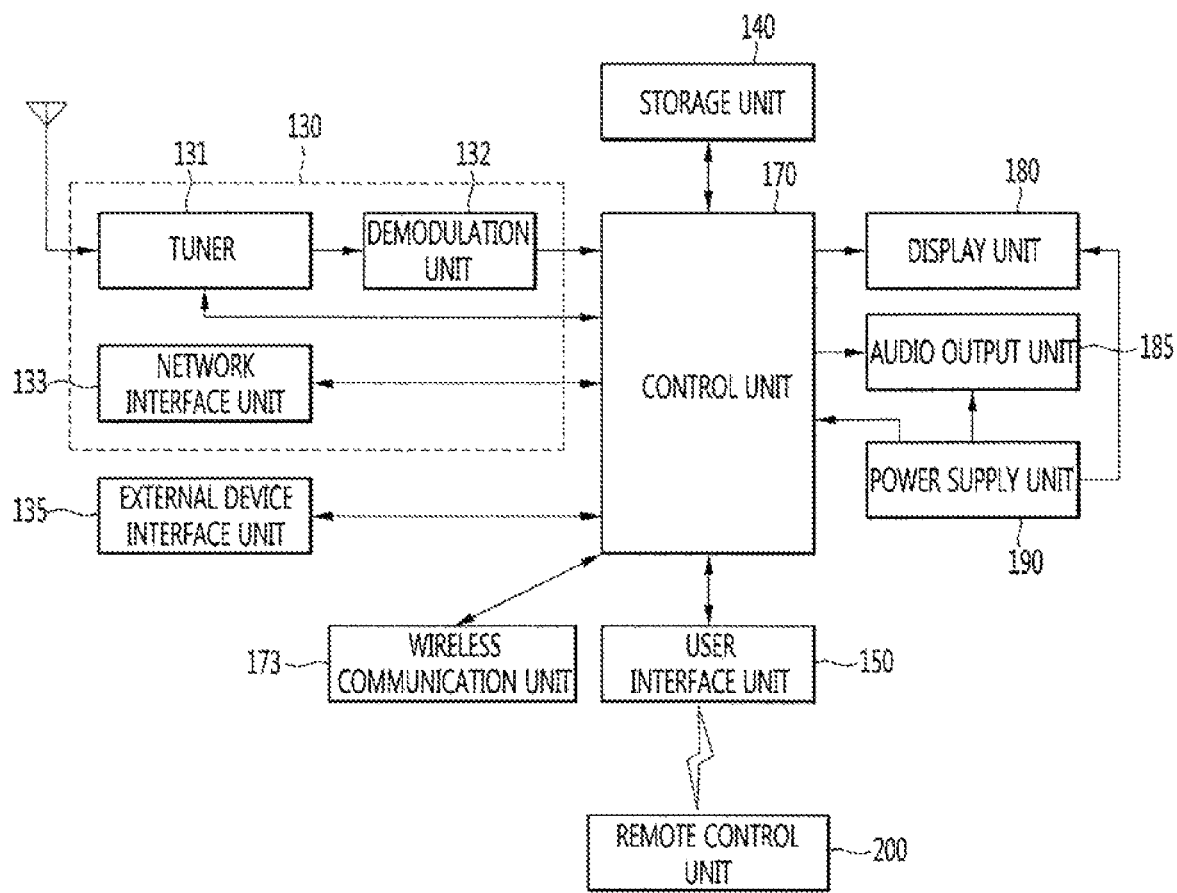
FIG. 1 is a block diagram illustrating the configuration of a display device according to an embodiment of the present invention.

FIG. 1 is a block diagram illustrating a configuration of a display device according to an embodiment of the present invention. Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133. The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form. The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100. The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto. Additionally, the network interface unit 133 can receive firmware update information and update files provided from a network operator and transmit data to an internet or content provider or a network operator. The network interface unit 133 can select and receive a desired application among applications open to the air, through network.

The external device interface unit 135 can receive an application or an application list in an adjacent external device and deliver it to the control unit 170 or the storage unit 140. The external device interface unit 135 can provide a connection path between the display device 100 and an external device. In addition, the external device interface 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185. An external device connectable to the external device interface unit 130 can be one of a set-top box, a Blu-ray player, a DVD player, a game console, a sound bar, a smartphone, a PC, a USB Memory, and a home theater system but this is just exemplary.

The storage unit 140 can store signal-processed image, voice, or data signals stored by a program in order for each signal processing and control in the control unit 170. Additionally, the storage unit 140 can perform a function for temporarily store image, voice, or data signals output from the external device interface unit 135 or the network interface unit 133 and can store information on a predetermined image through a channel memory function. The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user. The user input interface unit 150 can deliver signals input from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals input from local keys such as a power key, a channel key, a volume key, and a setting key. Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135. Further, the control module 170 can control overall operations in the display device 100.

Additionally, the control unit 170 can control the display device 100 by a user command or internal program input through the user input interface unit 150 and download a desired application or application list into the display device 100 in access to network. The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this instance, an image displayed on the display unit 180 can be a still image or video and also can be a 2D image or a 3D image.

Also, the control unit 170 can play content stored in the display device 100, received broadcast content, and external input content input from the outside, and the content can be in various formats such as broadcast images, external input images, audio files, still images, accessed web screens, and document files.

Further, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device. The wireless communication unit 173 can be provided separated from the external device interface unit 135 and can be included in the external device interface unit 135.

The display unit 180 can convert image signals, data signals, or OSD signals, which are processed in the control unit 170, or images signals or data signals, which are received in the external device interface unit 135, into R, G, and B signals to generate driving signals. The display unit 180 may include a rollable display unit.

The rollable display unit may mean that a display unit for displaying content may be inserted to be wound on a guide bar or may be withdrawn to be unwound from the guide bar. The display device 100 may include the rollable display unit. A region, in which content is displayed, may increase or decrease according to withdrawal or insertion of the rollable display unit. The below-described display unit 180 may include the rollable display unit.

Furthermore, the display device 100 shown in FIG. 1 is just one embodiment of the present invention and thus, some of the components shown can be integrated, added, or omitted according to the specification of the actually implemented display device 100. That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132. For example, the display device 100 can be divided into an image processing device such as a set-top box for receiving broadcast signals or contents according to various network services and a content playback device for playing contents input from the image processing device.

In this instance, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
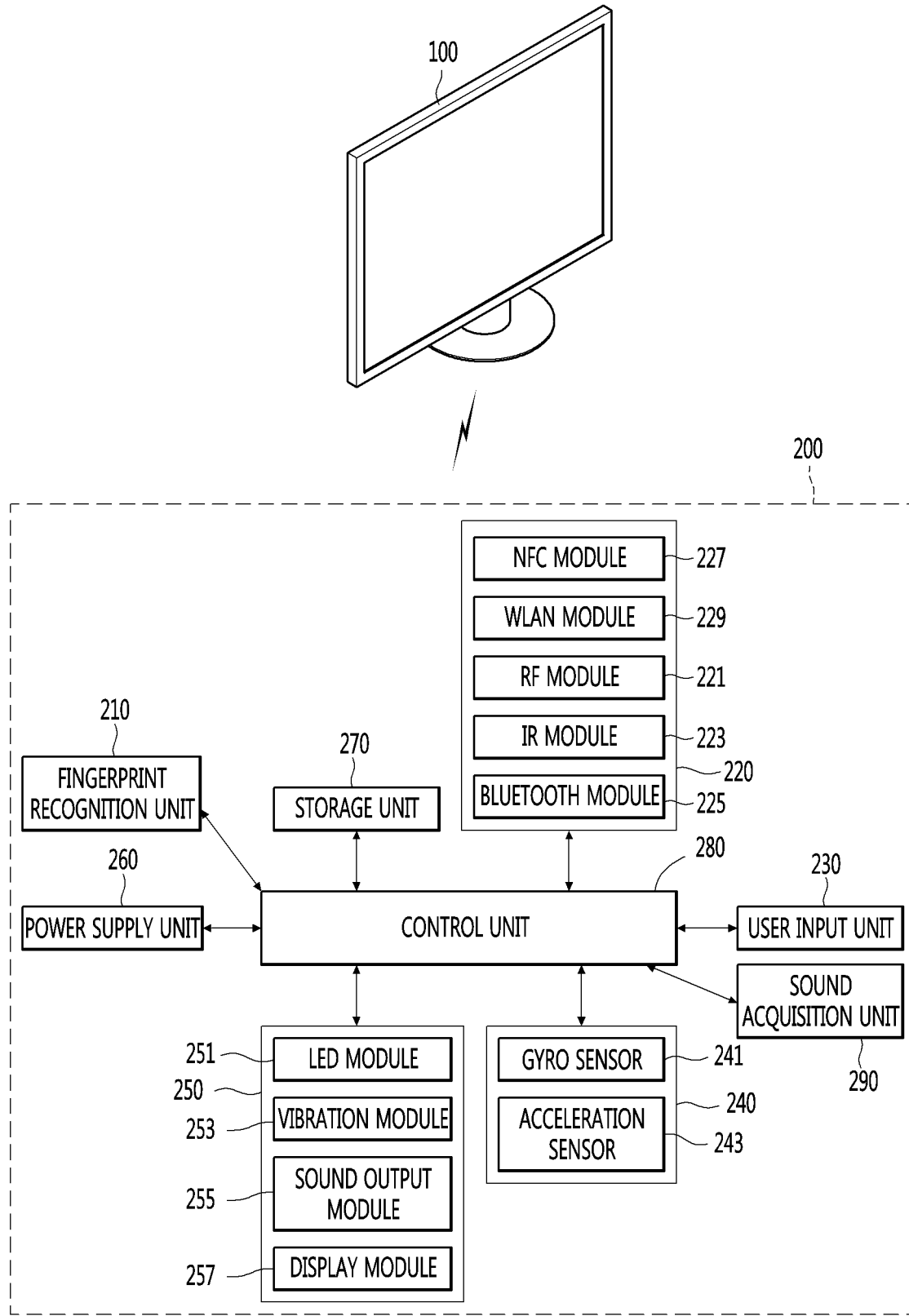
FIG. 2 is a block diagram illustrating a remote control device according to an embodiment of the present invention.
Figure 3:
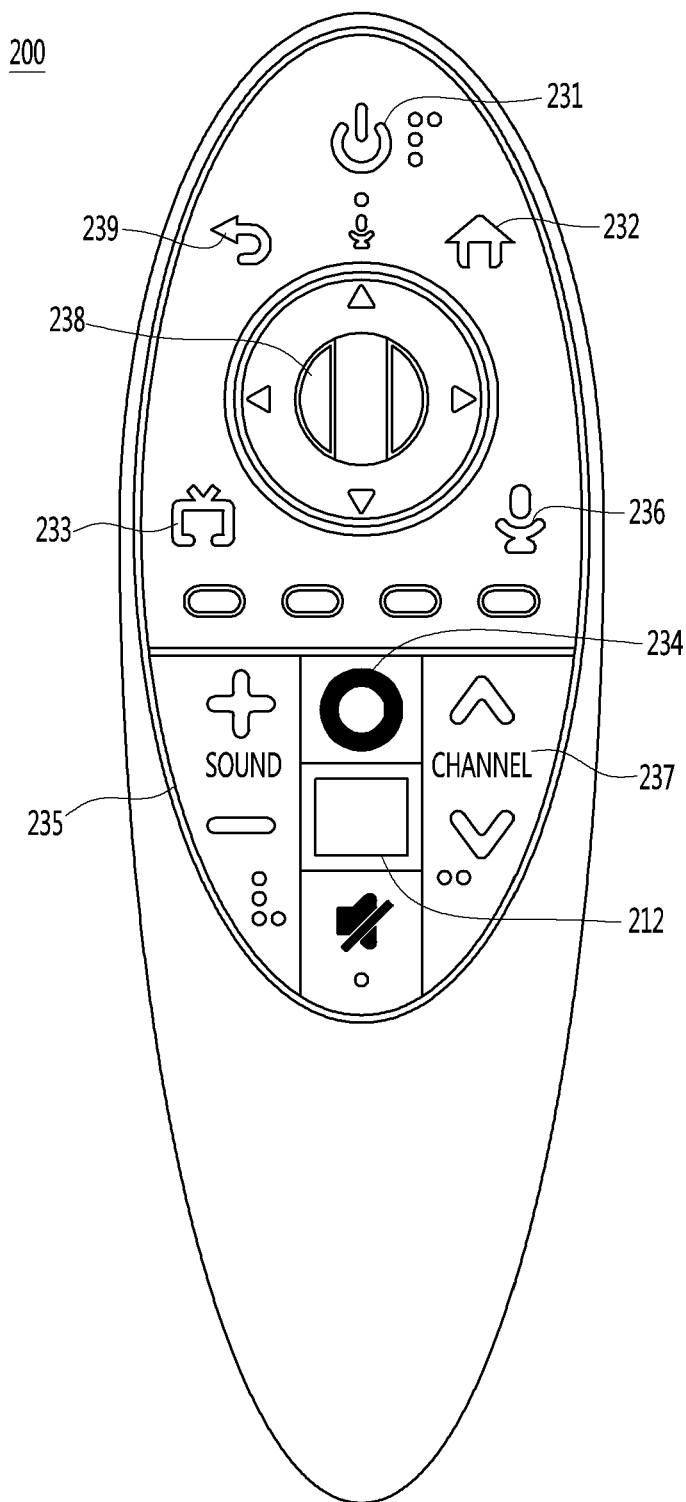
FIG. 3 is a view illustrating an actual configuration of a remote control device according to an embodiment of the present invention.

Next, referring to FIGS. 2 and 3, a remote control device is described according to an embodiment of the present invention. FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290. As shown in FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220. Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described. If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200. For example, the gyro sensor 241 can sense information on an operation of the remote control device 200 based on x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250. For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it. The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice. The voice acquisition unit 290 can include at least one microphone 291 and obtain voice through the microphone 291.

Figure 4:
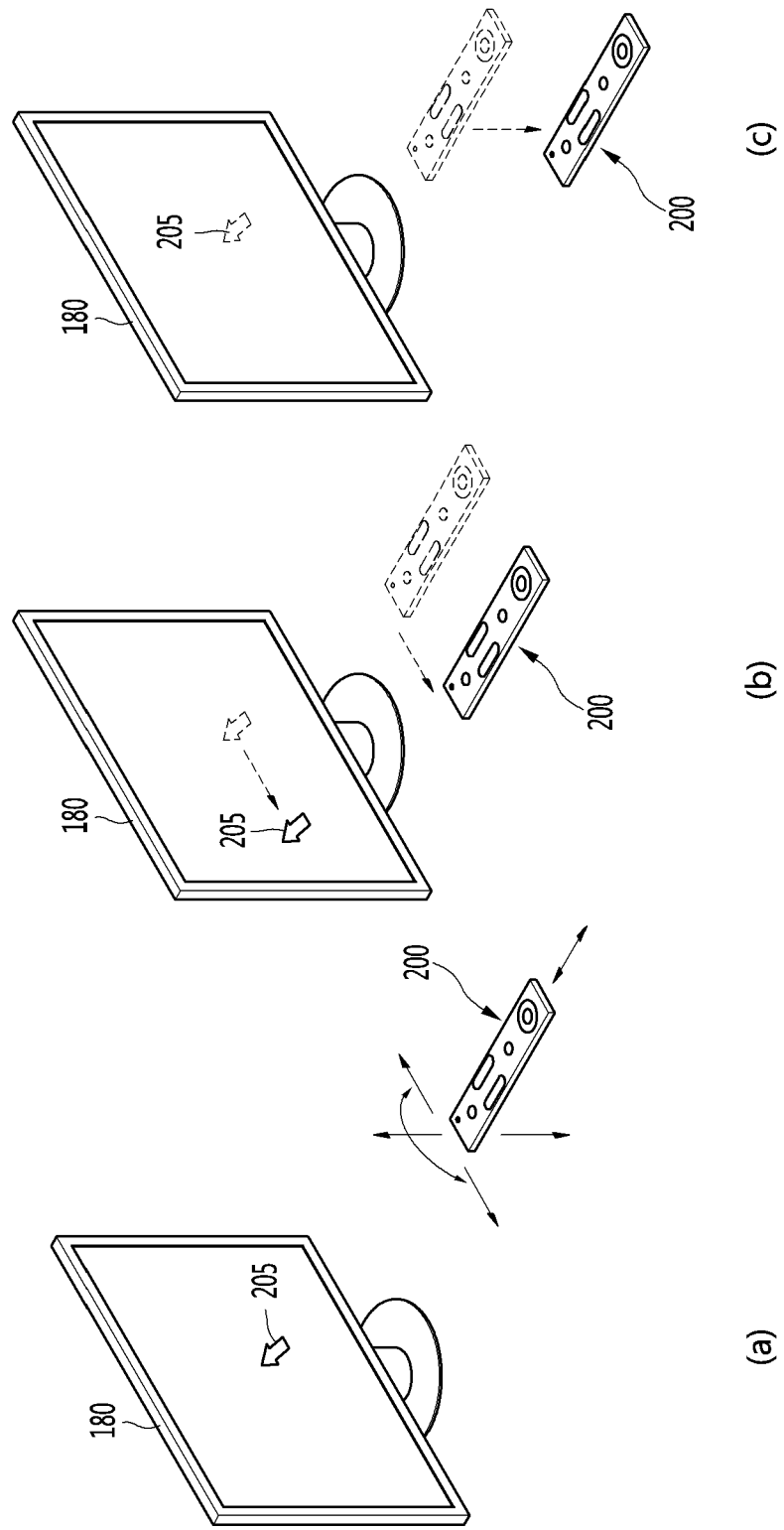
FIG. 4 is a view showing an example of utilizing a remote control device according to an embodiment of the present invention.

Next, FIG. 4 is described. FIG. 4 is a view of utilizing a remote control device according to an embodiment of the present invention. In particular, FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(*b*) illustrates that if a user moves the remote control device 200, the pointer 205 displayed on the display unit 180 of the display device 100 is moved to the left in correspondence thereto. Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed largely. Further, if a user moves the remote control device 200 close to the display unit 180, a selection area in the display unit 180 corresponding to the pointer 205 can be zoomed out and displayed reduced.

If the remote control device 200 is away from the display unit 180, a selection area can be zoomed out and if the remote control device 200 is close to the display unit 180, a selection area can be zoomed in. Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200. Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, the method of operating the display unit 180 according to the embodiment of the present invention will be described with reference to FIGS. 5A to 5F. In particular, FIGS. 5A to 5F are views illustrating a method of operating a display unit according to an embodiment of the present invention.

Figure 5A:
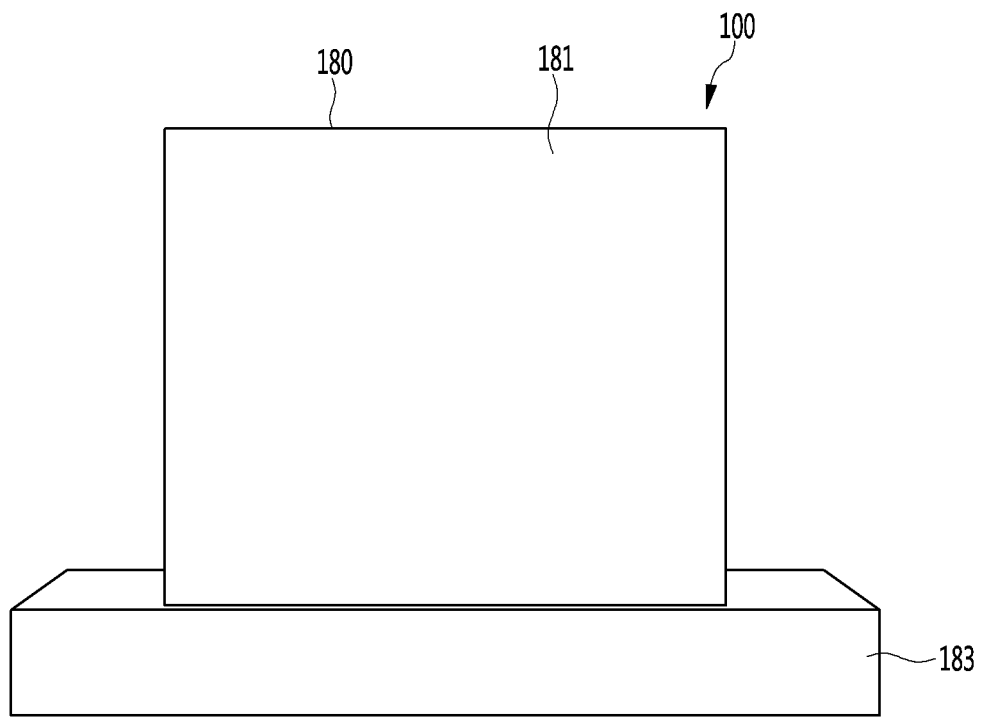
FIGS. 5A to 5F are views illustrating a method of operating a display unit according to an embodiment of the present invention.

As shown in FIG. 5A, the display device 100 may include a display unit 180 having a first region 181. The display unit 180 may display content in the first region 181. The display device 100 may include a guide bar 184 (see FIG. 5B) which may rotate such that the display unit 180 is wound into or unwound from a housing 183 or at the center of the display unit 180.

When the display device 100 includes the guide bar 184 in the housing 183, the display unit 180 can be wound or unwound in a vertical direction. If the display device 100 includes the guide bar 184 at the center of the display unit 180, the display unit 180 can be wound or unwound in a horizontal direction.

Figure 5B:
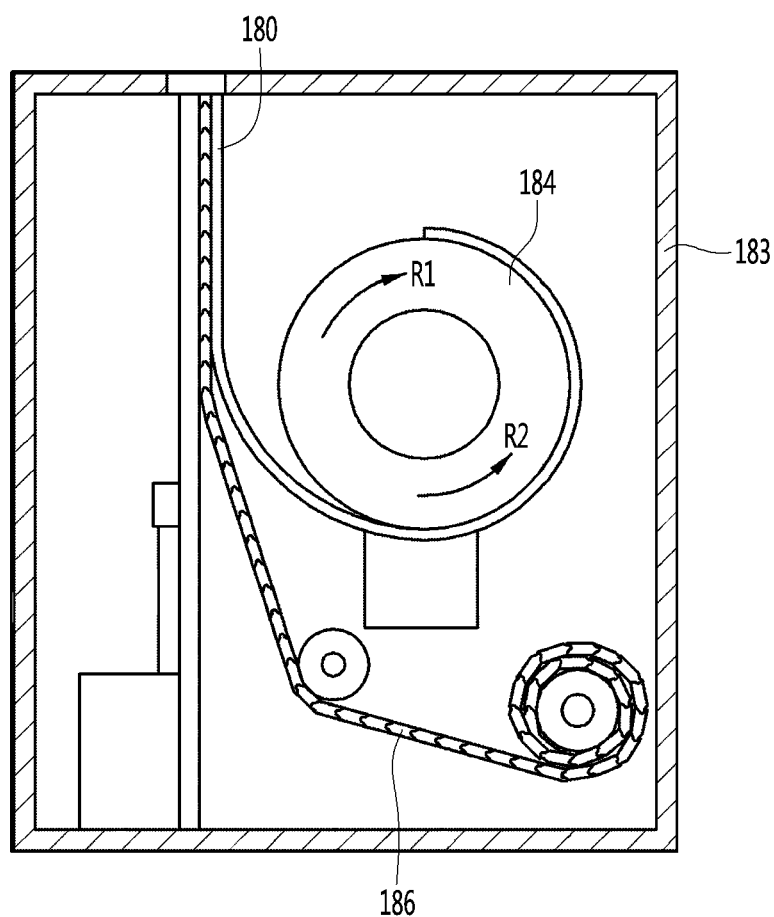

Referring to FIG. 5B, when the display unit is wound or unwound by the guide bar according to the embodiment of the present invention will be described. FIG. 5B is a side cross-sectional view of the housing 183 shown in FIG. 5A. As shown in FIG. 5B, the housing 183 may include the guide bar 184 for guiding the display unit 180 to be wound or unwound. When the guide bar 184 rotates in an R1 direction, the display unit 180 can be withdrawn from the housing 183. In contrast, when the guide bar 18 rotates in an R2 direction, the display unit 180 can be inserted into the housing 183 while being wound on the guide bar 184. Therefore, the display unit 180 can be withdrawn or inserted in the vertical direction.

A cover 186 can protect the display unit 180 inserted into the housing 183. If the guide bar is located at the center of the display unit 180, the display unit 180 can be withdrawn or inserted in the horizontal direction according to the principle shown in FIG. 5B. As the display unit 180 is withdrawn or inserted, a region capable of displaying content can be changed, that is, increased or decreased.

Hereinafter, when, as the display unit is wound or unwound, a content display region is changed will be described with reference to FIGS. 5B to 5F. In the state shown in FIG. 5A, the display unit 180 can be withdrawn to have second regions 182 as shown in FIGS. 5C to 5F.

Figure 5C:
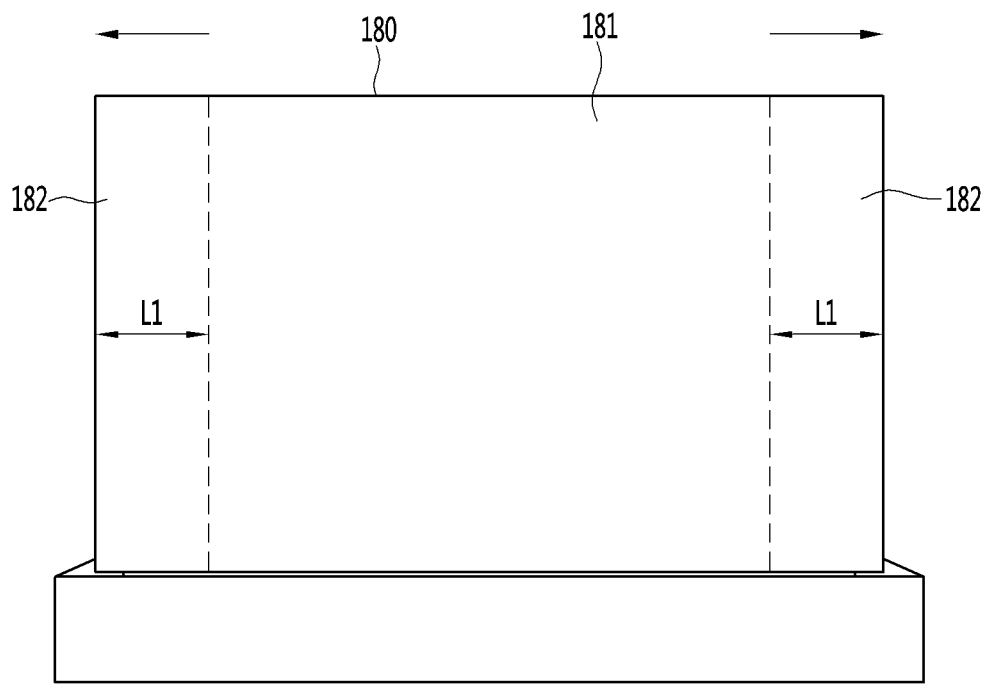

Referring to FIG. 5C, the display unit 180 according to a first embodiment of the present invention can be withdrawn in left and right directions. The display unit 180 may include a first region 181 and second regions 182 located at both sides of the first region 181.

Figure 5D:
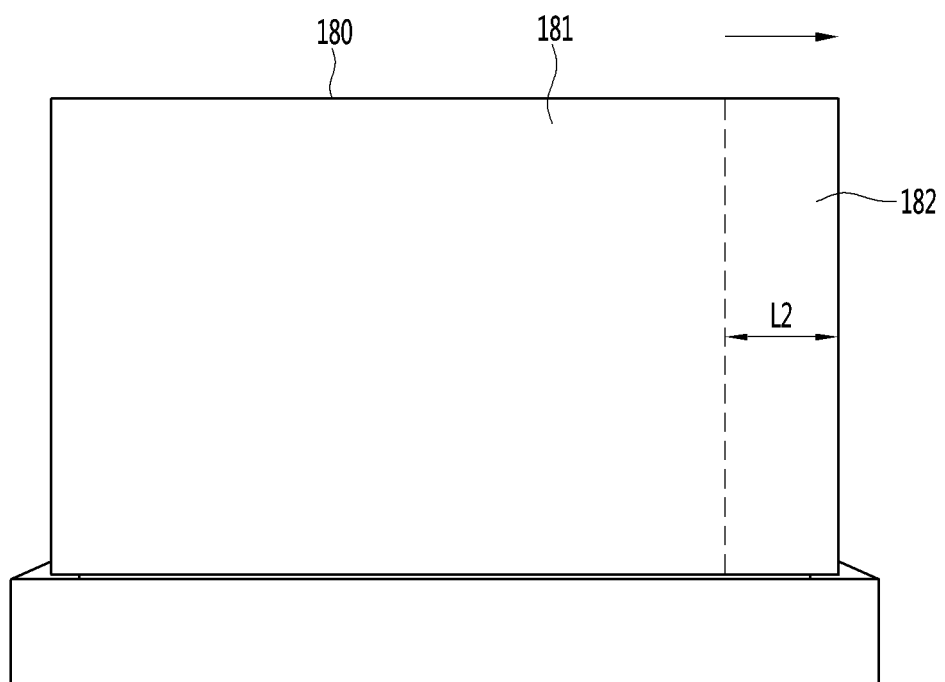
Figure 5E:
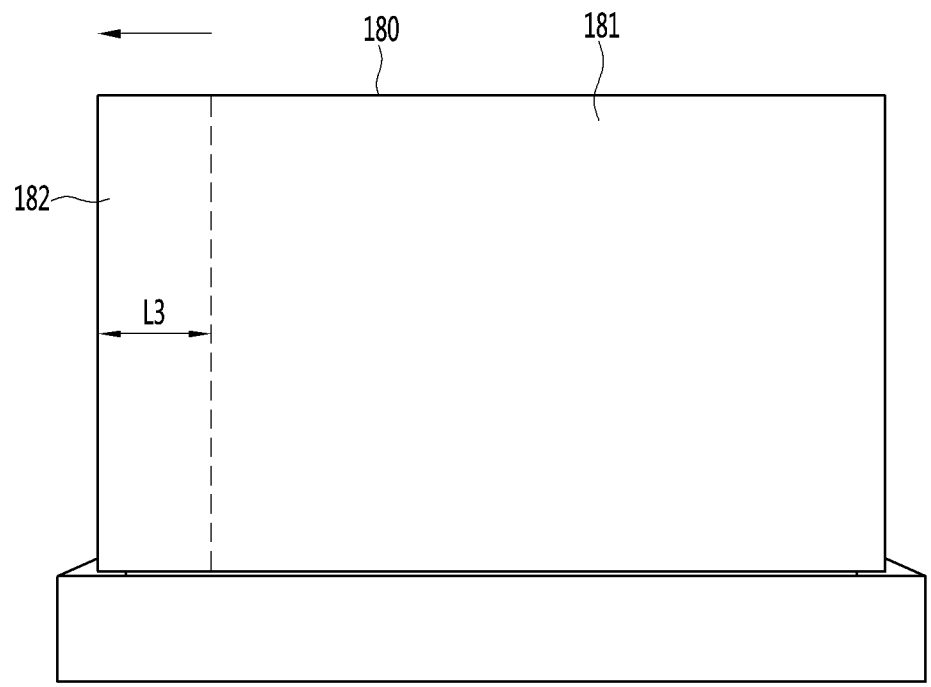

Referring to FIG. 5D, the display unit 180 according to a second embodiment of the present invention can be withdrawn only in a right direction. The display unit 180 may include a first region 181 and a second region 182 located at the right side of the first region 181. Referring to FIG. 5E, the display unit 180 according to a third embodiment of the present invention can be withdrawn only in a left direction. The display unit 180 may include a first region 181 and a second region 182 located at a left side of the first region 181.

Figure 5F:
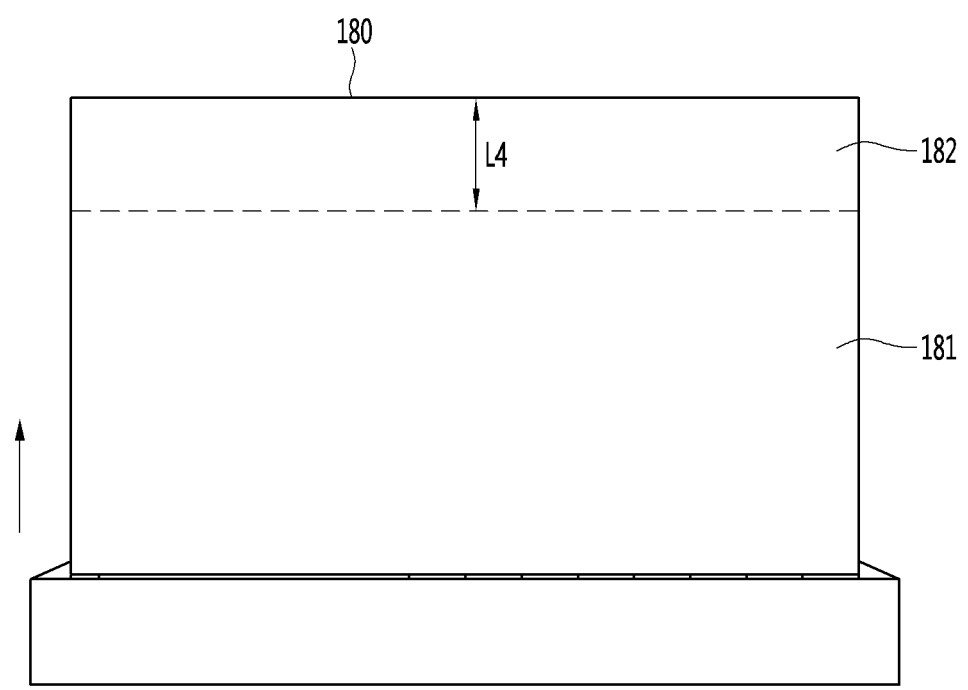

Referring to FIG. 5F, the display unit 180 according to a fourth embodiment of the present invention can be withdrawn only in an upper direction. The display unit 180 may include a first region 181 and a second region 182 located at an upper side of the first region 181. As shown in FIG. 5F, the second region 182 may be located at the upper side of the first region 181. Unlike FIG. 5F, the second region 182 may be located at a lower side of the first region 181.

The size of the second region 182 can be determined by withdrawal lengths L1, L2, L3 and L4 of the display unit 180. The withdrawal lengths L1, L2, L3 and L4 of the display unit 180 may be changed. That is, the controller 170 can adjust the withdrawal lengths L1, L2, L3 and L4 according to attributes of content to be displayed, a length adjustment command of a user, etc. to withdraw the display unit 180.

In addition, the withdrawal direction of the display unit 180 may be determined according to attributes of the display device 100 or a user input command. Further, the display unit 180 can display different content or the same content in the first region 181 and the second region 182.

Figure 6B:
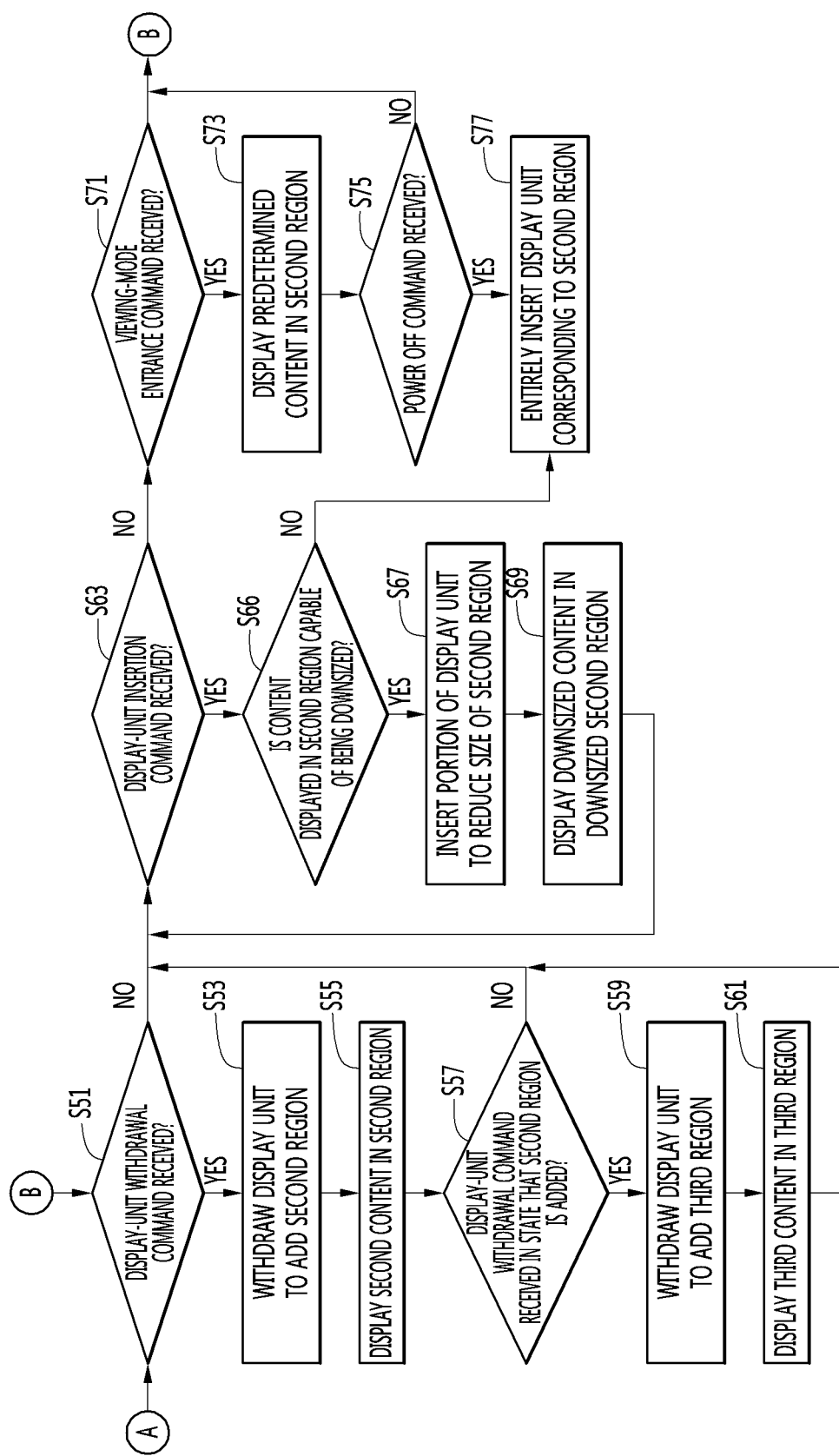

Next, a method of operating a display device 100 according to an embodiment of the present invention will be described with reference to FIGS. 6A and 6B. In particular, FIGS. 6A to 6B are flowcharts illustrating a method of operating a display device according to an embodiment of the present invention.

The display unit 180 can display first content in the first region 181 (S11). The display unit 180 may have only the first region 181 by default. That is, the display device 100 may include only the first region 181 before receiving a specific command. Content corresponding to a broadcast signal received through the broadcast reception unit 130 can be displayed in the first region 181.

The controller 170 can sense whether a menu display command is received (S13). Here, the menu is second content and the menu display command may be a second content display command. The controller 170 can receive the menu display command through a button provided in the remote control device 200 or a button provided in the display device 100. The controller 170 can sense whether the menu display command is received and can withdraw the display unit to add the second region 182 (S15) when the menu display command is received, and the display unit 180 can display the menu in the withdrawn second region 182 (S17).

Next, a method of displaying a menu in a region of a display device withdrawn in a longitudinal direction according to various embodiments of the present invention will be described with reference to FIGS. 7A to 7D, a method of displaying a menu in a region of a display device withdrawn in a height direction according to a first embodiment of the present invention will be described with reference to FIGS. 8A to 8C, and a method of displaying a menu in a region of a display device withdrawn in a height direction according to a second embodiment of the present invention will be described with reference to FIGS. 9A to 9C.

Figure 7A:
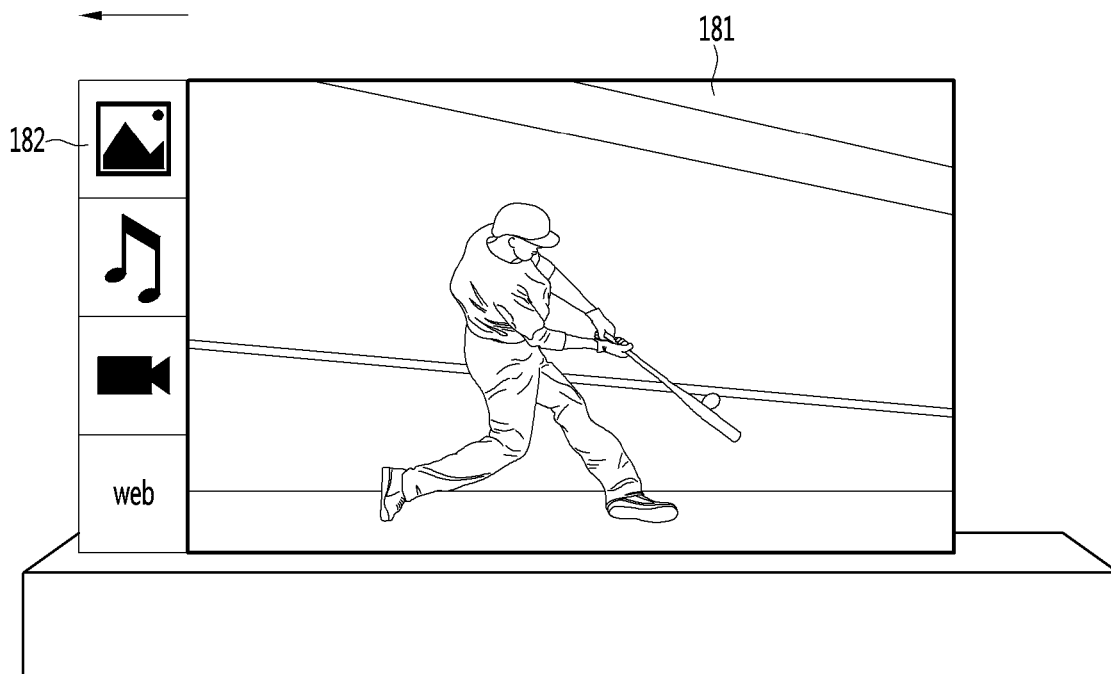
FIG. 7A is a diagram illustrating a method of displaying a menu in a region of a display device withdrawn in a longitudinal direction according to a first embodiment of the present invention.

FIG. 7A is a diagram illustrating a method of displaying a menu in a region of a display device withdrawn in a longitudinal direction according to a first embodiment of the present invention. Referring to FIG. 7A, the display unit 180 can be withdrawn in a left direction. The display unit 180 can include only the first region 181 before withdrawal and include the first region 181 and the second region 182 located at the left side of the first region 181 after withdrawal.

The display unit 180 can display first content in the first region 181 and display the menu in the second region 182. The location of the first region 181 may be the same before and after withdrawal. Accordingly, the first content can be continuously displayed at the same location regardless of withdrawal of the display unit 180.

Figure 7B:
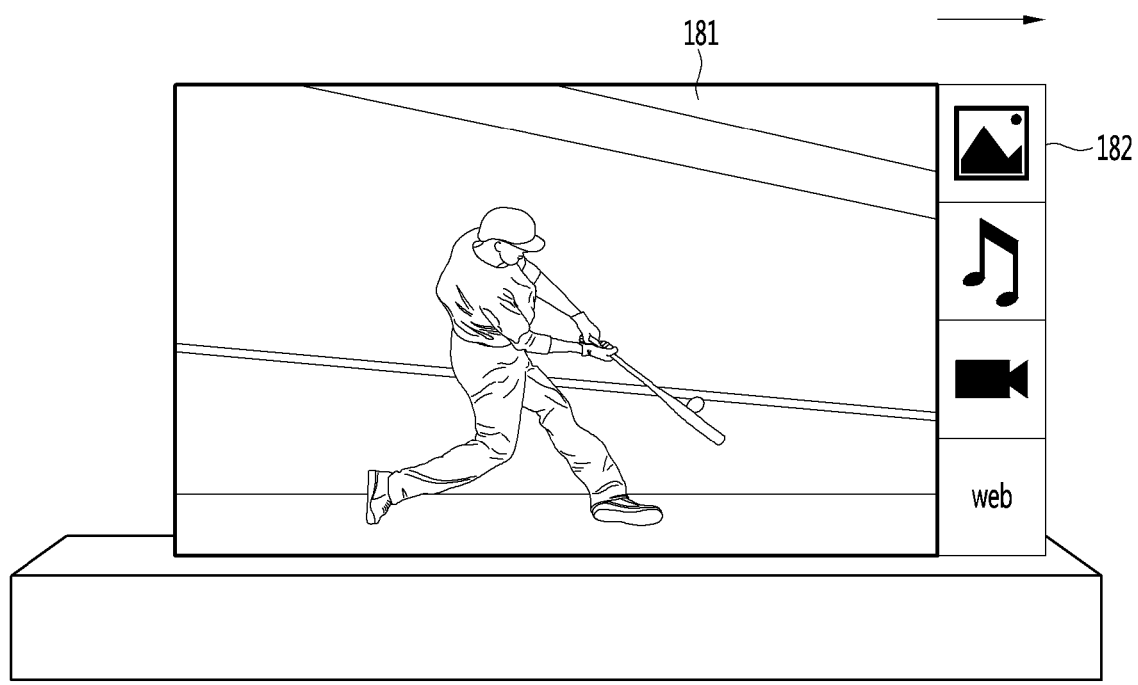
FIG. 7B is a diagram illustrating a method of displaying a menu in a region of a display device withdrawn in a longitudinal direction according to a second embodiment of the present invention.

Next, FIG. 7B is a diagram illustrating a method of displaying a menu in a region of a display device withdrawn in a longitudinal direction according to a second embodiment of the present invention. Referring to FIG. 7B, the display unit 180 can be withdrawn in a right direction. The display unit 180 can include only the first region 181 before withdrawal and include the first region 181 and the second region 182 located at the right side of the first region 181 after withdrawal. The display unit 180 can display first content in the first region 181 and display the menu in the second region 182.

Similarly to FIG. 7A, the location of the first region 181 may be the same before and after withdrawal. Accordingly, the first content can be continuously displayed at the same location regardless of withdrawal of the display unit 180.

Figure 7C:
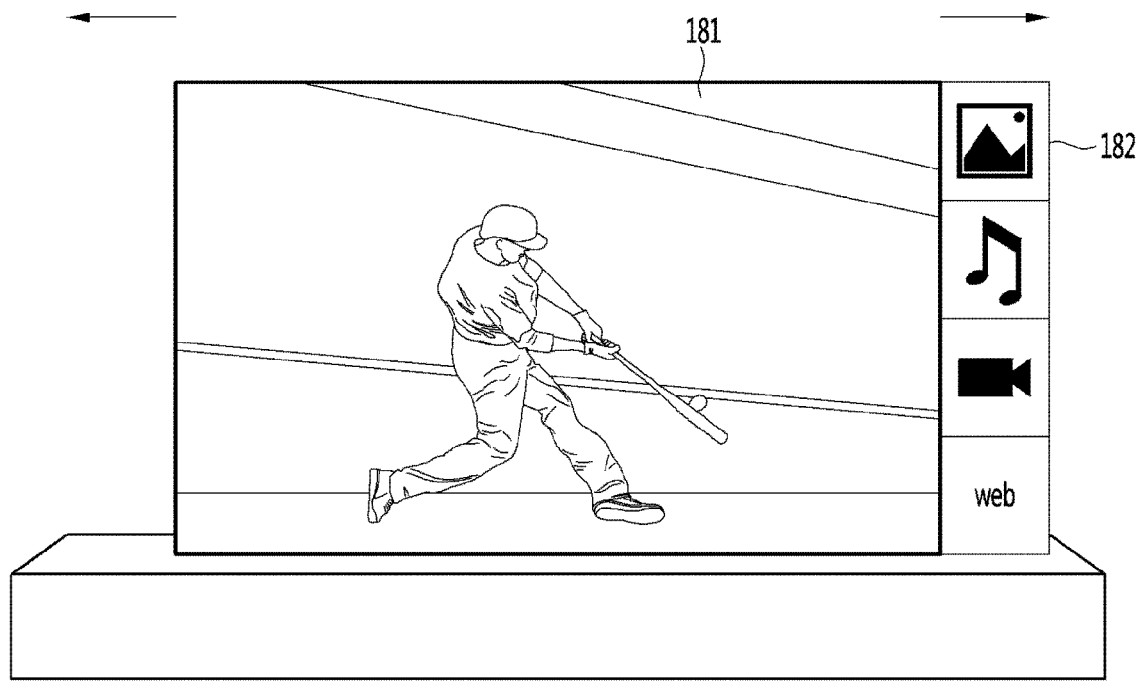
FIG. 7C is a diagram illustrating a method of displaying a menu in a region of a display device withdrawn in a longitudinal direction according to a third embodiment of the present invention.

FIG. 7C is a diagram illustrating a method of displaying a menu in a region of a display device withdrawn in a longitudinal direction according to a third embodiment of the present invention. Referring to FIG. 7C, the display unit 180 can be withdrawn in both directions.

The display unit 180 can include only the first region 181 before withdrawal and include the first region 181 and the second region 182 located at the right side of the first region 181 after withdrawal. Alternatively, unlike FIG. 7C, the display unit 180 can include the first region 181 and the second region 182 located at the left side of the first region 181. The display unit 180 can display first content in the first region 181 and display the menu in the second region 182.

The controller 170 can shift the first content such that the location of the first region 181 is the same before and after withdrawal. That is, the controller 170 can shift the first content while withdrawing the display unit 180. Thus, the first content can be continuously displayed at the same location regardless of withdrawal of the display unit 180, and the menu may be displayed in a region added by withdrawal of the display unit 180.

Figure 7D:
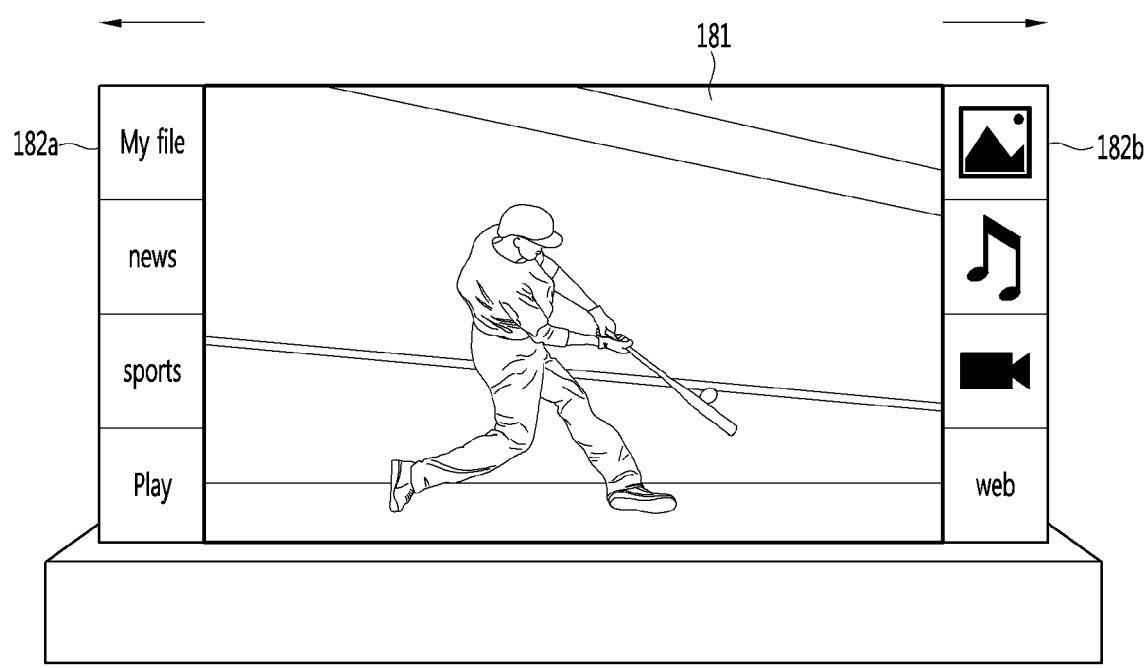
FIG. 7D is a diagram illustrating a method of displaying a menu in a region of a display device withdrawn in a longitudinal direction according to a fourth embodiment of the present invention.

FIG. 7D is a diagram illustrating a method of displaying a menu in a region of a display device withdrawn in a longitudinal direction according to a fourth embodiment of the present invention. Referring to FIG. 7D, the display unit 180 can be withdrawn in both directions.

The display unit 180 can include only the first region 181 before withdrawal and include the first region 181 and the second regions 182 located at both sides of the first region 181 after withdrawal. The second regions 182 may include a second left region 182*a* and a second right region 182*b*.

The display unit 180 can display first content in the first region 181 and display the menu in the second region 182. The second left region 182 and the second right region 182*b* may display different menus. The location of the first region 181 can be the same before and after withdrawal and thus the first content can be continuously displayed at the same location regardless of withdrawal of the display unit 180. The menu may be displayed in the second left region 182*a* and the second right region 182*b*.

In the embodiment shown in FIG. 7D, more information can be displayed in the second region 182 as compared to the embodiment shown in FIG. 7C. In addition, in the embodiments shown in FIGS. 7A to 7D, the display device 100 can display the menu so as not to hide the displayed content. That is, the display device 100 can provide a method of viewing and manipulating the menu while the user views the content without interruption.

Although the first content is shifted only in FIG. 7C, this is merely an example. That is, in the embodiments of FIGS. 7A, 7B and 7C and the subsequent embodiments, the controller 170 can shift the first content in order to fix the location of the first region 181.

Figure 8A:
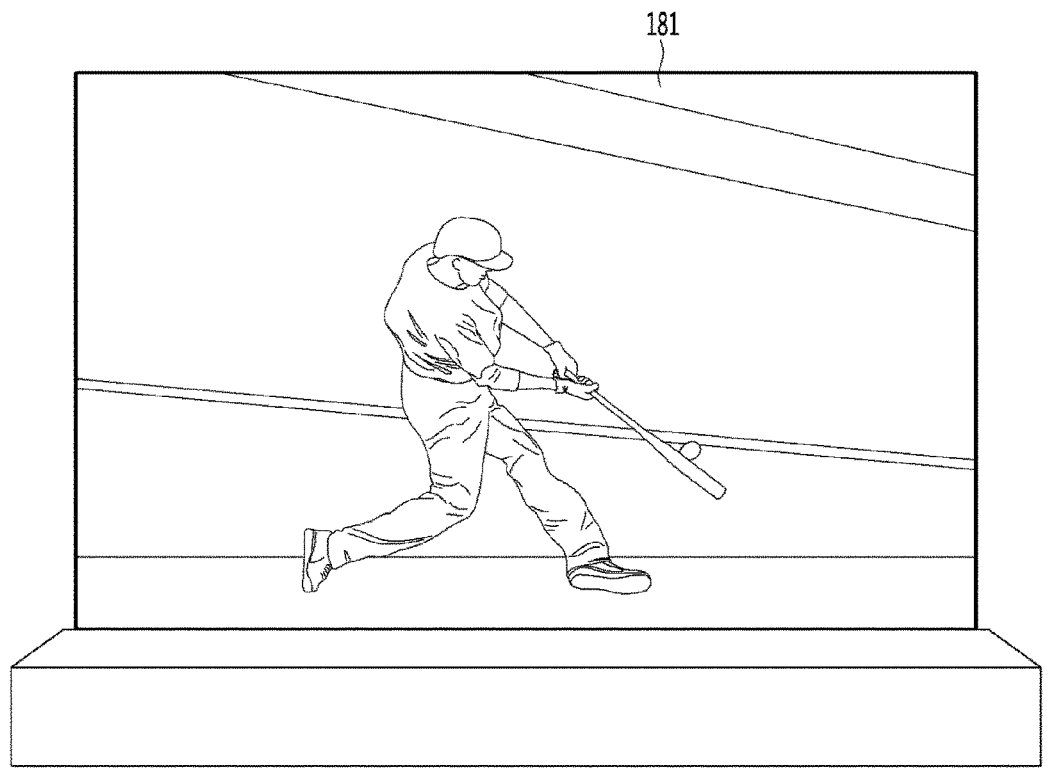
FIGS. 8A to 8C are diagrams illustrating a method of displaying a menu in a region of a display device withdrawn in a height direction according to a first embodiment of the present invention
Figure 8B:
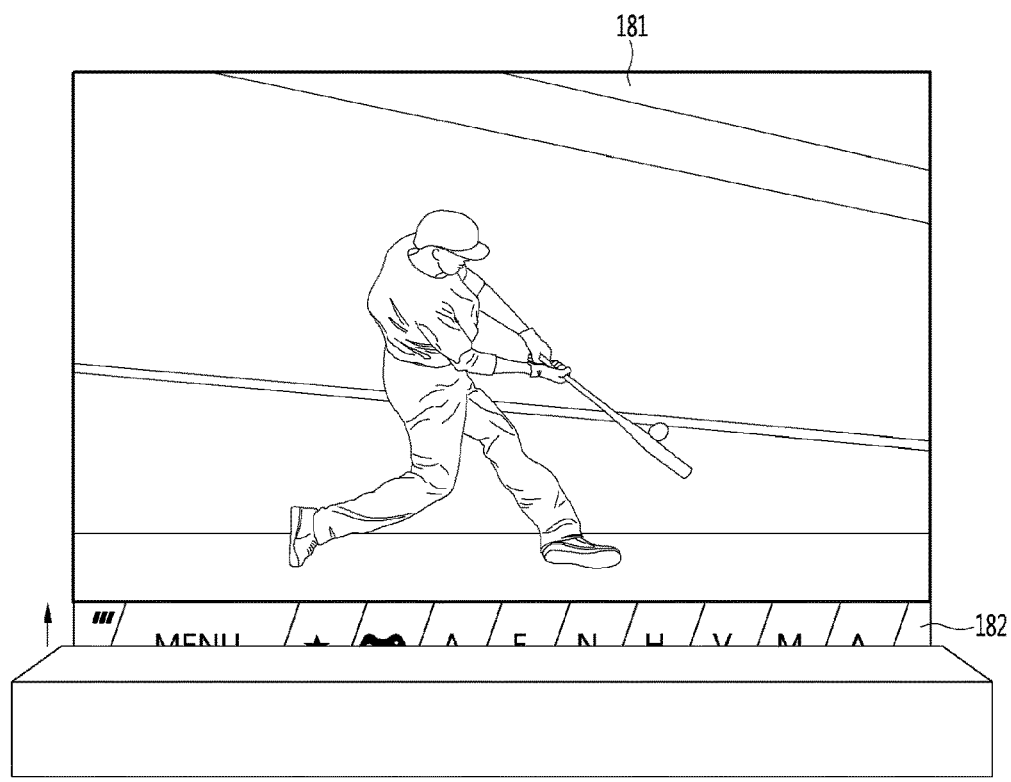
Figure 8C:
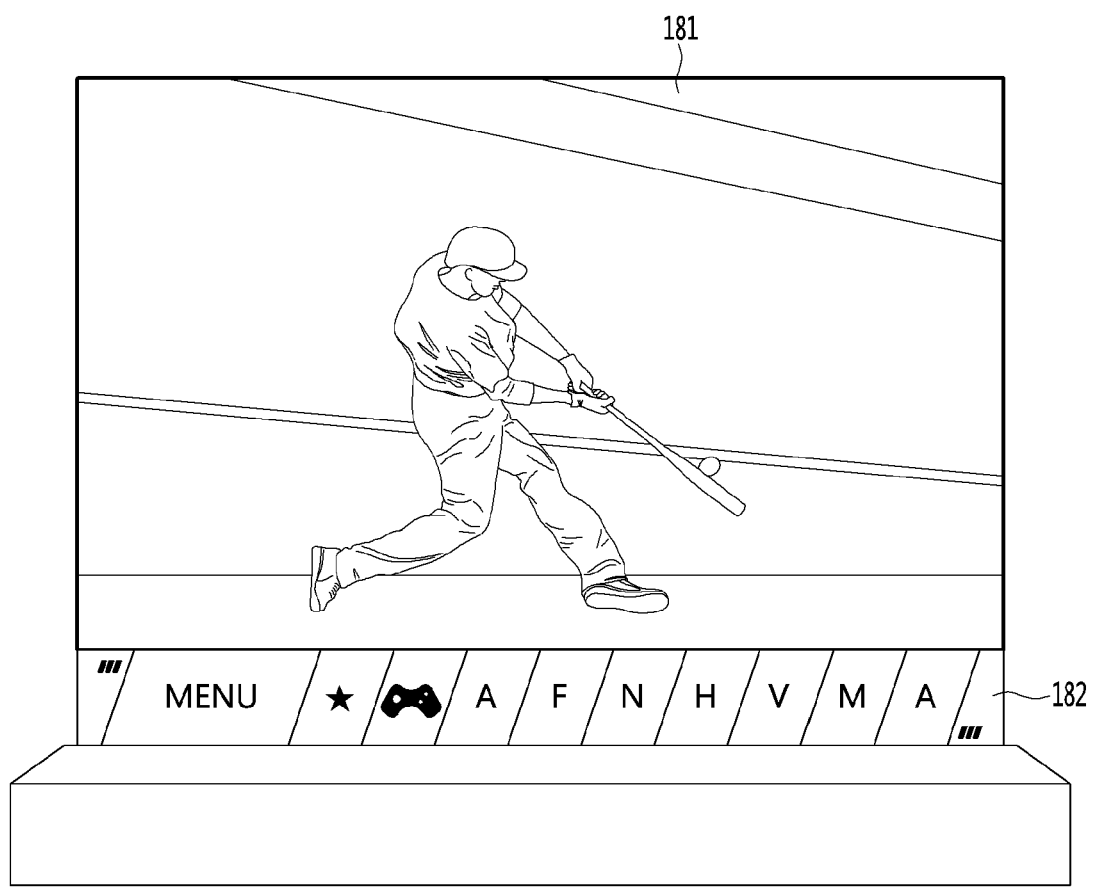

Next, FIGS. 8A to 8C are diagrams illustrating a method of displaying a menu in a region of a display unit withdrawn in a height direction according to a first embodiment of the present invention. As shown in FIG. 8A, the display unit 180 can include a first region 181 and first content can be displayed in the first region 181.

When a menu display command is received, the controller 170 can withdraw the display unit 180 in the height direction to add a second region 182 as shown in FIG. 8B. The second region 182 may be located below the first region 181. That is, as the display unit 180 is withdrawn, the first region 181 may rise and the second region 182 may be added.

As shown in FIG. 8C, the display unit 180 can continuously display the first content in the first region 181 and display the menu in the second region 182. In this instance, the menu may be displayed without hiding the first content and the height of the first content may be adjusted.

Figure 9A:
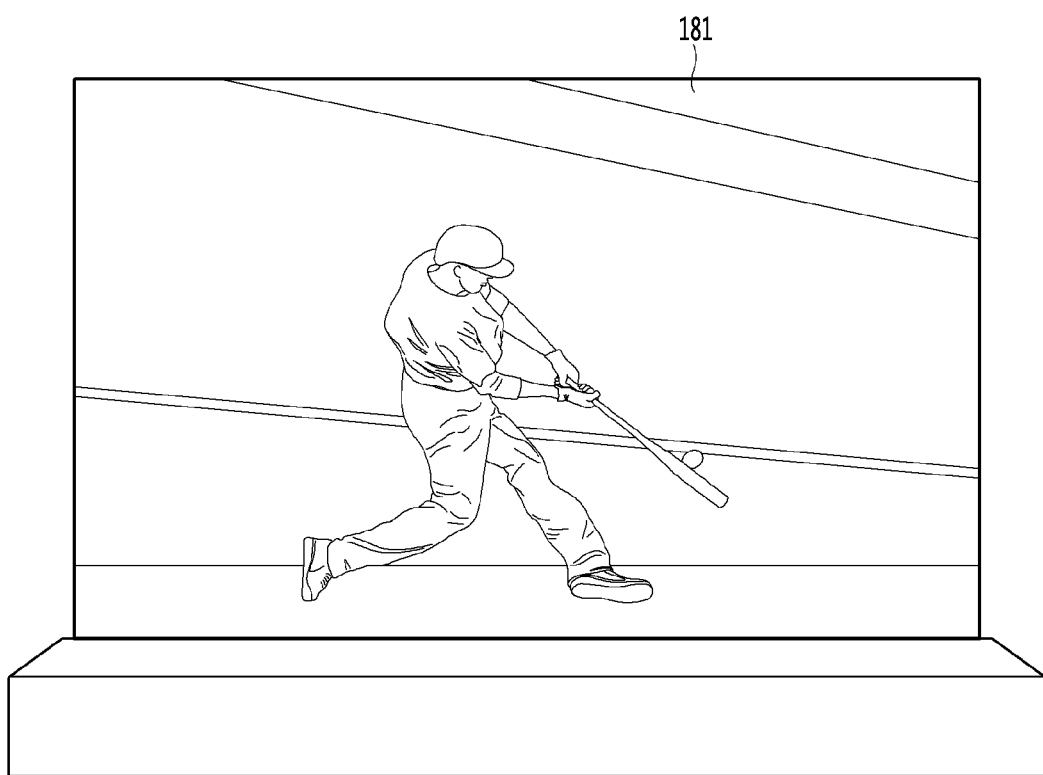
FIGS. 9A to 9C are diagrams illustrating a method of displaying a menu in a region of a display device withdrawn in a height direction according to a second embodiment of the present invention.
Figure 9B:
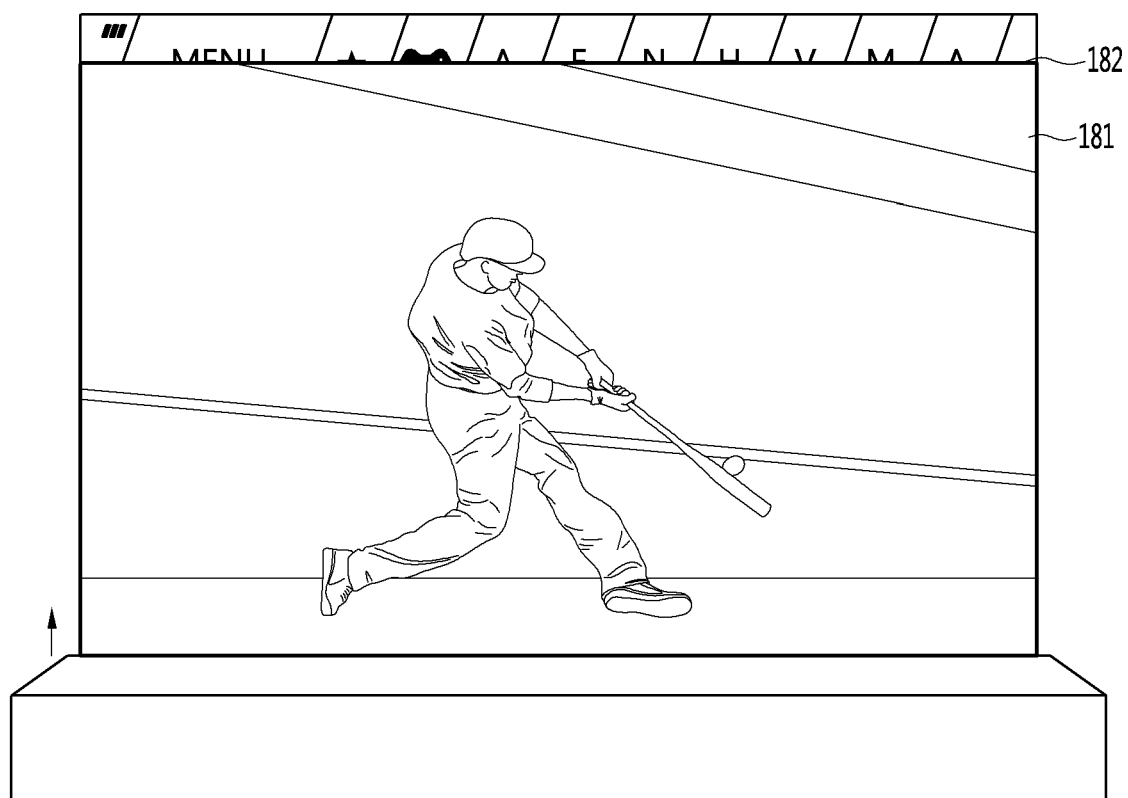
Figure 9C:
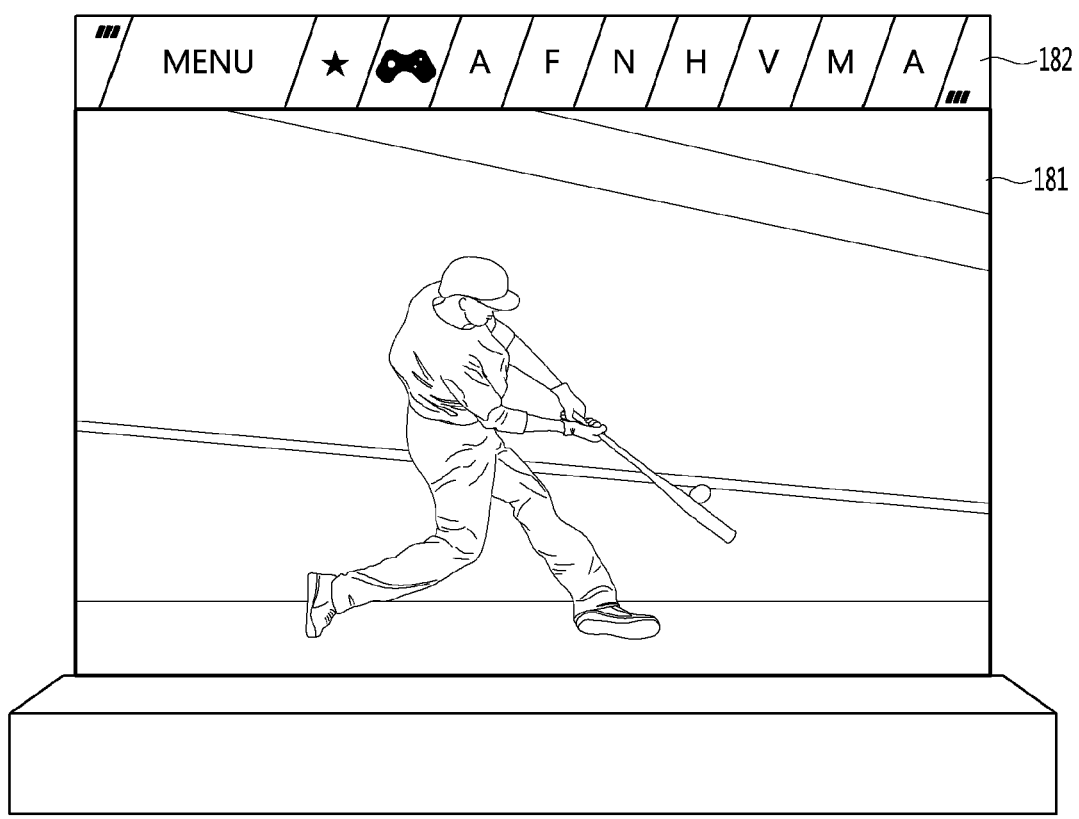

Next, FIGS. 9A to 9C are diagrams illustrating a method of displaying a menu in a region of a display device withdrawn in a height direction according to a second embodiment of the present invention. As shown in FIG. 9A, the display unit 180 can include a first region 181 and first content can be displayed in the first region 181. When a menu display command is received, the controller 170 can withdraw the display unit 180 in the height direction to add a second region 182 as shown in FIG. 9B.

As shown in FIG. 9C, the second region 182 may be located above the first region 181. That is, even when the display unit 180 is withdrawn, the location of the first region 181 may be fixed and the second region 182 may be added to the upper side of the first region 181. Accordingly, the first content can be displayed at the fixed location of the first region 181 and the menu can be displayed while rising from the upper surface of the first content.

In this instance, the menu can be displayed without hiding the first content. That is, the menu can be displayed in a separate region while displaying the first content at the fixed location, such that the user views the content without interruption.

FIG. 6A will be described again. The controller 170 can sense whether an item selection command displayed in the menu is received (S19). When a command for selecting any one of at least one item displayed in the menu is received, the controller 170 can display second content corresponding to the selected item in the first region 181 or the second region 182 (S21).

Next, a method of displaying content corresponding to an item selected from a menu in a first region according to various embodiments of the present invention will be described with reference to FIGS. 10A to 10C, a method of displaying content corresponding to an item selected from a menu in a second region according to a first embodiment of the present invention will be described with reference to FIGS. 11A and 11B, and a method of displaying content corresponding to an item selected from a menu in a second region according to a second embodiment of the present invention will be described with reference to FIGS. 12A and 12B.

Figure 10A:
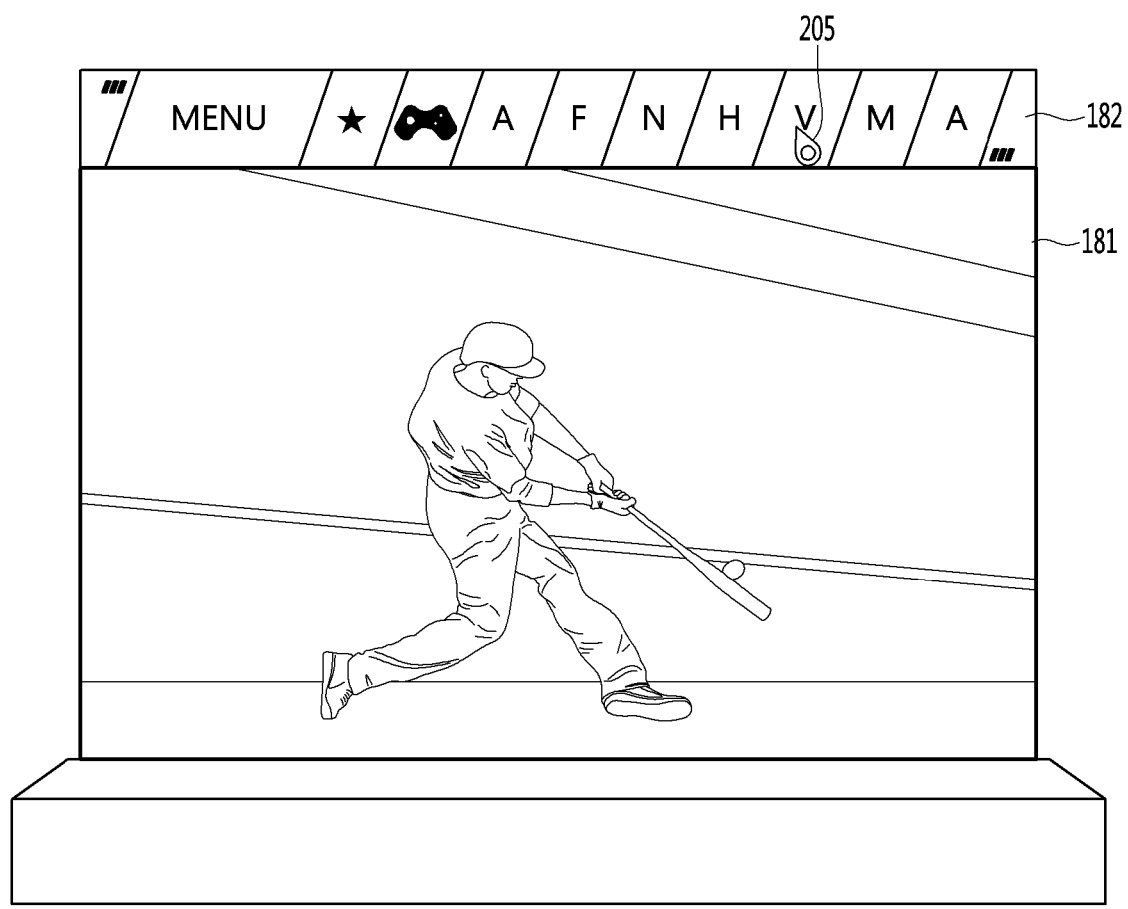
FIGS. 10A to 10C are diagrams illustrating a method of displaying content corresponding to an item selected from a menu in a first region according to an embodiment of the present invention.

First, as shown in FIG. 10A, the display unit 180 can display first content in the first region 181 and display a menu in the second region 182. The controller 170 can receive a command for selecting any one item displayed in the menu. More specifically, the controller 170 can receive a command for selecting any one item displayed in the menu through a pointer 205. The pointer 205 can be controlled through the remote control device 200 or through a voice command, gesture input, iris recognition, etc.

Figure 10B:
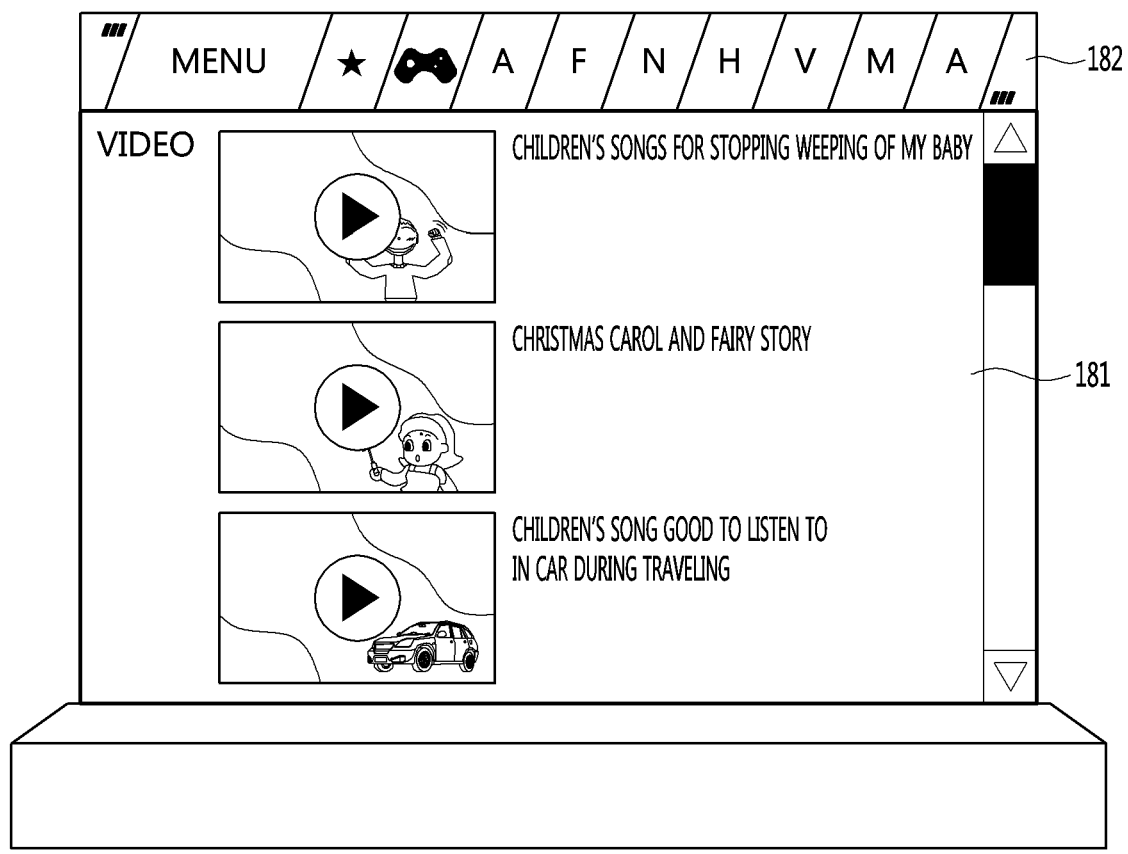

According to the first embodiment of the present invention, the controller 170 can display second content corresponding to the item selected from the menu in the first region 181 as shown in FIG. 10B. That is, the display unit 180 can replace the first content displayed in the first region 181 with the second content corresponding to the item selected from the menu. In the second region 182, the same menu can be continuously displayed. In this instance, the user can manipulate the menu displayed in the second region 182 while checking the second content displayed in the first region 181.

Figure 10C:
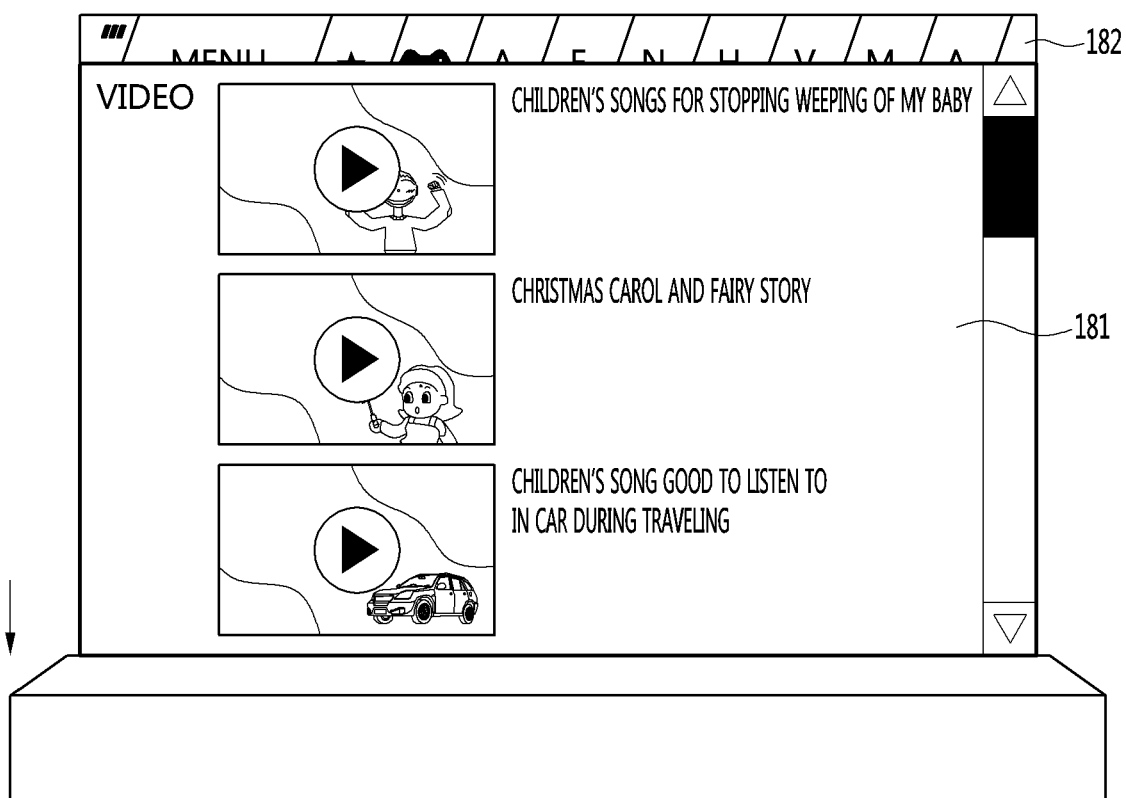

According to the second embodiment of the present invention, the controller 170 can display the second content corresponding to the item selected from the menu in the first region 181 while inserting the display unit 180 so as to reduce the size of the second region 182 as shown in FIG. 10C. That is, the controller 170 can reduce the size of the second region 182 to downsize the menu while displaying the second content corresponding to the item selected from the menu in the first region 181. In this instance, as a specific item is selected from the menu, the unnecessary menu may be simply displayed and the user can concentrate on the content corresponding to the selected item.

Figure 11A:
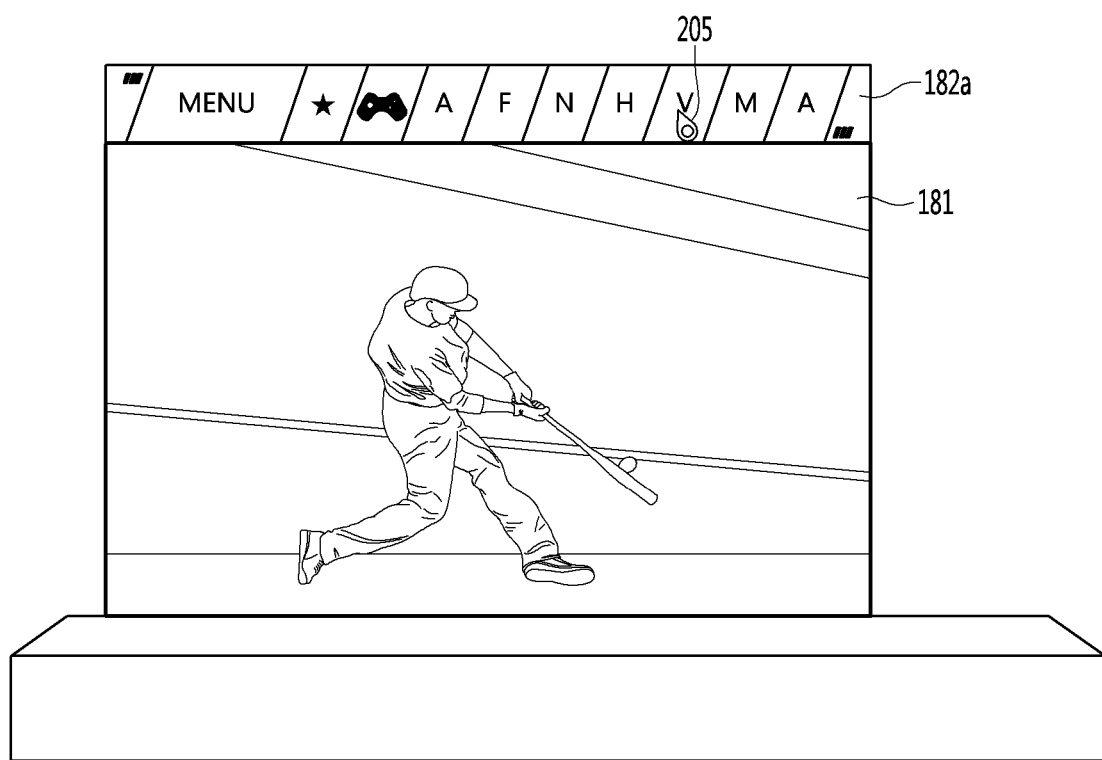
FIGS. 11A and 11B are diagrams illustrating a method of displaying content corresponding to an item selected from a menu in a second region according to a first embodiment of the present invention.
Figure 11B:
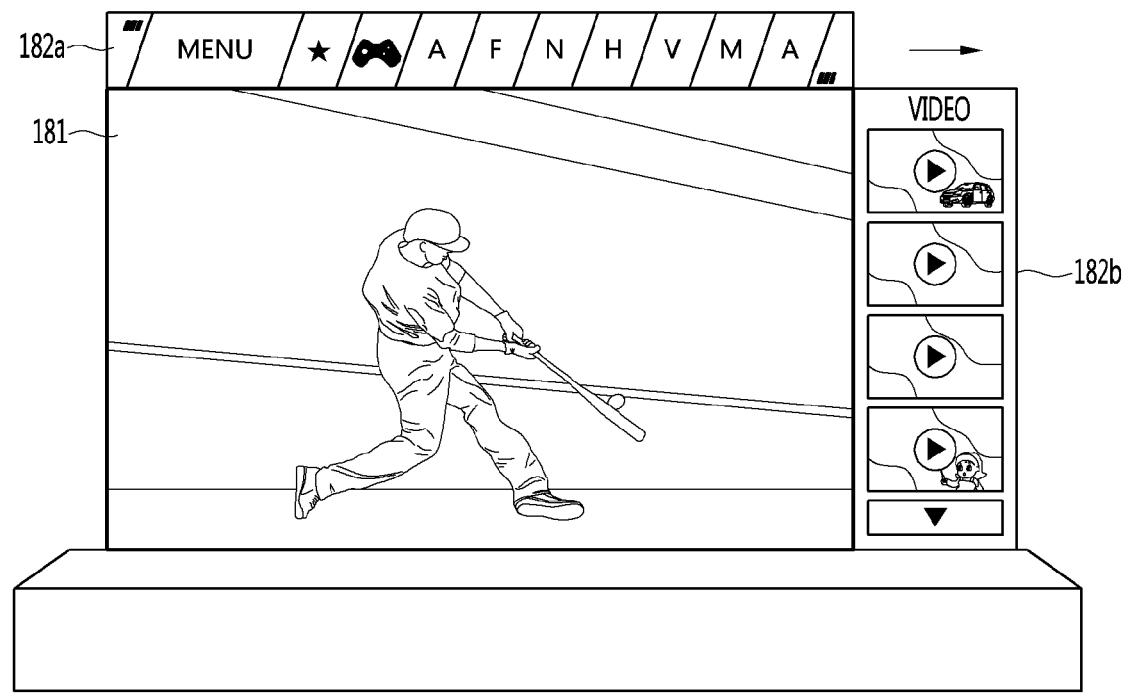

Next, FIGS. 11A and 11B are diagrams illustrating a method of displaying content corresponding to an item selected from a menu in a second region according to a first embodiment of the present invention. As shown in FIG. 11A, the display unit 180 can display first content in a first region 181 and display a menu in a second region 182a. The controller 170 can receive a command for selecting any one item from the menu through a pointer 205.

When a command for selecting any one item from the menu is received, the controller 170 can withdraw the display unit 180 to further extend the second region 182a as shown in FIG. 11B. As the display unit 180 extends, the display unit 180 can include a first region 181, a second region 182a and an extended second region 182b.

The display unit 180 can display first content in the first region 181, display the menu in the second region 182a, and display second content corresponding to the item selected from the second region 182b in the extended second region 182b. In this instance, the display device 100 can display the first content such as broadcast video and the second content corresponding to the menu and the item selected from the menu so as not to overlap. The user can simultaneously acquire a variety of information through the extended region as the display unit 180 is withdrawn.

Figure 12A:
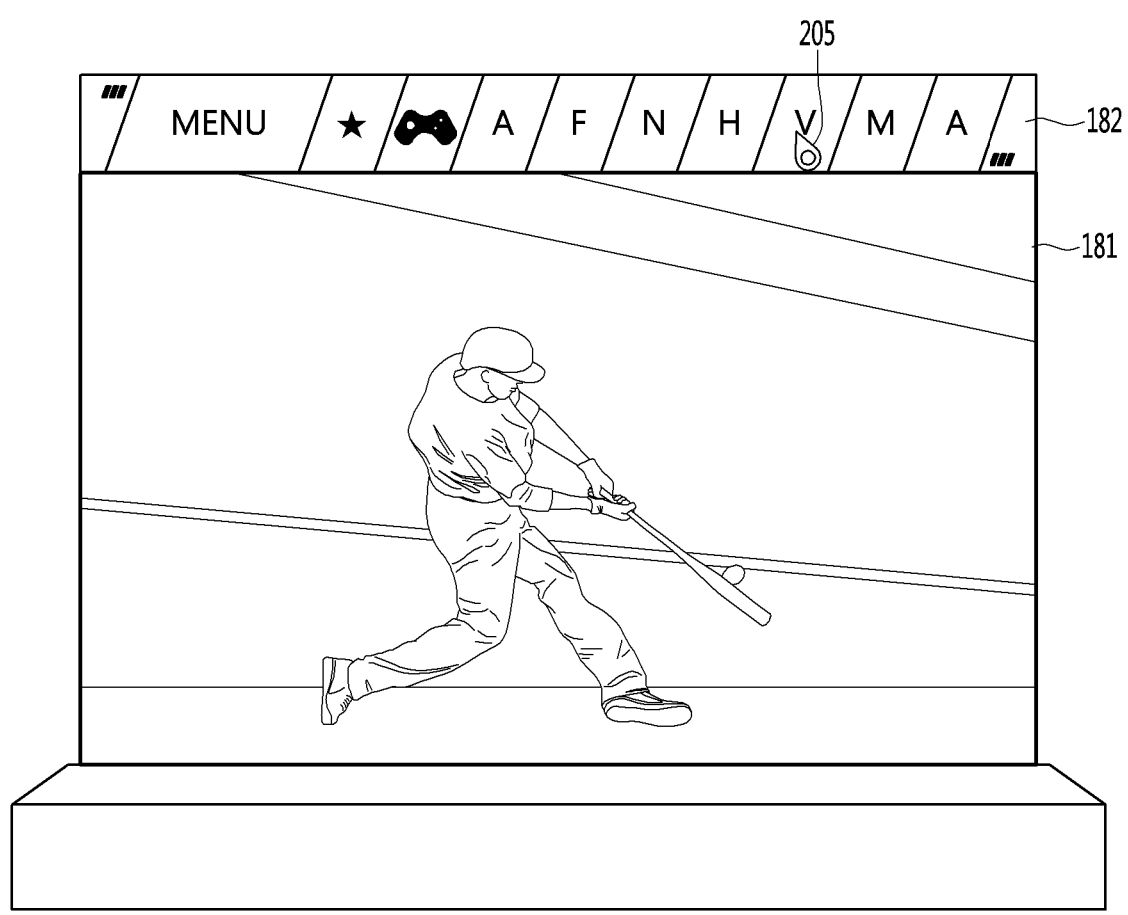
FIGS. 12A and 12B are diagrams illustrating a method of displaying content corresponding to an item selected from a menu in a second region according to a second embodiment of the present invention.
Figure 12B:
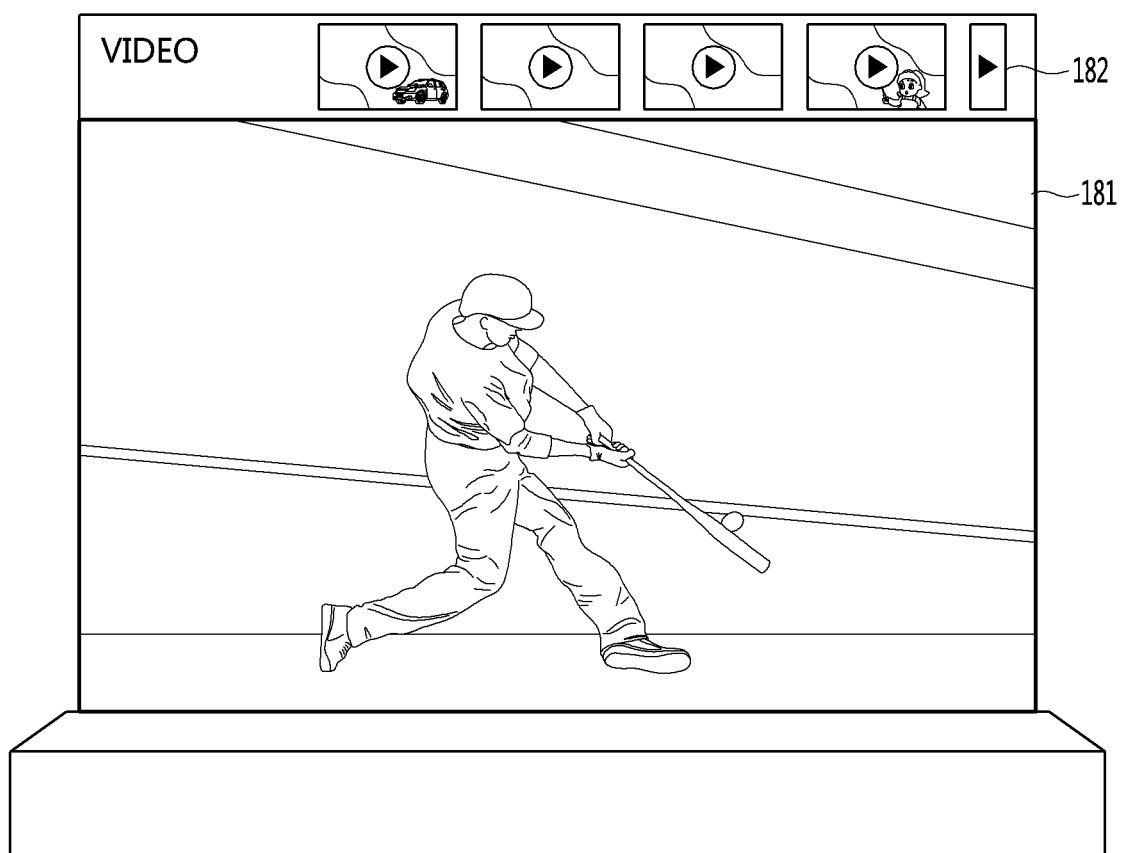

Next, FIGS. 12A and 12B are diagrams illustrating a method of displaying content corresponding to an item selected from a menu in a second region according to a second embodiment of the present invention. As shown in FIG. 12A, the display unit 180 can display first content in the first region 181 and display the menu in the second region 182. The controller 170 can receive a command for selecting any one item from the menu through a pointer 205.

The controller 170 can display the second content corresponding to the item selected from the menu in the second region 182. That is, as a command for selecting any one item from the menu is received, the display unit 180 can change the second content displayed in the second region 182 to content corresponding to the item selected from the menu. Meanwhile, the second content displayed in the second region 182 may be obtained by downsizing the original content. According to the embodiment shown in FIGS. 12A and 12B, the user can easily perform necessary manipulation through the menu while viewing the first content such as broadcast video without being interrupted by the menu.

FIG. 6A will be described again. The controller 170 can receive a command for dragging and dropping any one of the first region and the second region 182 to another region (S23). When the command for dragging and dropping any one of the first region 181 and the second region 182 to another region, the controller 170 can exchange the display regions of the first content and the second content (S25).

Figure 13A:
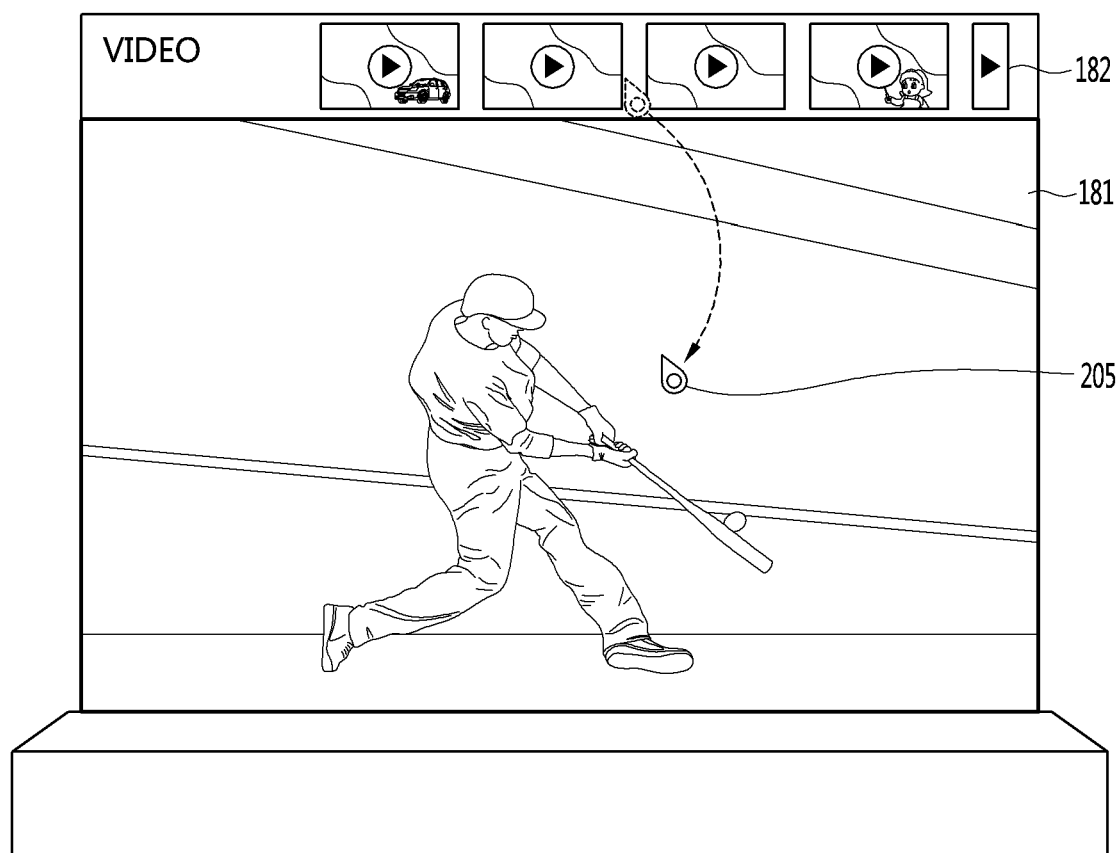
FIGS. 13A to 13C are diagrams illustrating a method of changing a display region of content according to an embodiment of the present invention.

A method of changing a display region of content according to an embodiment of the present invention will be described with reference to FIGS. 13A to 13C. As shown in FIG. 13A, the display unit 180 can display first content in the first region 181 and display second content in the second region 182. The controller 170 can receive a command for selecting one point from the second region 182 to drag and drop the point to the first region 181. In contrast, the controller 170 can receive a command for selecting one point from the first region 181 to drag and drop the point to the second region 182.

When the drag-and-drop command is received, the controller 170 can exchange the display regions of the first content and the second content. That is, the controller 170 can display the first content displayed in the first region 181 in the second region and display the second content displayed in the second region 182 in the first region 181.

Figure 13B:
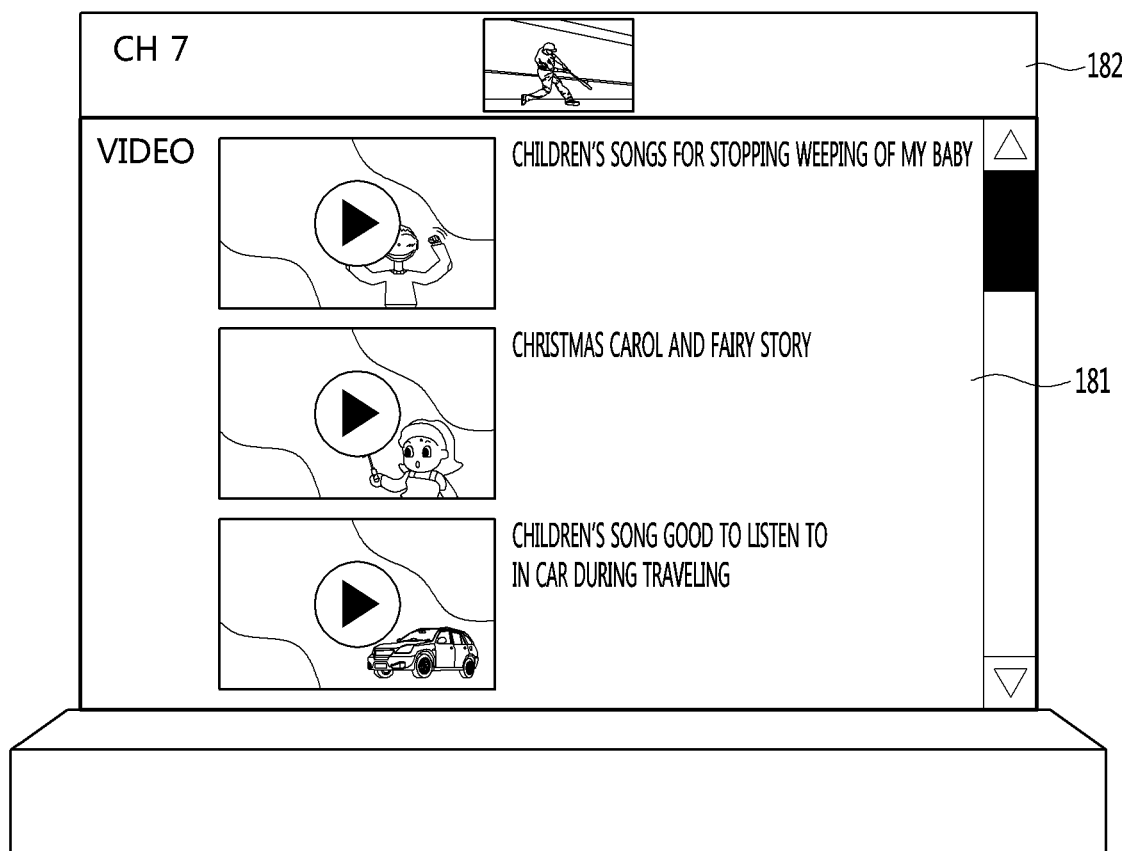

According to one embodiment of the present invention, as shown in FIG. 13B, the controller 170 can reduce the size of the first content while maintaining the aspect ratio of the first content displayed in the first region 181. The controller 170 can display the downsized first content in the second region 182 and display the enlarged second content in the first region 181.

Figure 13C:
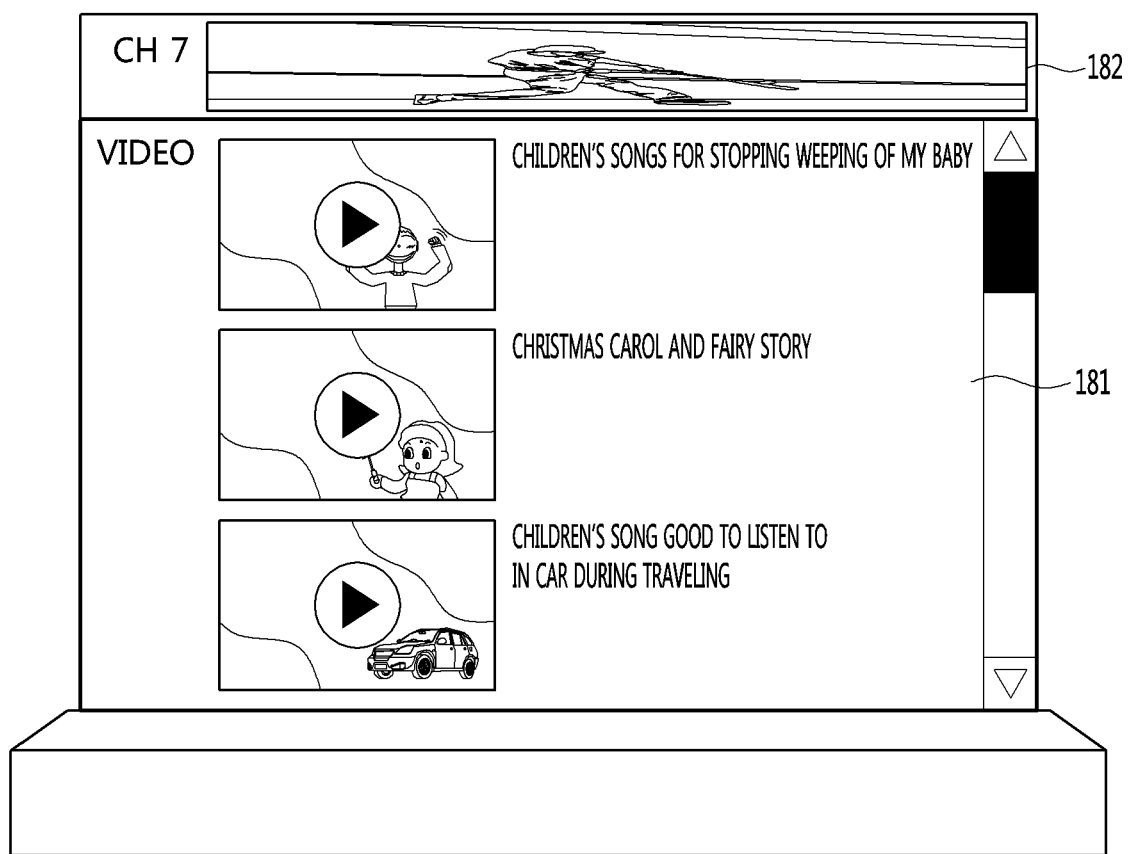

According to another embodiment of the present invention, as shown in FIG. 13C, the controller 170 can reduce the aspect ratio of the first content displayed in the first region 181 to correspond to that of the second region 182. The controller 170 can display the downsized first content in the second region 182 and display the enlarged second content in the first region 181.

The display device 100 according to the embodiment of the present invention may easily change the locations of the first content and the second content respectively displayed in the first region 181 and the second region 182 through the drag-and-drop command. The user can conveniently enlarge and view specific content.

FIG. 6A will be described again. The controller 170 can receive a connection signal of a first external device (S27). Here, the first external device may be a device connected to the display device 100 through the external device interface 135. For example, the first external device may be a mobile terminal such as a smartphone, a game console, a tablet PC, a DVD player, a set-top box, etc., as an example. The first external device may include all devices connectable to the display device 100.

When the connection signal of the first external device is received, the controller 170 can withdraw the display unit 180 to add the second region 182 (S29). The display unit 180 can display information on the first external device in the second region 182 (S31). Here, the information on the external device may be second content and the connection signal of the external device may be a second content display command.

Figure 14A:
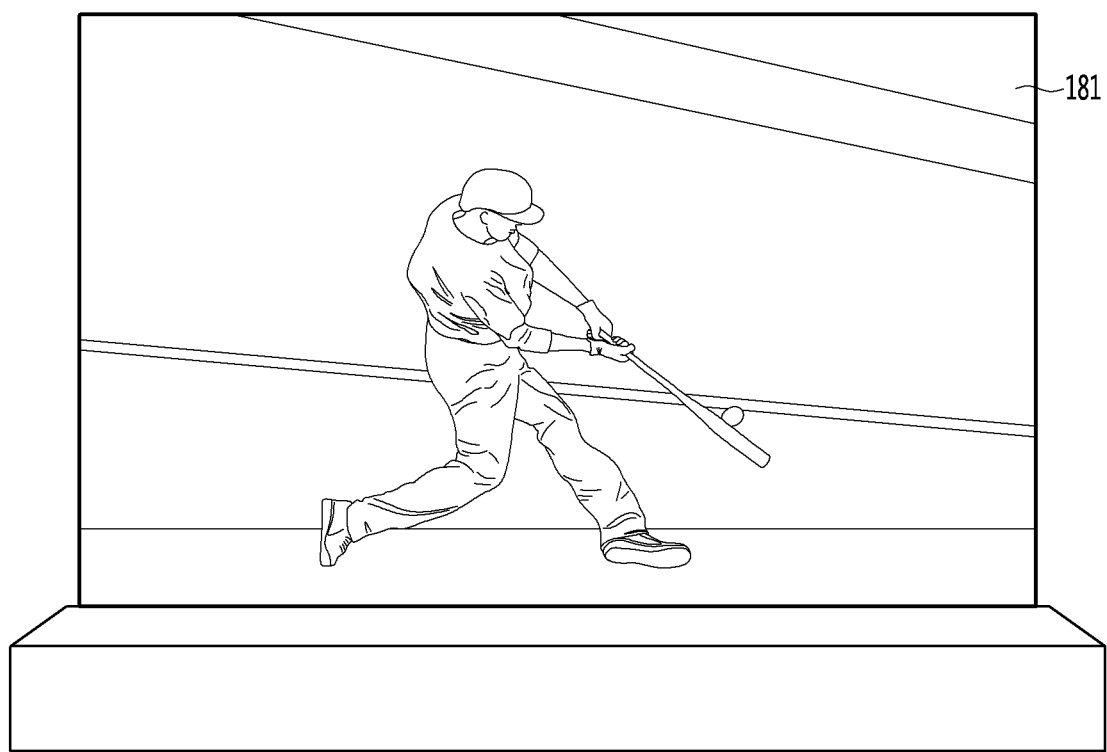
FIGS. 14A to 14C are diagrams illustrating a method of displaying content upon connection with an external device according to a first embodiment of the present invention.

Next, a method of displaying content upon connection with an external device according to a first embodiment of the present invention will be described with reference to FIGS. 14A to 14C. Referring to FIG. 14A, the display unit 180 can display first content such as broadcast video in the first region 181. The controller 170 can receive the connection signal of the first external device 300 while displaying the first content. When the connection signal of the first external device 300 is received, the controller 170 can withdraw the display unit 180 to add the second region 182 and display information on the first external device 300 in the second region 182.

Figure 14B:
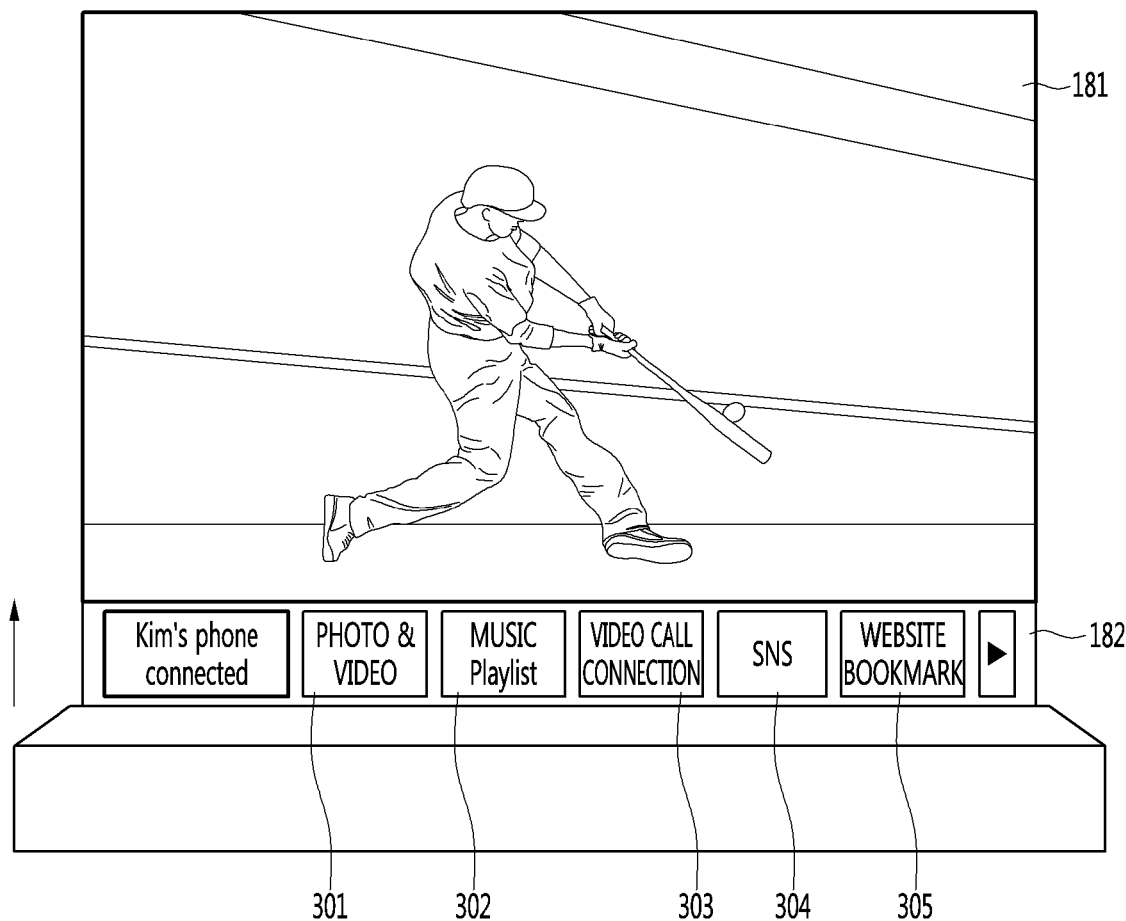
Figure 14B:
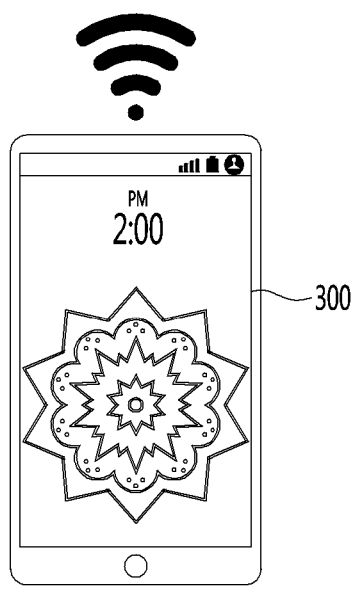
Figure 14C:
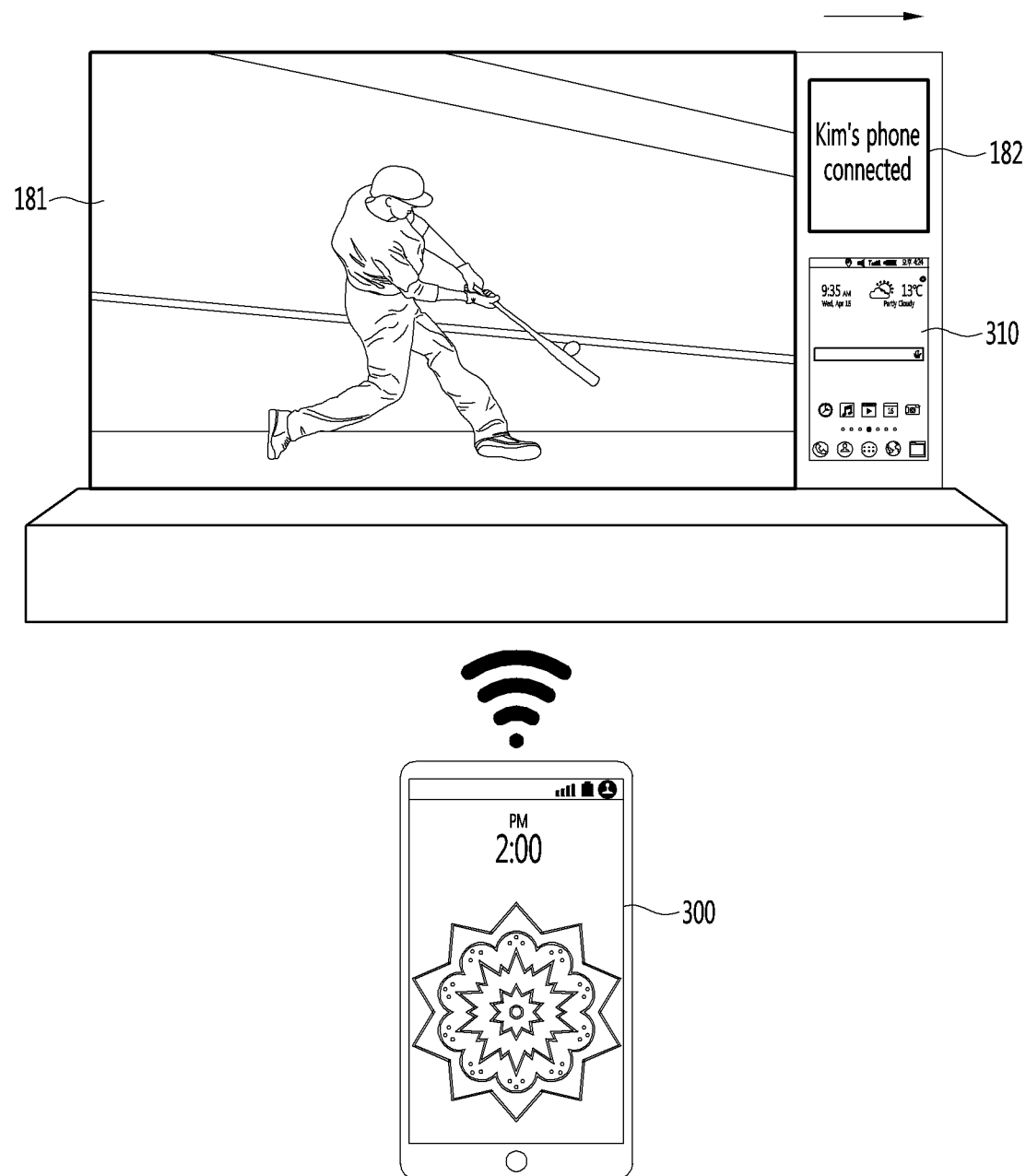

The display unit 180 can be withdrawn in a vertical direction as shown in FIG. 14B or in a horizontal direction as shown in FIG. 14C based on device information or connection information of the first external device 300. According to one embodiment of the present invention, as shown in FIG. 14B, the display unit 180 can be withdrawn in the vertical direction and information related to the first external device 300 can be displayed in the second region 182. Here, the information related to the first external device 300 may include file information such as photos, video, music, web addresses, etc. stored in the first external device 300 and information on functions which may be performed through the first external device 300.

According to another embodiment of the present invention, as shown in FIG. 14C, the display unit 180 can be withdrawn in the horizontal direction and a mirroring screen 310 of the first external device 300 can be displayed in the second region 182. The mirroring screen 310 may mean that the screen of the first external device 300 is displayed on the display device 100.

The controller 170 can receive a command for controlling the mirroring screen 310, thereby controlling the first external device 300. In this instance, it is possible to easily manipulate the external device connected to the display device 100 while viewing the first content.

Figure 15A:
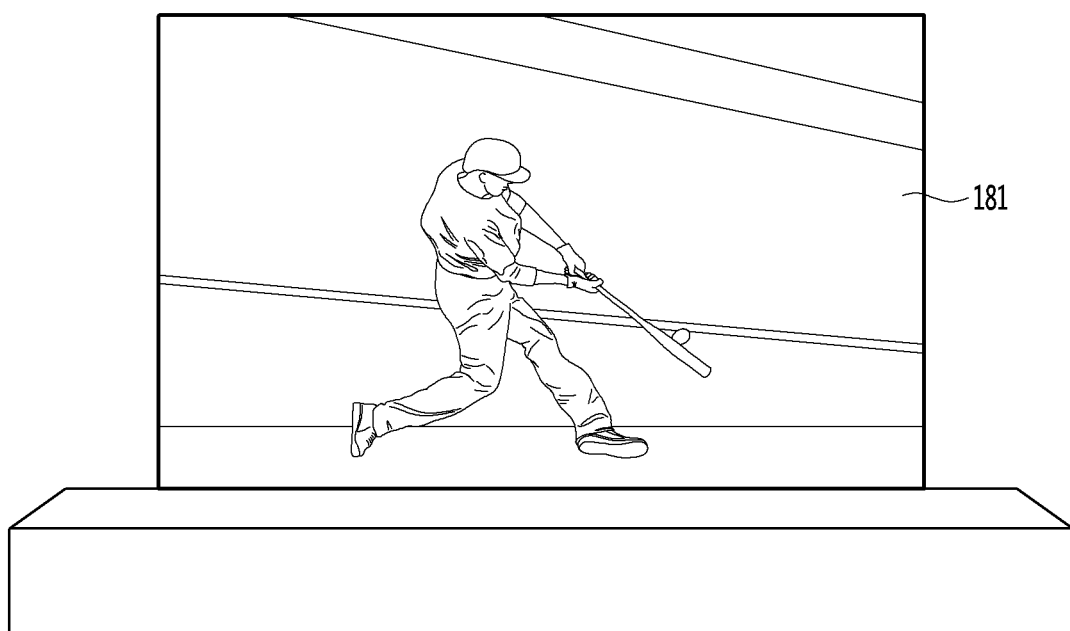
FIGS. 15A to 15B are diagrams illustrating a method of displaying content upon connection with an external device according to a second embodiment of the present invention.

Next, a method of displaying content upon connection with an external device according to a second embodiment of the present invention will be described with reference to FIGS. 15A and 15B. Referring to FIG. 15A, the display unit 180 can display first content such as broadcast video in the first region 181. The controller 170 can receive the connection signal of the first external device 300 while displaying the first content.

When the connection signal of the first external device 300 is received, the controller 170 can withdraw the display unit 180 to add the second region 182. More specifically, the controller 170 can withdraw the display unit 180 based on the aspect ratio of the content reproduced through the first external device 300.

The aspect ratio of the content reproduced through the first external device 300 may be different from that of the first content. The controller 170 can withdraw the display unit 180 such that the aspect ratio of the display unit 180 is equal to that of the content reproduced through the first external device 300.

Figure 15B:
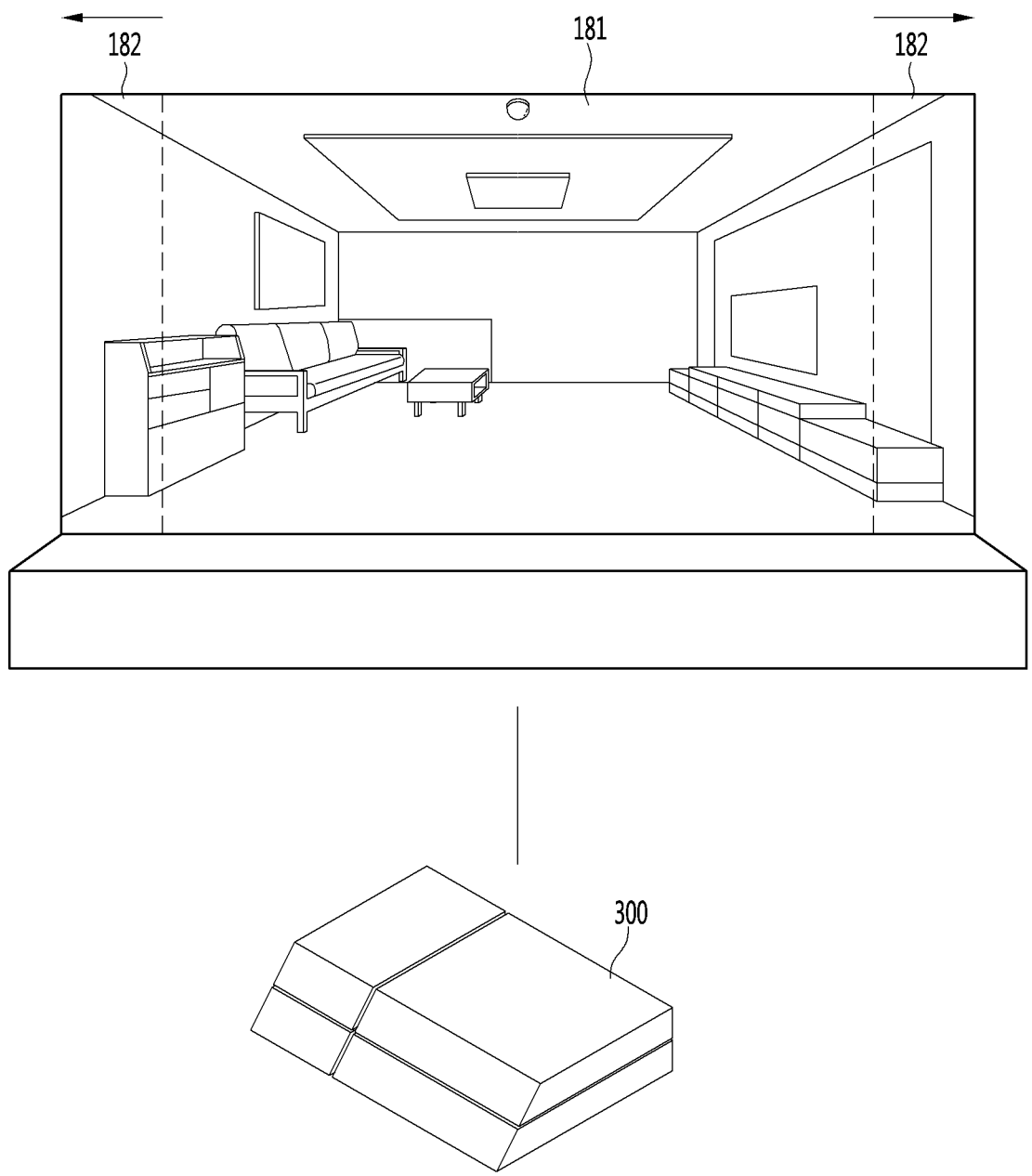

As shown in FIG. 15B, the display unit 180 can display the content reproduced through the first external device 300 in the first region 181 and the second region 182. That is, the display unit 180 can display the content reproduced through the first external device using the first region 181 and the second region 182. In this instance, the region of the display unit 180 can be optimized according to the aspect ratio of the content reproduced through the external device 300.

FIG. 6A will be described again. The controller 170 can receive a connection signal of a second external device (S33). The controller 170 can receive the connection signal of the second external device in a state of connection with the first external device.

When the connection signal of the second external device is received in a state of connection with the first external device, the controller 170 can withdraw the display unit 180 to add a third region (S35). The controller 170 can display information on the second external device in the third region (S37).

Figure 16A:
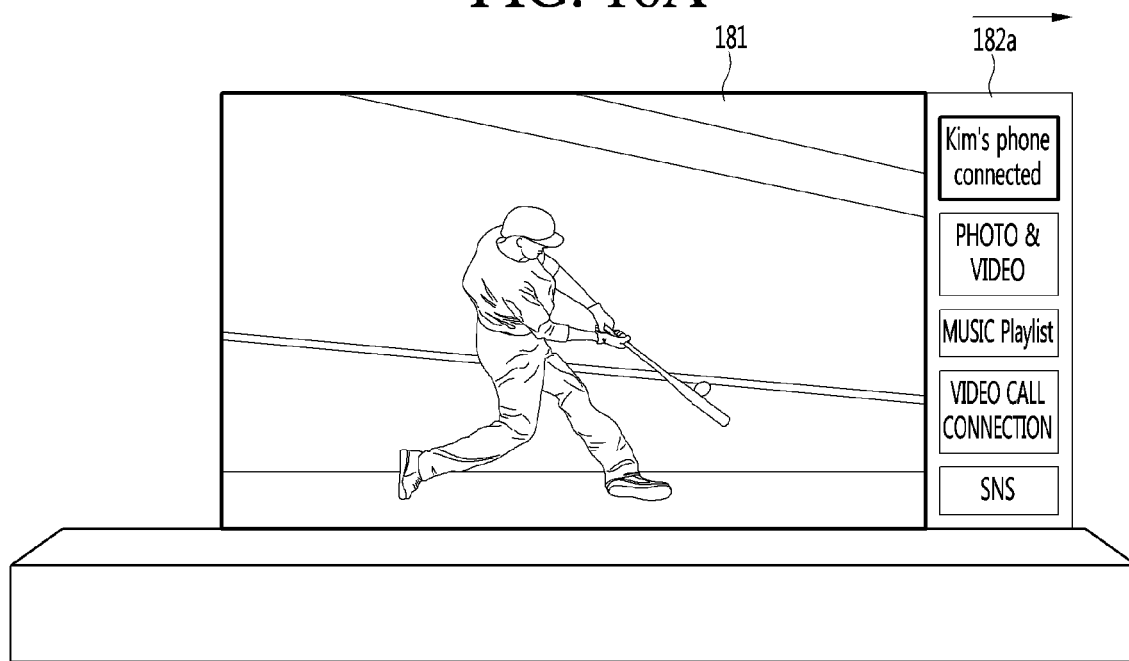
FIGS. 16A and 16B are diagrams illustrating a method of displaying content upon connection with a plurality of external devices according to an embodiment of the present invention.
Figure 16A:
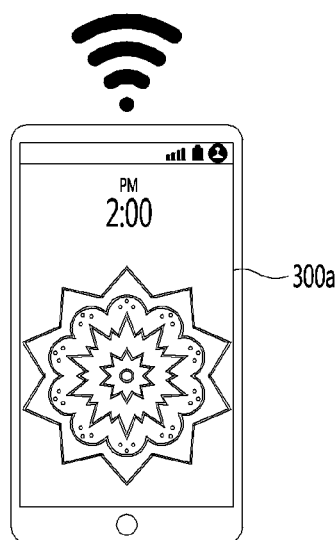

Next, a method of displaying content upon connection with a plurality of external devices according to an embodiment of the present invention will be described with reference to FIGS. 16A and 16B. As shown in FIG. 16A, when only the first external device 300a is connected, the controller 170 can display first content in the first region 181 and display information on the first external device 300a in the second region 182a. The controller 170 can receive the connection signal of the second external device 300b in a state of connection with the first external device 300a.

Figure 16B:
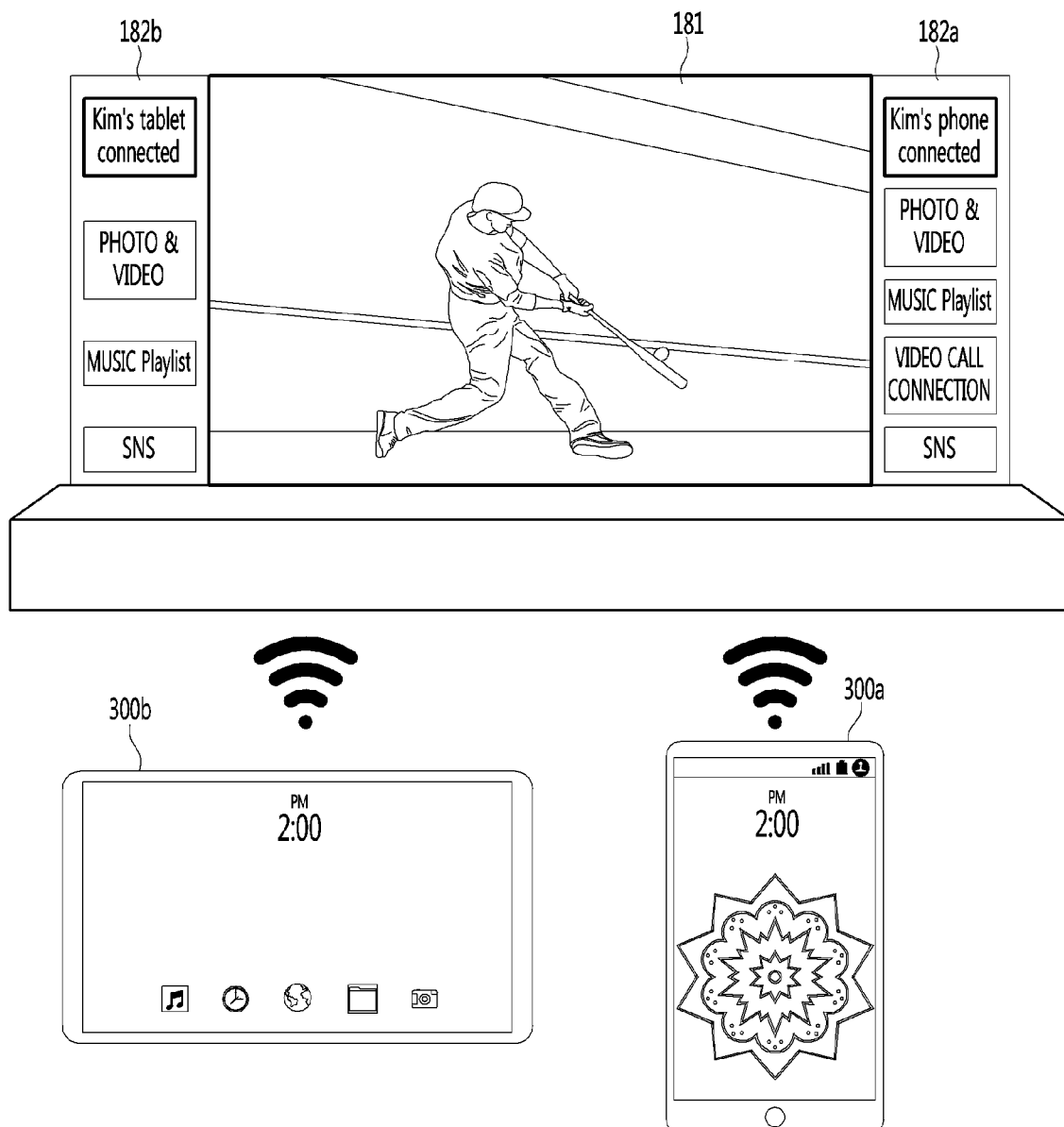

Referring to FIG. 16B, the controller 170 can extend the display unit 180 to add the third region 182b as the connection signal of the second external device 300b is received. The display unit 180 can display the information on the first external device 300a in the second region 182a and display the information on the second external device 300b in the third region 182b.

Although the number of external devices connected to the display device 100 is 2 in FIG. 16B, this is merely exemplary. The display device 100 can simultaneously display the first content such as broadcast video and the information on the connected external device.

FIG. 6A will be described again. The controller 170 can receive a disconnection signal of any one of the first external device and the second external device (S39). The controller 170 can insert the display unit 180 of a region corresponding to the disconnected external device (S41).

Next, a method of inserting a display unit according to disconnection of an external device according to an embodiment of the present invention will be described with reference to FIG. 16C. The controller 170 can receive a disconnection signal of any one external device in a state of connection with the first external device 300a and the second external device 300b. The controller 170 can insert the display unit 180 such that the information on the external device corresponding to the received disconnection signal disappears.

Figure 16C:
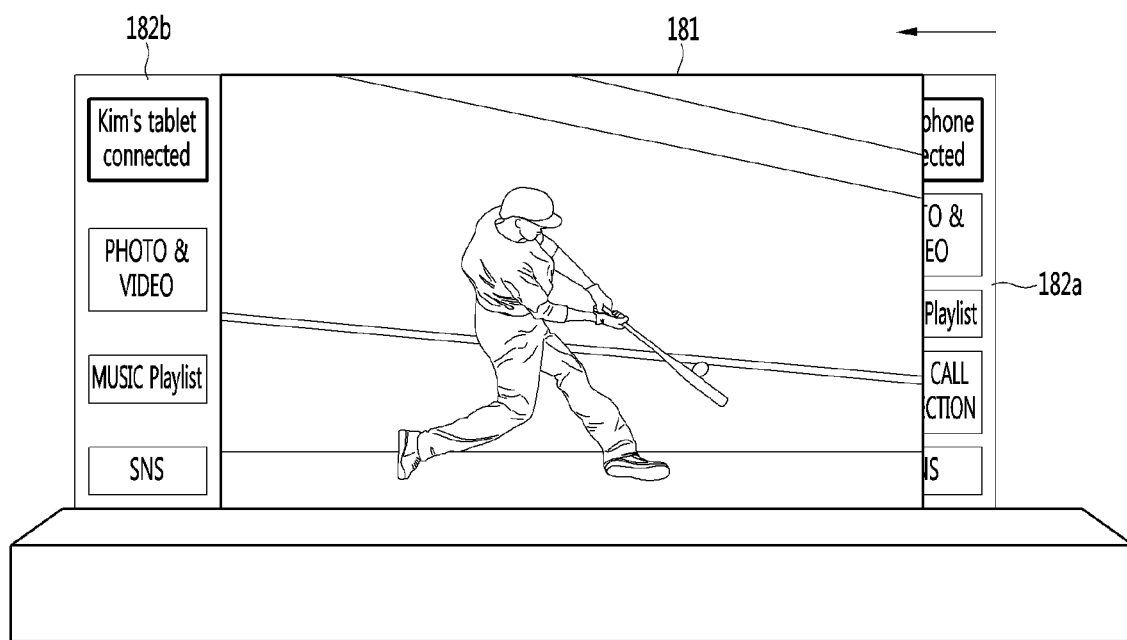
FIG. 16C is a diagram illustrating a method of inserting a display unit based on disconnection of an external device according to an embodiment of the present invention.
Figure 16C:
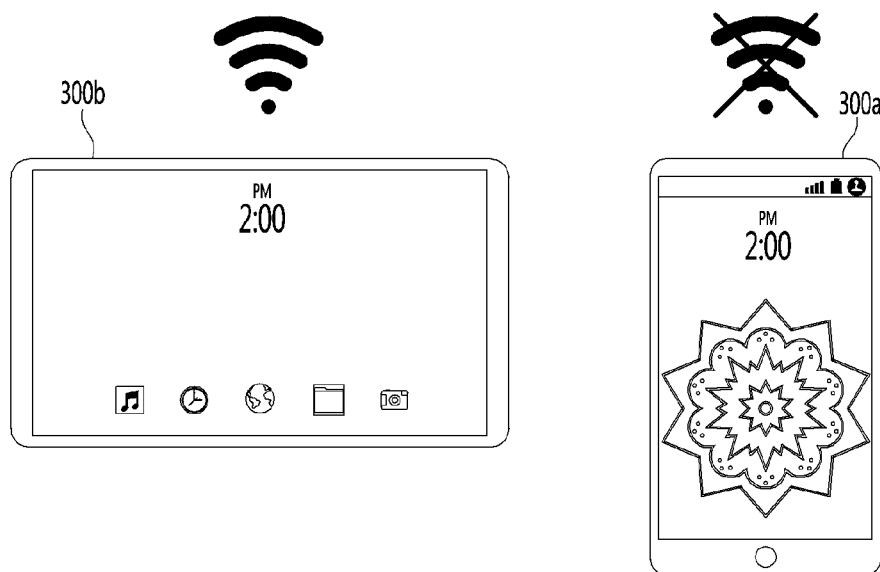

Referring to FIG. 16C, the controller 170 can receive the disconnection signal of the first external device 300a in a state of connection with the first external device 300a and the second external device 300b. The controller 170 can insert the display unit 180 to remove the second region 182a which is the information display region of the disconnected first external device 300a. The display device 100 may immediately remove unnecessary information and provide only necessary information to the user while displaying the connection state of the external device.

FIG. 6A will be described again. The controller 170 can receive a voice command signal (S43). The controller 170 can recognize a predetermined keyword such as recommendation, search, etc. The controller 170 can receive the voice command signal from the user through keyword recognition.

The controller 170 can acquire information corresponding to the voice command signal (S45). The controller 170 can search for the information corresponding to the voice command signal based on the recognized keyword. The controller 170 can search for the keyword included in the voice command signal through the network interface 133 or information stored in the memory 140 and acquire the information corresponding to the voice command signal.

The controller 170 can withdraw the display unit 180 to add the second region 182 based on the amount of acquired information (S47). The controller 170 can calculate the size of the region for displaying the acquired information. The controller 170 can withdraw the display unit 180 to add the second region 182 by the calculated size of the region.

The controller 170 can display information corresponding to the voice command signal in the second region 182 (S49). The controller 170 can display information corresponding to the voice command signal in the second region 182 according to withdrawal of the display unit 180.

Figure 17A:
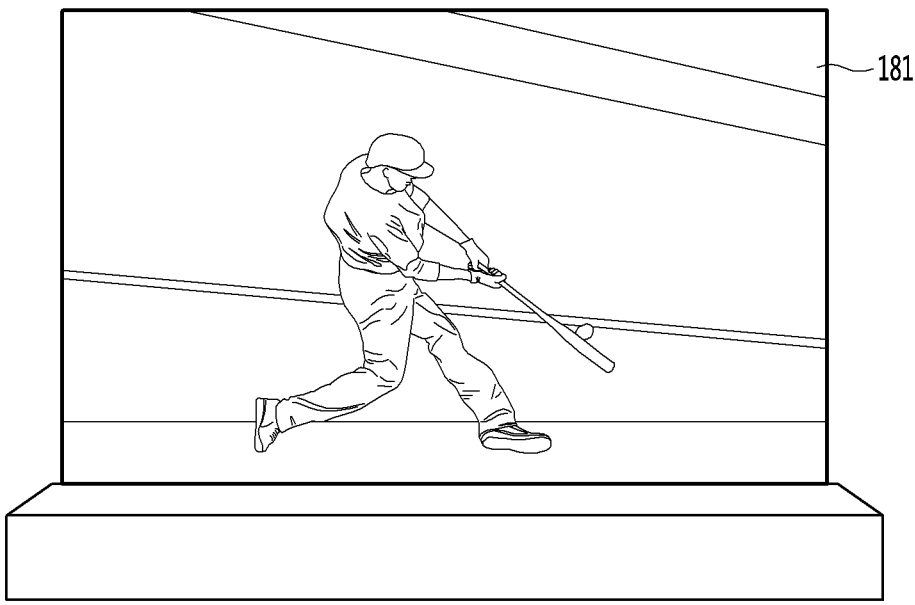
FIGS. 17A to 17D are diagrams illustrating a method of displaying content based on a voice command signal according to an embodiment of the present invention.

Next, a method of displaying content based on a voice command signal according to an embodiment of the present invention will be described with reference to FIGS. 17A to 17D. Referring to FIG. 17A, the display unit 180 can display first content such as broadcast video in the first region 181.

Figure 17B:
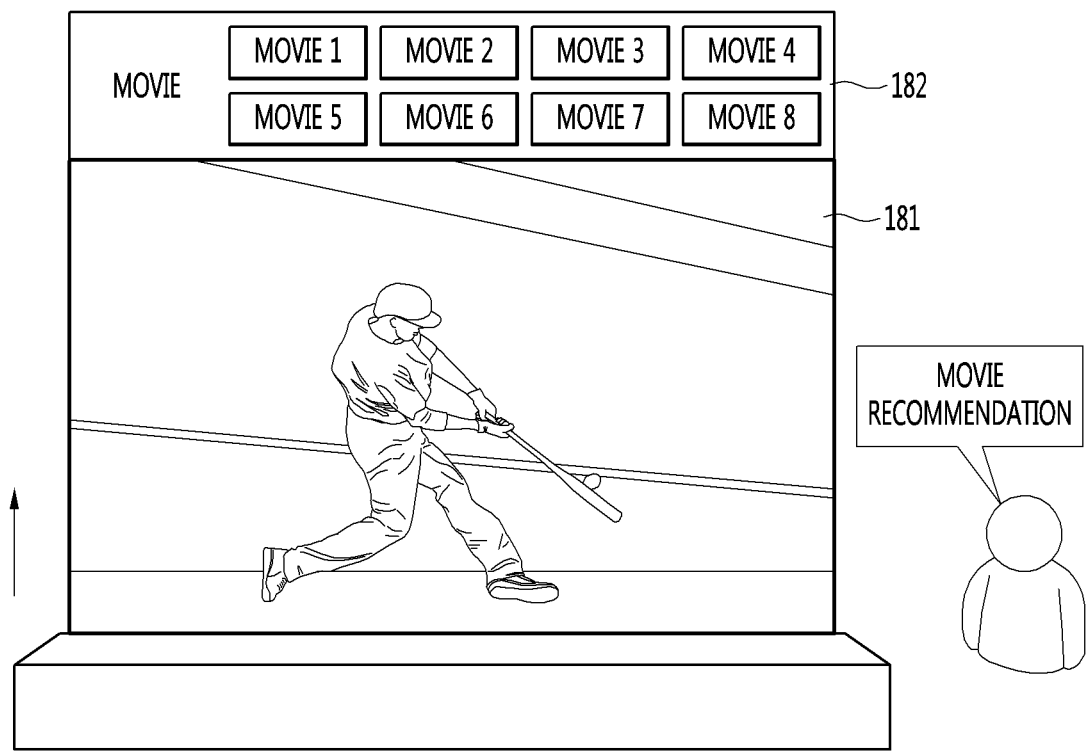

Referring to FIG. 17B, the controller 170 can receive the voice command signal and withdraw the display unit 180 to add the second region 182 according to the voice command signal. For example, the controller 170 can receive a voice command signal "movie recommendation". The controller 170 can acquire information corresponding to "movie recommendation". The controller 170 can calculate the size of the second region 182, in which the acquired information will be displayed, based on the amount of acquired information. The controller 170 can withdraw the display unit 180 to add the second region 182 having the calculated size. The controller 170 can display information corresponding to the voice command signal in the withdrawn second region 182.

Figure 17C:
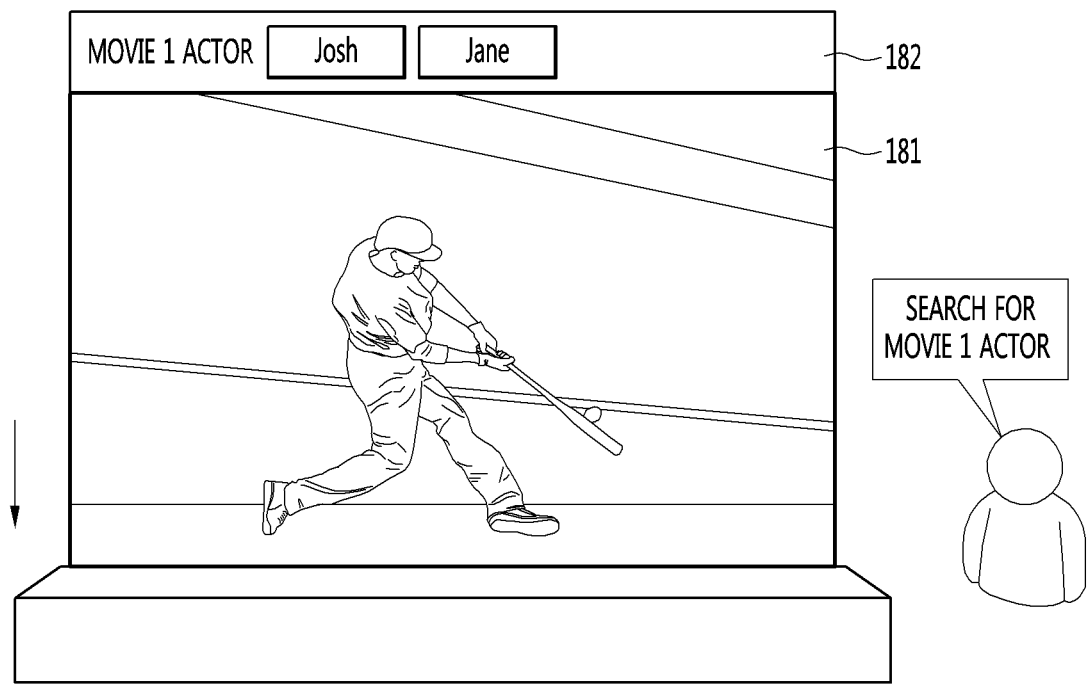

As shown in FIG. 17C, the controller 170b may further receive another voice command signal in a state of displaying the information corresponding to the voice command signal in the second region 182. The controller 170 can acquire the information corresponding to the lately received voice command signal and calculate the size of the second region 182 based on the amount of acquired information. The controller 170 can withdraw or insert the display unit 180 based on the calculated size of the second region 182. More specifically, the controller 170 can further withdraw the display unit 180 when the newly calculated size of the second region 182 is greater than the current size of the second region 182 and insert the display unit 180 when the newly calculated size of the second region 182 is less than the current size of the second region 182.

Figure 17D:
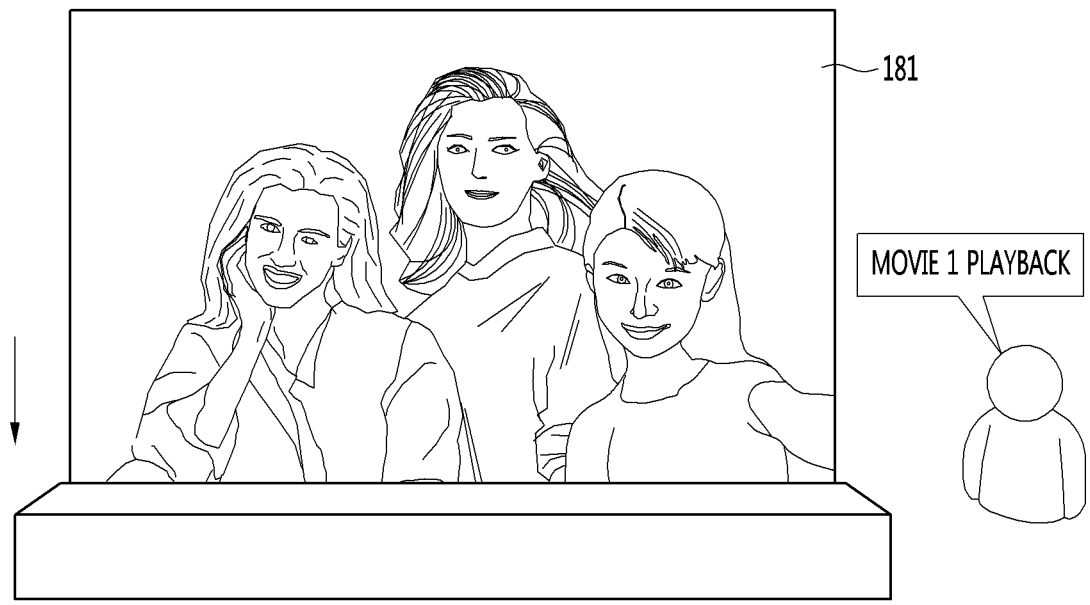

The controller 170 can completely insert the display unit 180 corresponding to the second region 182 when there is no information to be displayed in the second region 182 as a result of acquiring the information corresponding to the voice command signal based on the received voice command signal. For example, as shown in FIG. 17D, the controller 170 can receive a voice command signal "movie 1 playback", insert the display unit 180 when there is no information to be displayed in the second region 182, and display content corresponding to the voice command signal in the first region 181.

The display device 100 according to the embodiment of the present invention may adjust the size of the second region 182 according to the voice command signal to withdraw or insert the display unit 180 and display information corresponding to the voice command signal in the second region 182.

FIG. 6A will be described again. The controller 170 can sense whether a display-unit withdrawal command is received as shown in FIG. 6B (S51), when the voice command signal is not received. The display-unit withdrawal command may mean a command for withdrawing the display unit 180 in the vertical or horizontal direction to add a new display region in addition to the region in which the content is currently displayed.

The display-unit withdrawal command may include a specific-region withdrawal command and a content display command. More specifically, the specific-region withdrawal command may be a command for enabling a user to specify a region to be added of a display unit and the size thereof. The controller 170 can receive the specific-region withdrawal command for setting a withdrawal direction and a withdrawal length and may withdraw the display unit 180 according to the received specific-region withdrawal command.

The withdrawal direction may include a vertical direction and a horizontal direction and the withdrawal length may include a plurality of steps. For example, the controller 170 can include a command for withdrawing the display unit in one step in the horizontal direction or a display-unit withdrawal command in three steps in the vertical direction. As the number of steps increases, the withdrawal length may increase.

The content display command may be a command for displaying second content in a state of displaying first content in the first region 181. When a new content display command is received, the controller 170 can withdraw the display unit 180 and display second content in the withdrawn second region 182. In the present invention, the second content display command may include all commands for displaying content capable of being displayed on the display device 100, such as a screen setting menu display command, a channel information display command, a time shift execution command, an IOT state display command, a subtitle display command, an aspect-ratio change command, a user setting information display command, a content-related information display command, etc.

When the display-unit withdrawal command is received, the controller 170 can withdraw the display unit 180 to add the second region 182 (S53), and the display unit 180 can display the second content in the second region 182 (S55). The location and size of the second region 182 may be changed according to the type of the display-unit withdrawal command.

Hereinafter, a method of withdrawing a display unit 180 according to type of a display-unit withdrawal command and displaying second content in a second region 182 added according to withdrawal of the display unit 180 will be described using various examples.

Next, a method of displaying content according to a display-unit withdrawal command according to a first embodiment of the present invention will be described with reference to FIGS. 18A and 18B. The controller 170 can receive the display-unit withdrawal command and the display-unit withdrawal command may be a screen setting menu display command.

Figure 18A:
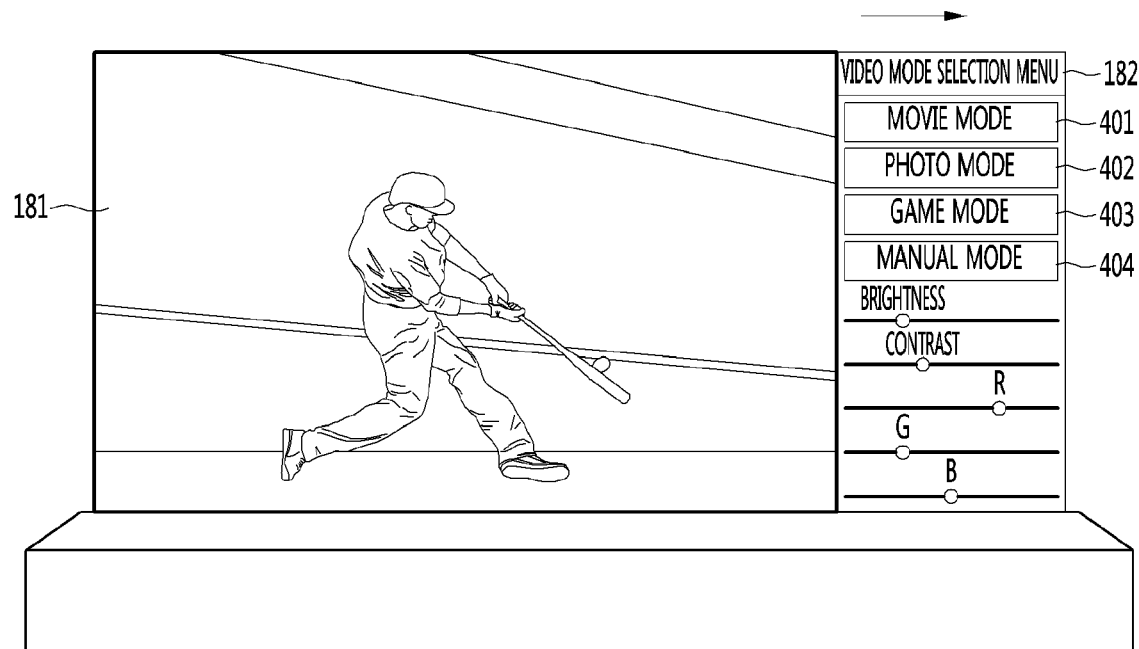
FIGS. 18A and 18B are diagrams illustrating a method of displaying content based on a display-unit withdrawal command according to a first embodiment of the present invention.

As shown in FIG. 18A, when the screen setting menu display command is received, the controller 170 can withdraw the display unit 180 to add the second region 182. The display unit 180 can display the second content in the second region 182 and the second content may include at least one screen setting item. For example, the screen setting item may include a movie mode setting item 401, a photo mode setting item 402, a game mode setting item 403 and a manual setting item 404.

The controller 170 can receive a command for adjusting any one of the screen setting items displayed in the second region 182. The controller 170 can change the screen mode of the first content displayed in the first region 181 as the command for adjusting any one of the screen setting items is received.

Figure 18B:
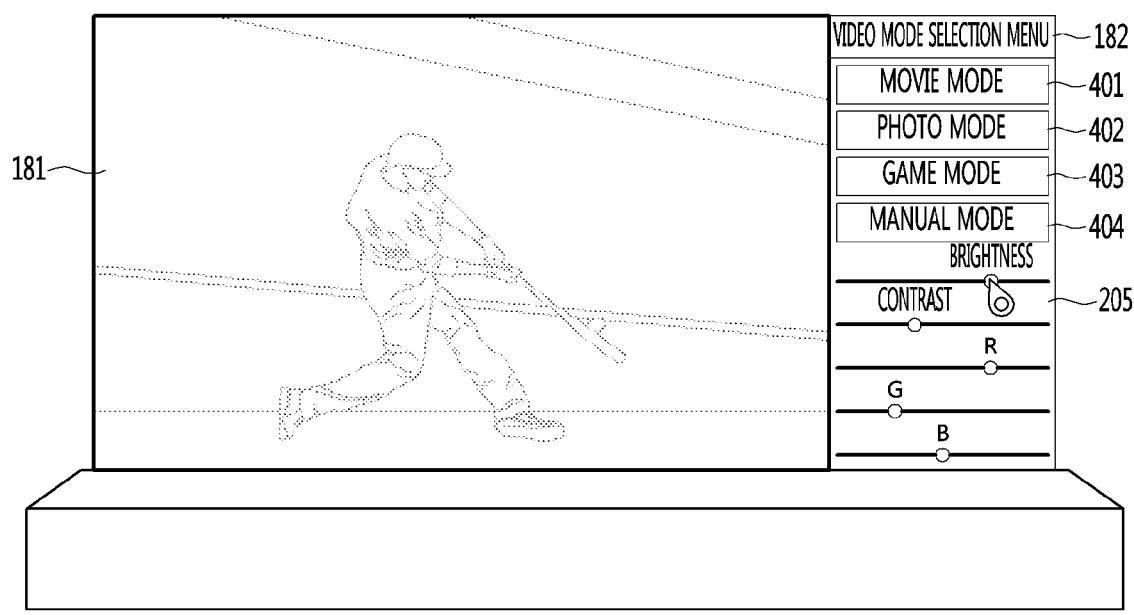

For example, referring to FIG. 18B, the controller 170 can receive a command for adjusting brightness of the manual setting item 404 displayed in the second region 182 and change brightness of the first content displayed in the first region 181. The display device 100 may display the screen adjustment result while adjusting the screen mode through the screen setting item displayed in the added second region 182. The user can easily set the screen mode through the screen adjustment result and the screen setting item respectively displayed in the first region 181 and the second region 182.

Next, a method of displaying content according to a display-unit withdrawal command according to a second embodiment of the present invention will be described with reference to FIGS. 19A and 19B. The controller 170 can receive the display-unit withdrawal command and the display-unit withdrawal command may be a channel information display command.

Figure 19A:
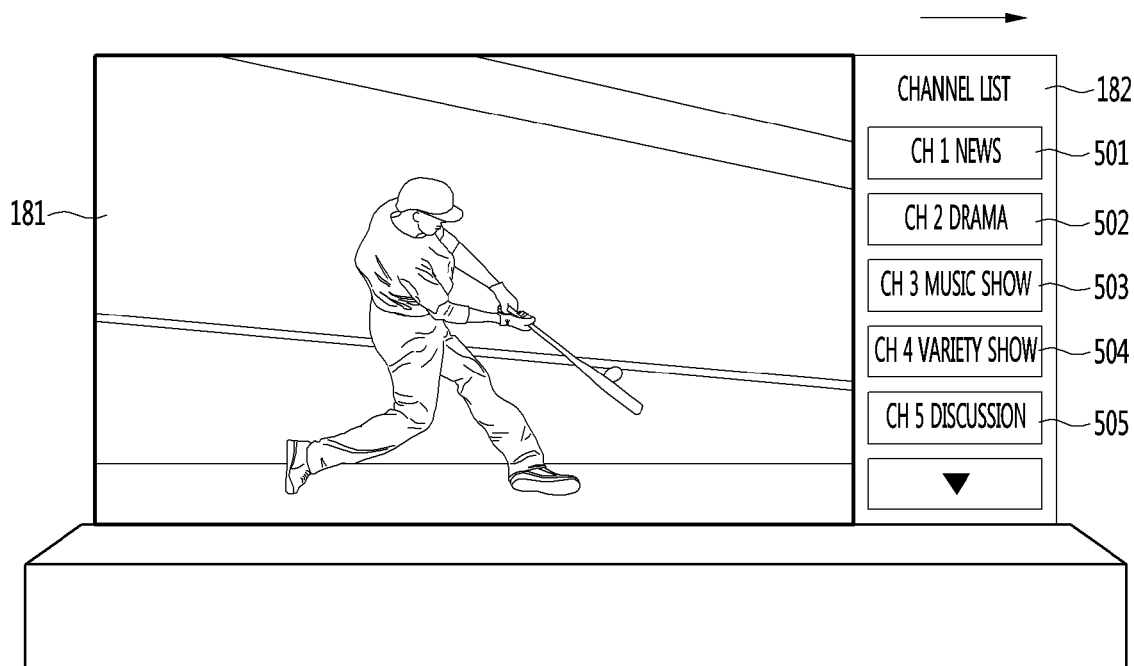
FIGS. 19A and 19B are diagrams illustrating a method of displaying content based on a display-unit withdrawal command according to a second embodiment of the present invention.
Figure 19B:
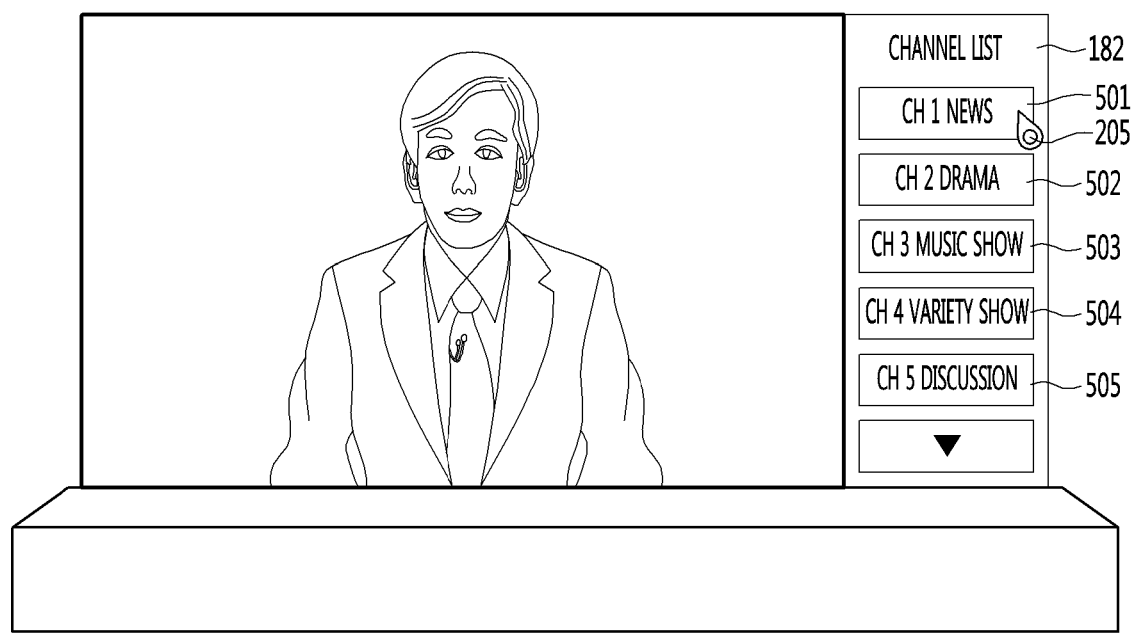

As shown in FIG. 19A, when the channel information display command is received, the controller 170 can withdraw the display unit 180 to add the second region 182. The display unit 180 can display second content in the second region 182 and the second content may include at least one piece of channel information 501, 502, 503, 504 and 505.

The channel information may include at least one of a channel number, a program name and program time information.

The controller 170 can receive a command for selecting any one of the channel information 501, 502, 503, 504 and 505 in the second region 182. When the command for selecting any one of the channel information 501, 502, 503, 504 and 505 is received, the controller 170 can display content corresponding to the selected channel information in the first region 181. For example, referring to FIG. 19B, the controller 170 can receive a command for selecting channel information 501 from among the channel information 501, 502, 503, 504 and 505 through a pointer 203 and display content corresponding to the selected channel information 501 in the first region 181.

The display device 100 can receive a command for selecting any one of the channel information displayed in the second region 182 to immediately display the channel in the first region 181. The user can easily change the channel through the channel information displayed in the added second region 182.

Next, a method of displaying content based on a display-unit withdrawal command according to a third embodiment of the present invention will be described with reference to FIG. 20. The controller 170 can receive the display-unit withdrawal command and the display-unit withdrawal command may be a time shift execution command.

Figure 20:
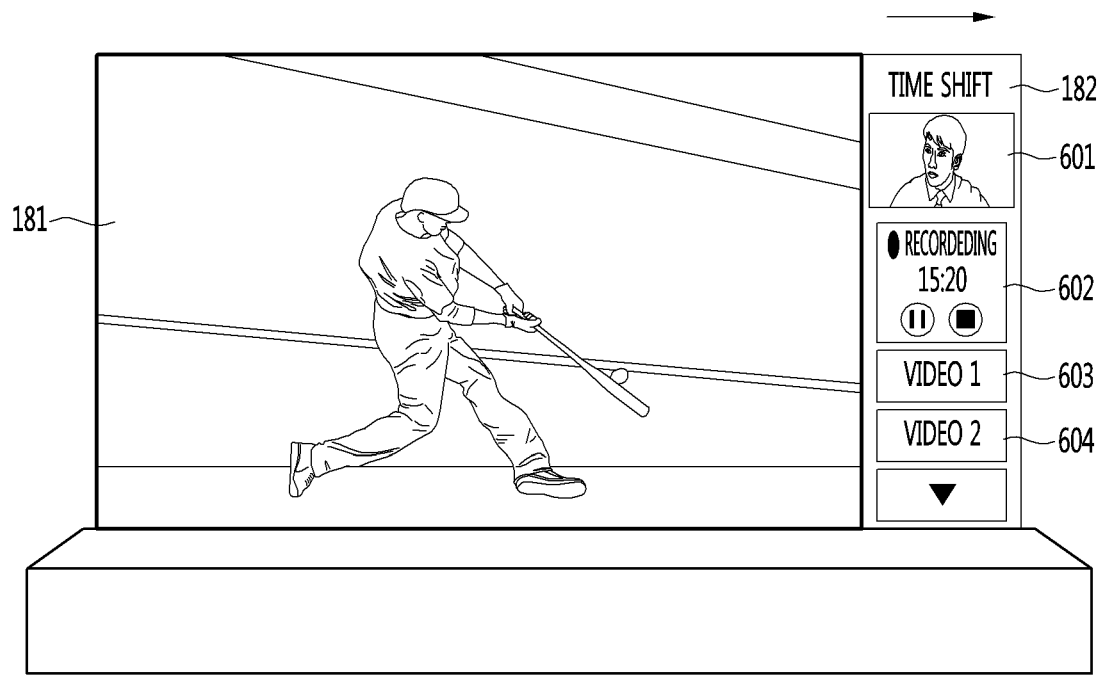
FIG. 20 is a diagram illustrating a method of displaying content based on a display-unit withdrawal command according to a third embodiment of the present invention.

As shown in FIG. 20, when the time shift execution command is received, the controller 170 can withdraw the display unit 180 to add the second region 182. The display unit 180 can display second content in the second region 281 and the second content may include time shift execution information. More specifically, the time shift execution information may include at least one of a recorded time shift video 601, recording information 602 and stored recordings 603 and 604.

The controller 170 can display the first content in the first region 181 and, at the same time, display the time shift execution information in the second region 182. The user can simultaneously view the first content and the recorded time shift video and control recording of the time shift video.

Next, a method of displaying content a display-unit withdrawal command according to a fourth embodiment of the present invention will be described with reference to FIG. 21. The controller 170 can receive the display-unit withdrawal command and the display-unit withdrawal command may be an IOT state display command.

Figure 21:
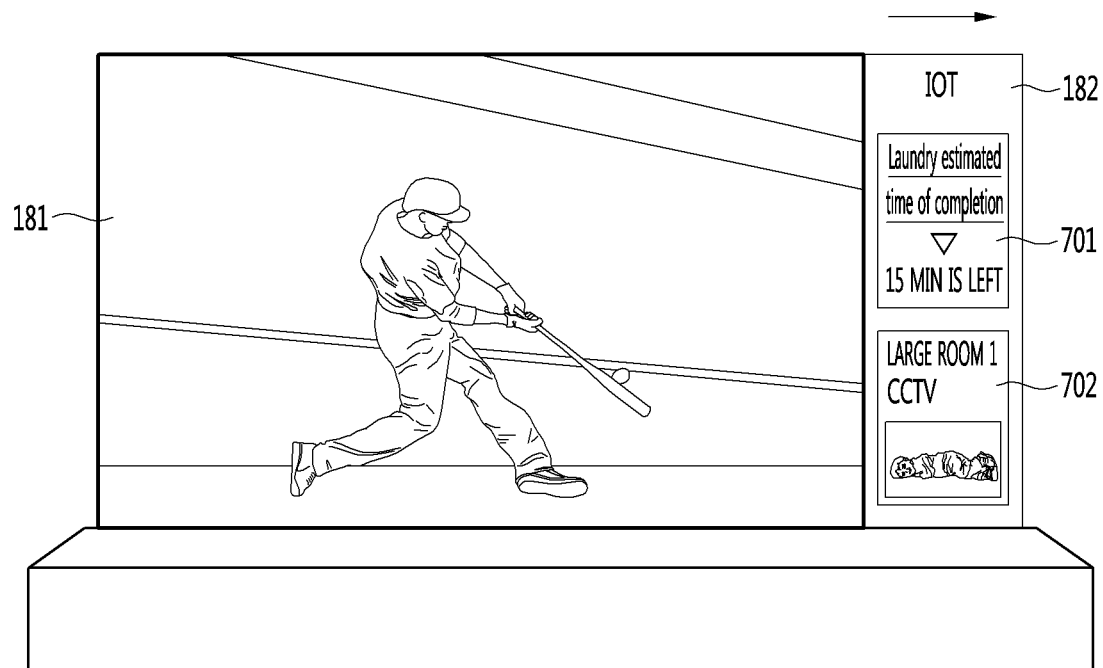
FIG. 21 is a diagram illustrating a method of displaying content based on a display-unit withdrawal command according to a fourth embodiment of the present invention.

As shown in FIG. 21, when the IOT state display command is received, the controller 170 can withdraw the display unit 180 to add the second region 182. The display unit 180 can display second content in the second region 182 and the second content may include IOT state information. More specifically, the IOT state information means the state information of an external device connected to the display device 100 and may include information on a washing machine, air conditioner, air purifier, camera, CCTV, etc. connected to the display device 100.

For example, the display unit 180 can display the first content in the first region 181 and display state information 701 of the washing machine connected to the display device 100, CCTV information 702, etc. in the second region 182. The user can check the state of the external device connected to the display device 100 along with the first content such as broadcast video. That is, the user can check the state of the external device while viewing content, without stopping viewing of the content in order to check the state of the external device.

Next, a method of displaying content based on a display-unit withdrawal command according to a fifth embodiment of the present invention will be described with reference FIGS. 22A and 22B. The controller 170 can receive the display-unit withdrawal command and the display-unit withdrawal command may be a subtitle display command.

According to one embodiment, the subtitle display command may be received through a button provided in the remote control device 200. According to another embodiment, the subtitle display command may be received as the controller 170 senses a subtitle included in di splayed content.

Figure 22A:
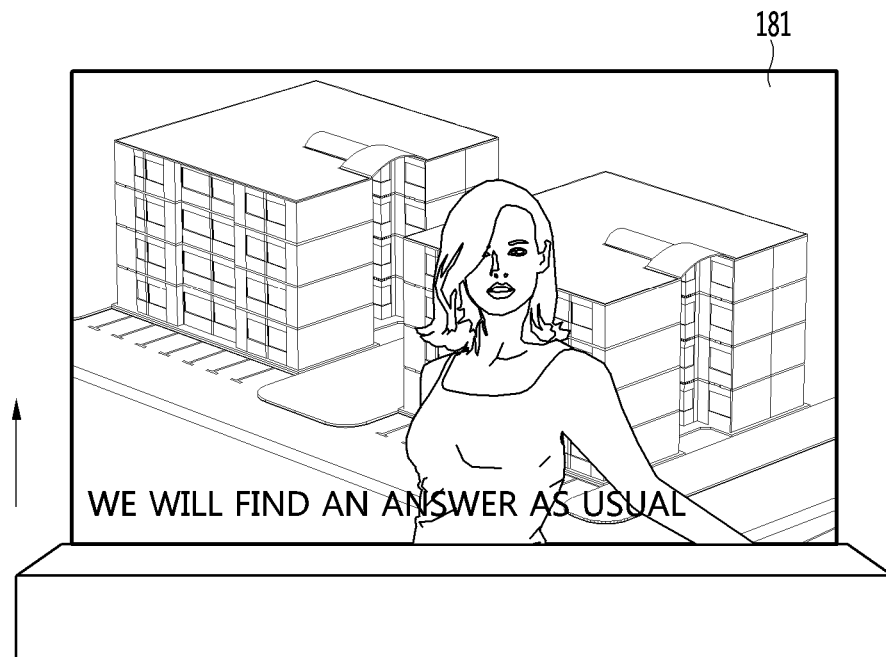
FIGS. 22A and 22B are diagrams illustrating a method of displaying content based on a display-unit withdrawal command according to a fifth embodiment of the present invention.
Figure 22B:
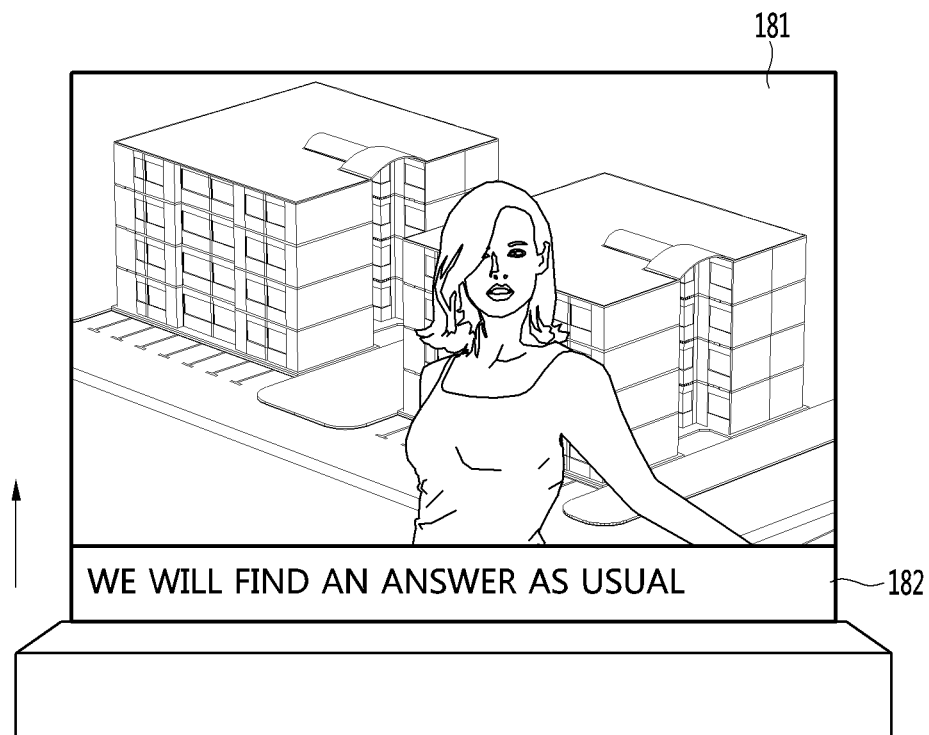

As shown in FIG. 22A, the controller 170 can display first content including a subtitle. When the subtitle display command is received, the controller 170 can withdraw the display unit 180 to add the second region 182 as shown in FIG. 22B. The display unit 180 can display second content in the second region 182 and the second content may include the subtitle of the first content displayed in the first region 181.

The display unit 180 can display the subtitle in the second region 182 which does not overlap the first content while maintaining the size and aspect ratio of the first content. The user can easily view the subtitle of the first content displayed in a region different from that of the first content along with the first content.

Next, a method of displaying content based on a display-unit withdrawal command according to a sixth embodiment of the present invention will be described with reference to FIGS. 23A to 24B. The controller 170 can receive the display-unit withdrawal command and the display-unit withdrawal command may be an aspect-ratio change command.

According to one embodiment, the aspect-ratio change command may be received through a button provided in the display unit 180, the remote control device 200, etc. According to one embodiment, the aspect-ratio change command may be a content display command having an aspect ratio different from that of the first region 181. When the content display command is received, the controller 170 can display content in the first region 181.

The aspect ratio of the content corresponding to the content display command may be different from that of the first region 181. For example, if the content corresponding to the content display command is content having a special aspect ratio (21:9), such as I-MAX video or soccer video, the aspect ratio of the content may be different from that of the first region 181. The controller 170 can display first content, a portion of which is omitted to suit the aspect ratio of the first region 181, in the first region 181.

Figure 23A:
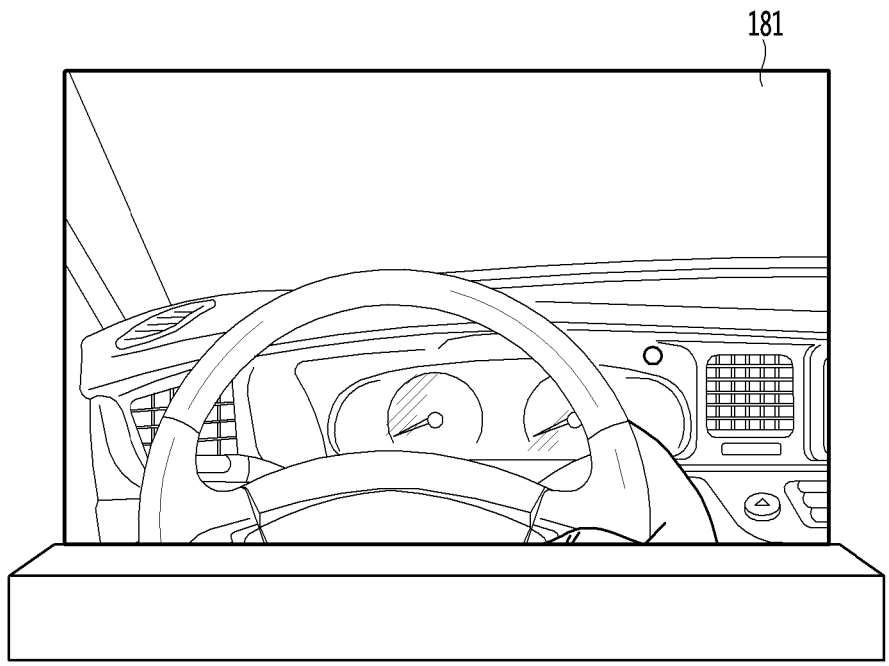
FIGS. 23A and 23B are diagrams illustrating a first example of a method of displaying content based on a display-unit withdrawal command according to a sixth embodiment of the present invention.
Figure 23B:
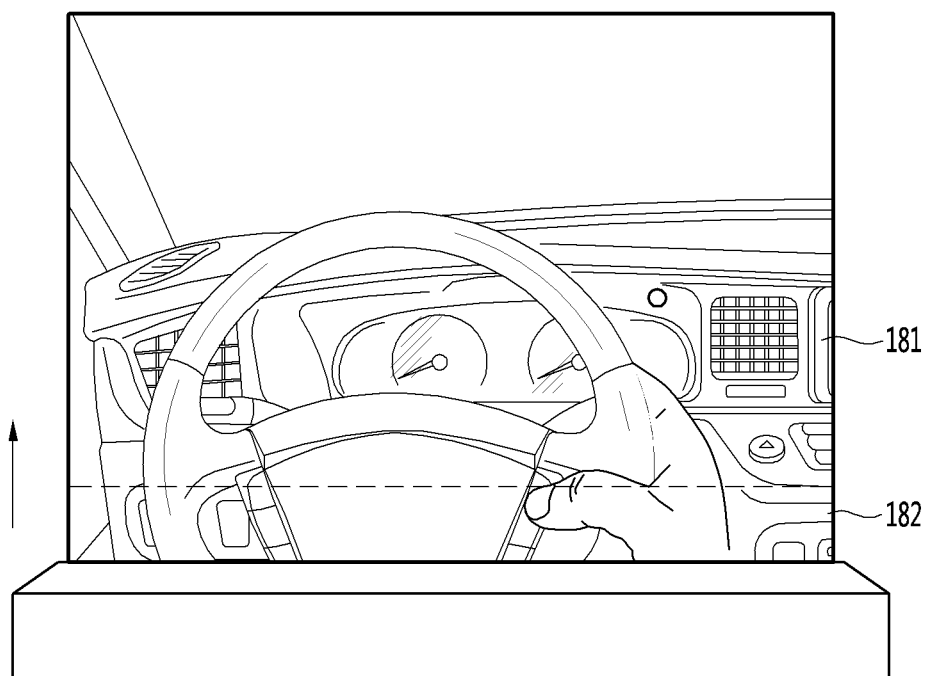

According to one embodiment, as shown in FIG. 23A, the display unit 180 can display the first content, an upper or lower portion of which is omitted. When the aspect ratio of the content is recognized, the controller 170 can withdraw the display unit 180 in the vertical direction to add the second region 182 based on the aspect ratio of the content, in order not to omit the portion of the content, as shown in FIG. 23B. The controller 170 can display the first content, the portion of which is omitted, in the first region 181 and display the second content, which is the omitted content, in the second region 182.

Figure 24A:
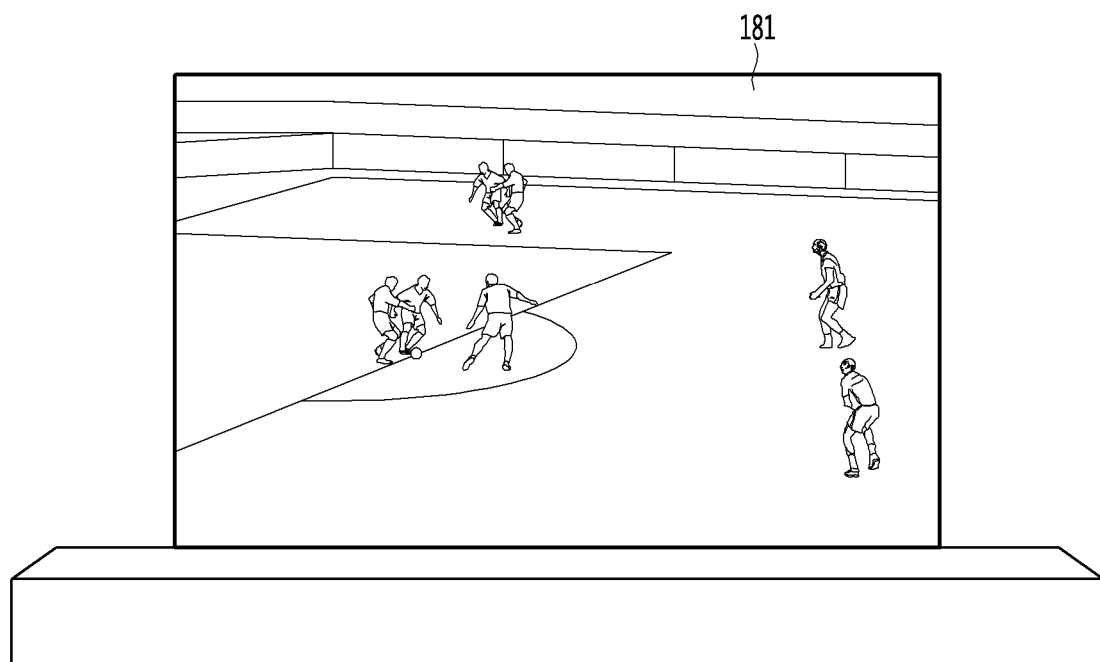
FIGS. 24A and 24B are diagrams illustrating a second example of a method of displaying content based on a display-unit withdrawal command according to a sixth embodiment of the present invention.
Figure 24B:
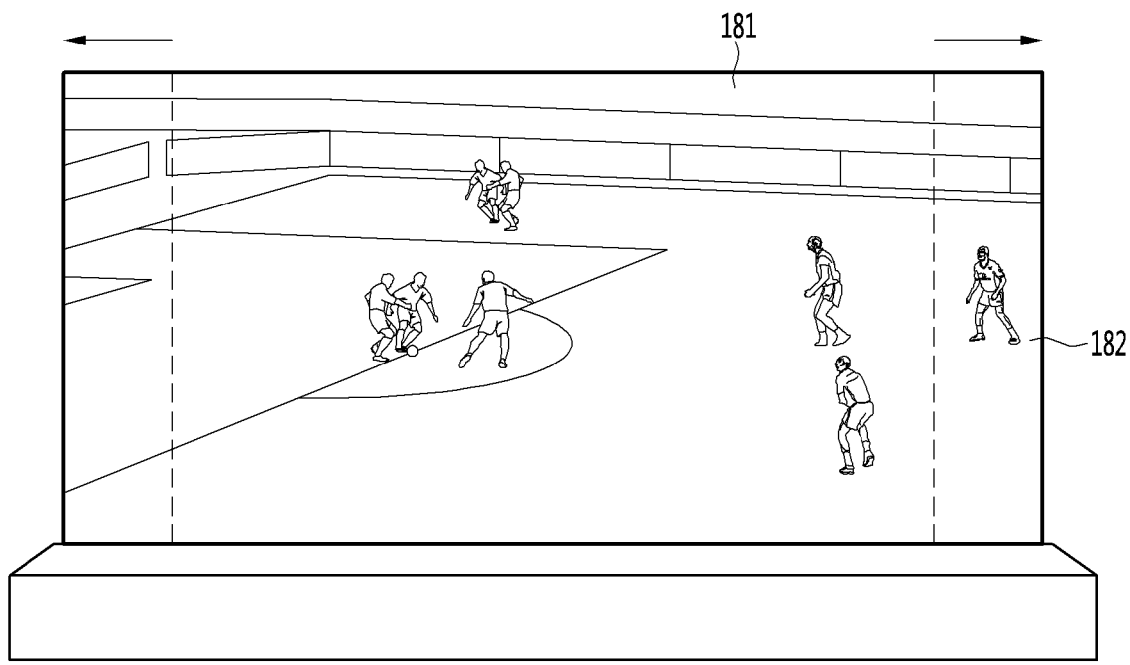

According to another embodiment, as shown in FIG. 24A, the display unit 180 can display the first content, a left or right region of which is omitted. When the aspect ratio of the content is recognized, the controller 170 can withdraw the display unit 180 in the horizontal direction to add the second region 182 based on the aspect ratio of the content, in order not to omit the portion of the content as shown in FIG. 24B.

The controller 170 can display the first content, the portion of which is omitted, in the first region 181 and display the second content, which is the omitted content, in the second region 182.

The display unit 180 can display the content without omission, when the content display command having the aspect ratio different from that of the first region 181 is received. Meanwhile, the controller 170 can further withdraw the display unit 180 to add a new region, when a display-unit withdrawal command is received in a state of withdrawing the display unit 180, as described above.

Hereinafter, a method of displaying content based on a display-unit withdrawal command will be described with reference to FIG. 6B. The controller 170 can sense whether the display-unit withdrawal command is received in a state of adding the second region (S57). When the display-unit withdrawal command is received in a state of adding the second region, the controller 170 can withdraw the display unit 180 to generate a third region (S59), and display third content in the third region (S61).

Figure 25A:
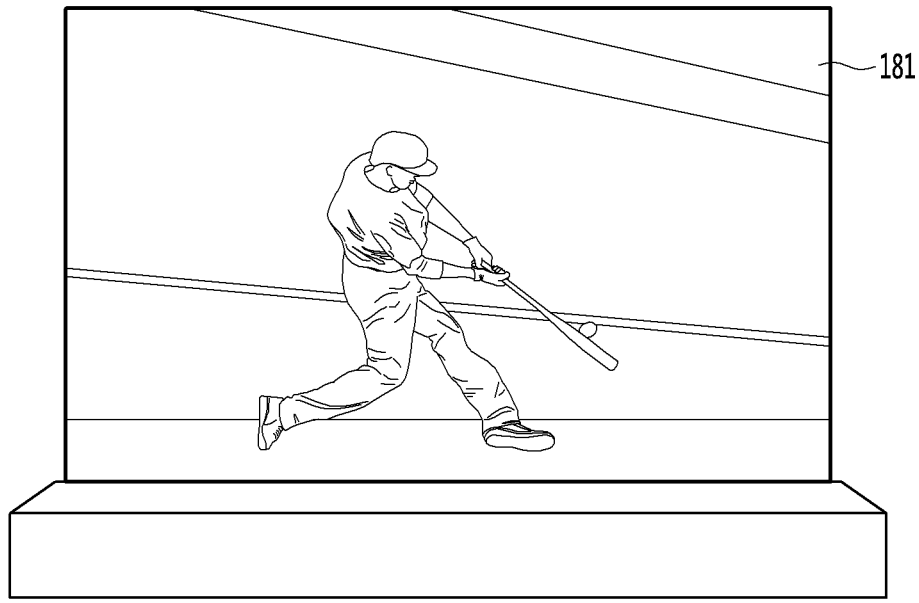
FIGS. 25A to 25C are diagrams illustrating a method of displaying content based on a display-unit withdrawal command according to a seventh embodiment of the present invention.

Next, a method of displaying content based on a display-unit withdrawal command according to a seventh embodiment of the present invention will be described with reference to FIGS. 25A to 25C. As shown in FIG. 25A, the display unit 180 can display the first content in the first region 181. The controller 170 can receive a display-unit withdrawal command in a state of displaying the first content and the display-unit withdrawal command may be a user setting information display command.

Here, the user setting information display command may mean a command for displaying predetermined content in a region added by withdrawing the display unit 180. The controller 170 can set display of at least one of public transportation information, road traffic information, weather information, popular news information, stock information and shopping information. The controller 170 can display predetermined content according to a user input command or display the above-described content randomly or in predetermined order.

Figure 25B:
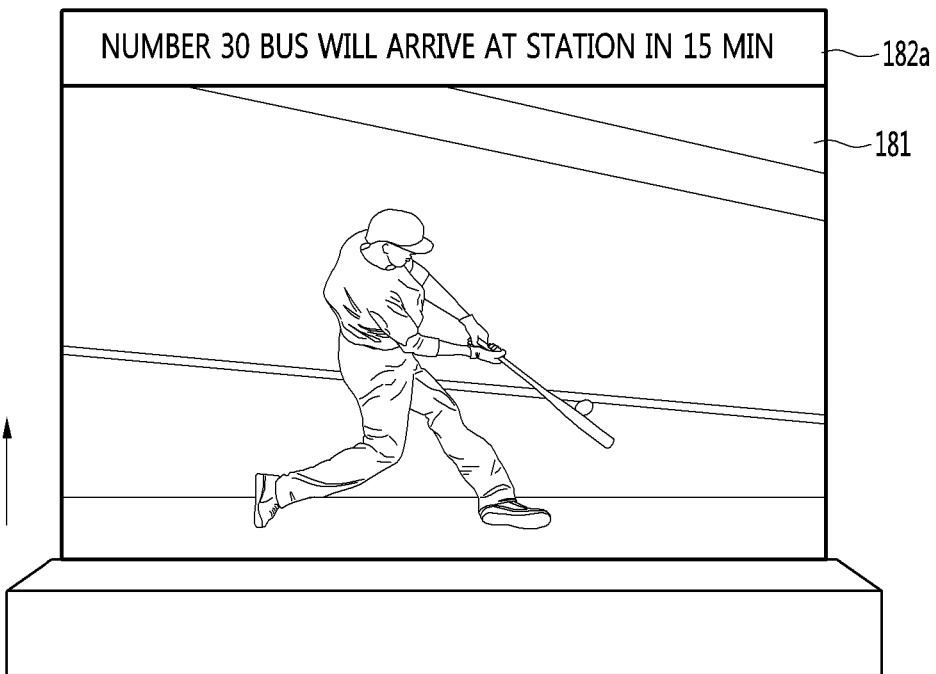
Figure 25C:
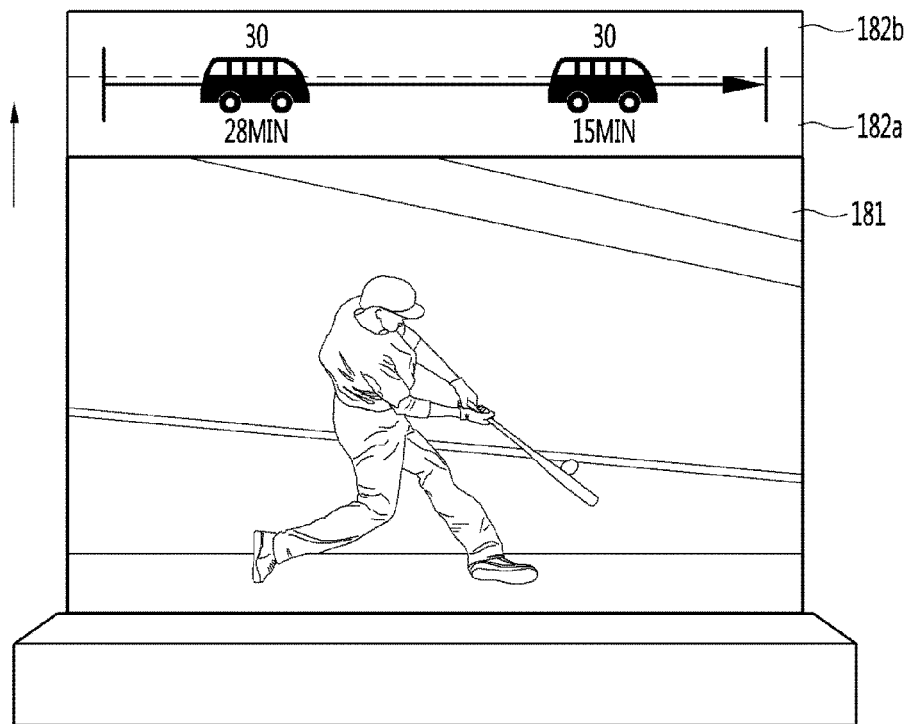

In the example shown in FIG. 25B, the controller 170 can withdraw the display unit 180 to add the second region 182a according to the user setting information display command and display the second content such as public transportation information in the second region 182a. As shown in FIG. 25C, when a display-unit withdrawal command is received in a state of adding the second region 182a, the controller 170 can withdraw the display unit 180 to add a third region 182b. The display unit 180 can display third content in the third region 182b. The third content may be related to the second content. Alternatively, the third content may not be related to the second content.

According to one embodiment, when a display-unit withdrawal command is received in a state of displaying the second content composed of only text in the second region 182a, the controller 170 can display third content composed of text and an image in the second region 182a and the third region 182b. Here, the third content may indicate the same information as the second content but may be different from the second content in terms of representation format. A predetermined amount of information can be displayed based on the size of the display unit 180. That is, if the size of the display unit 180 is further increased, a larger amount of information can be displayed.

Figure 26A:
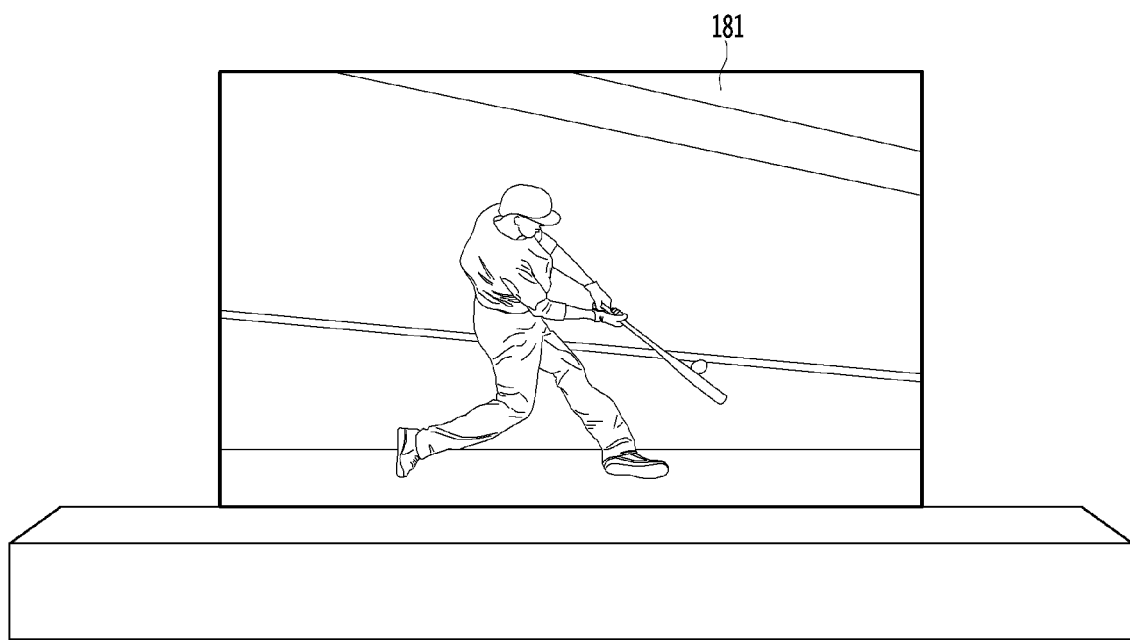
FIGS. 26A to 26C are diagrams illustrating a first example of a method of displaying content based on a display-unit withdrawal command according to an eighth embodiment of the present invention.

Next, a method of displaying content based on a display-unit withdrawal command according to an eighth embodiment of the present invention will be described with reference to FIGS. 26A to 26C. As shown in FIG. 26A, the display unit 180 can display the first content in the first region 181. The controller 170 can receive a display-unit withdrawal command in a state of displaying the first content and the display-unit withdrawal command may be a content related information display command.

Here, the content related information display command may mean a command for displaying information related to content which is currently being displayed in a region added by withdrawing the display unit 180. When the content related information display command is received, the controller 170 can search for information related to the previously displayed content and perform control to display the searched result on the display unit 180.

Figure 26B:
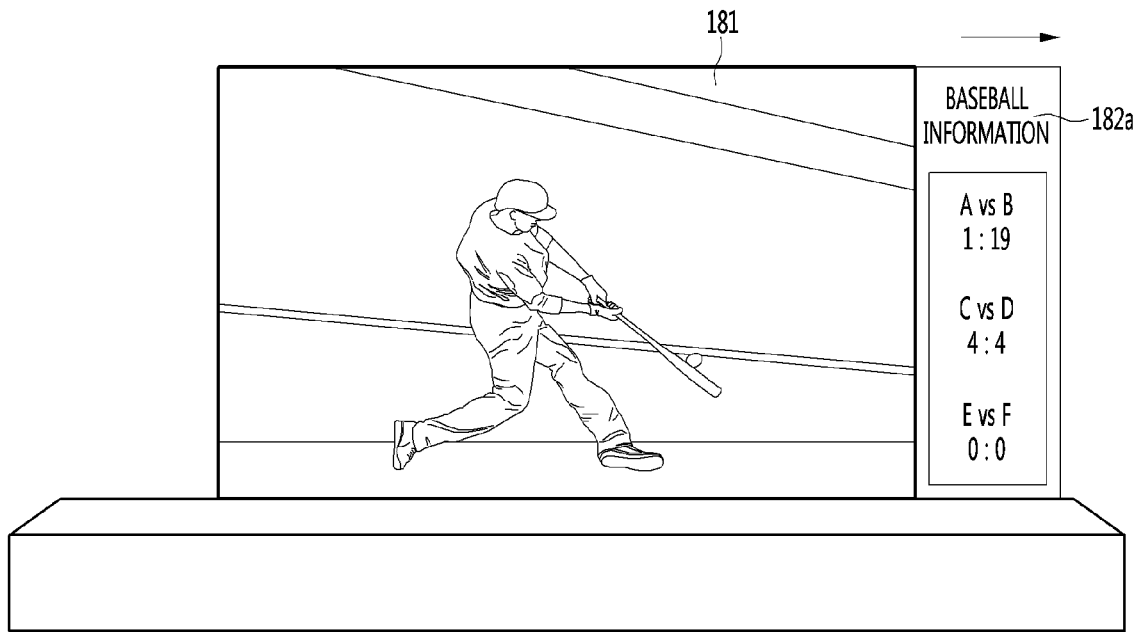

As shown in FIG. 26B, when the content related information display command is received, the controller 170 can withdraw the display unit 180 to add the second region 182a. The display unit 180 can display the second content in the second region 182a and the second content may be related to the first content which is being displayed in the first region 181. For example, if the first content is baseball video, the second content may be baseball score information.

Figure 26C:
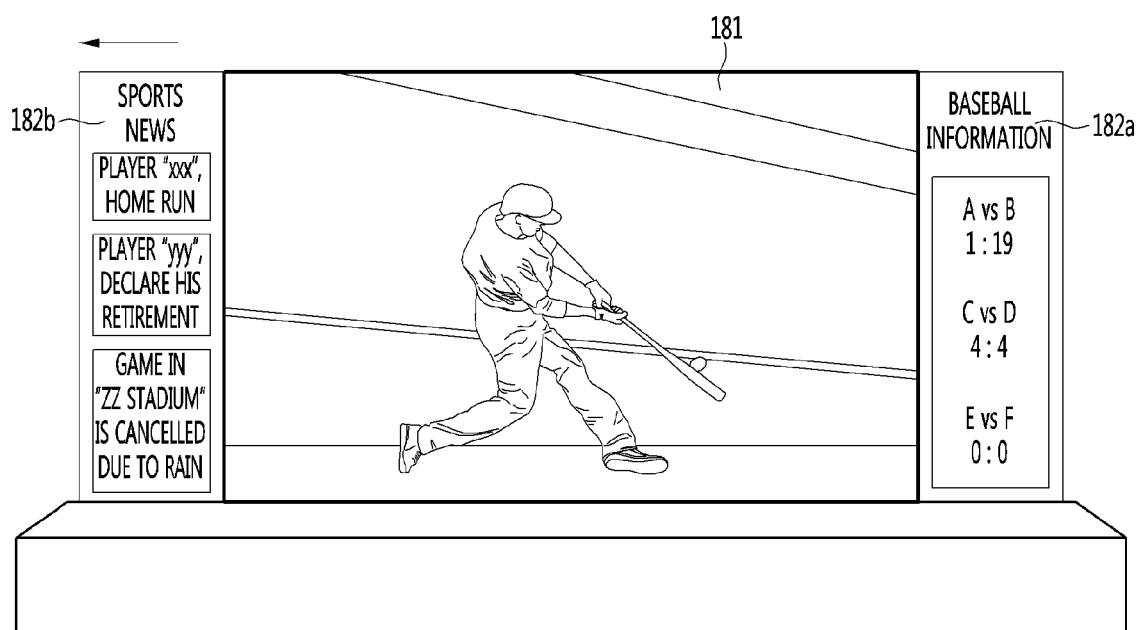

In addition, as shown in FIG. 26C, when the content related information display command is received in a state of adding the second region 182a, the controller 170 can withdraw the display unit 180 to add a third region 182b. The display unit 180 can display third content in the third region 182b and the third content may be related to the second content which is being displayed in the second region 182a. For example, if the second content is baseball score information, the third content may be sports related information.

Therefore, the display device 100 can provide the user with information related to the content which is currently being displayed step by step. In addition, the display device 100 can display content related information while hiding content which is currently being displayed. The user can easily acquire information related to the content while viewing the content.

Figure 27A:
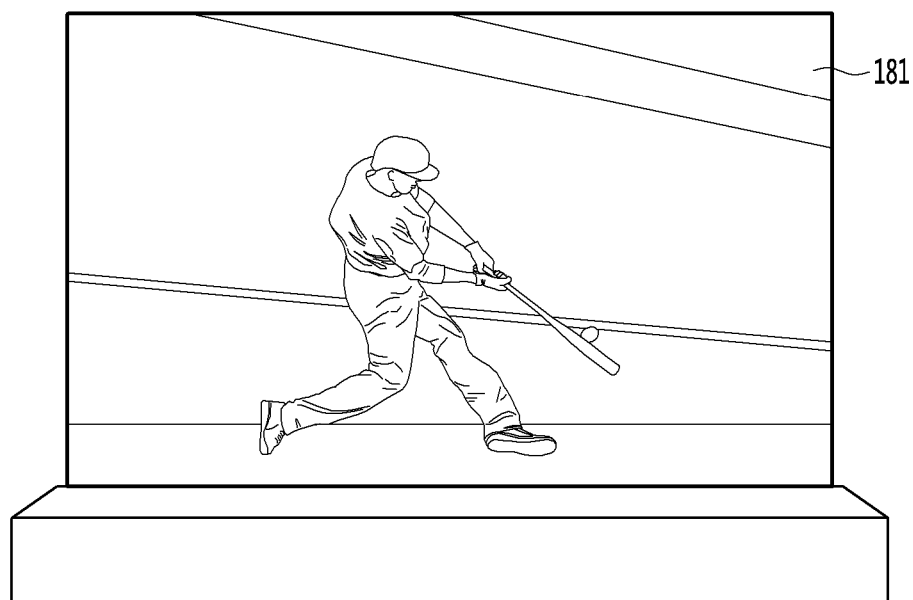
FIGS. 27A to 27C are diagrams illustrating a second example of a method of displaying content based on a display-unit withdrawal command according to an eighth embodiment of the present invention.
Figure 27B:
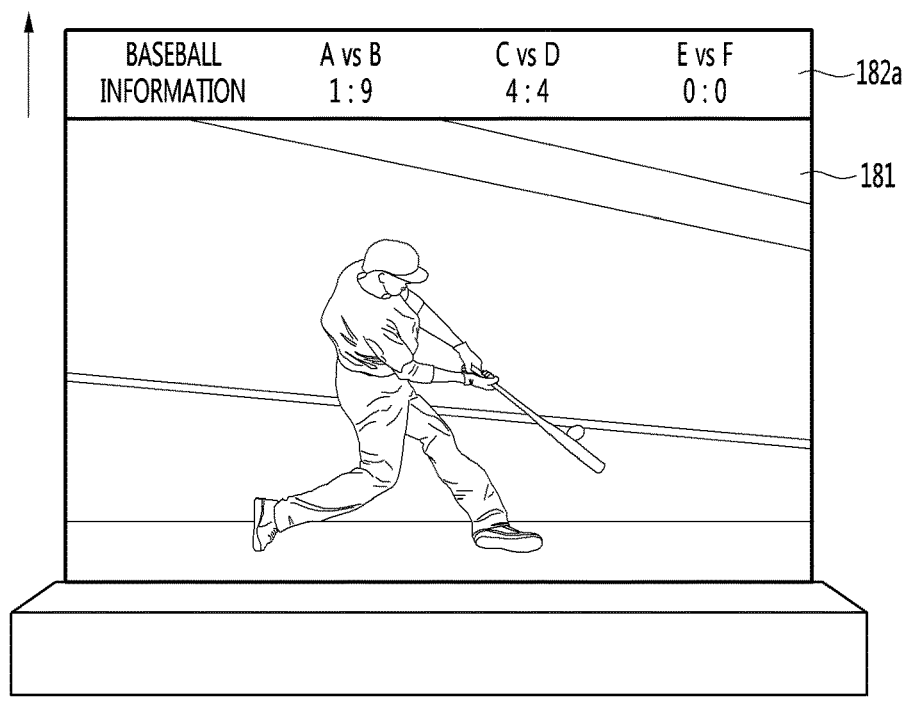

According to another embodiment, the controller 170 can receive a display-unit withdrawal command in a state of displaying the first content in the first region 181 as shown in FIG. 27A. Referring to FIG. 27B, when the display-unit withdrawal command is received, the controller 170 can add a second region 182a to display information related to the first content.

Figure 27C:
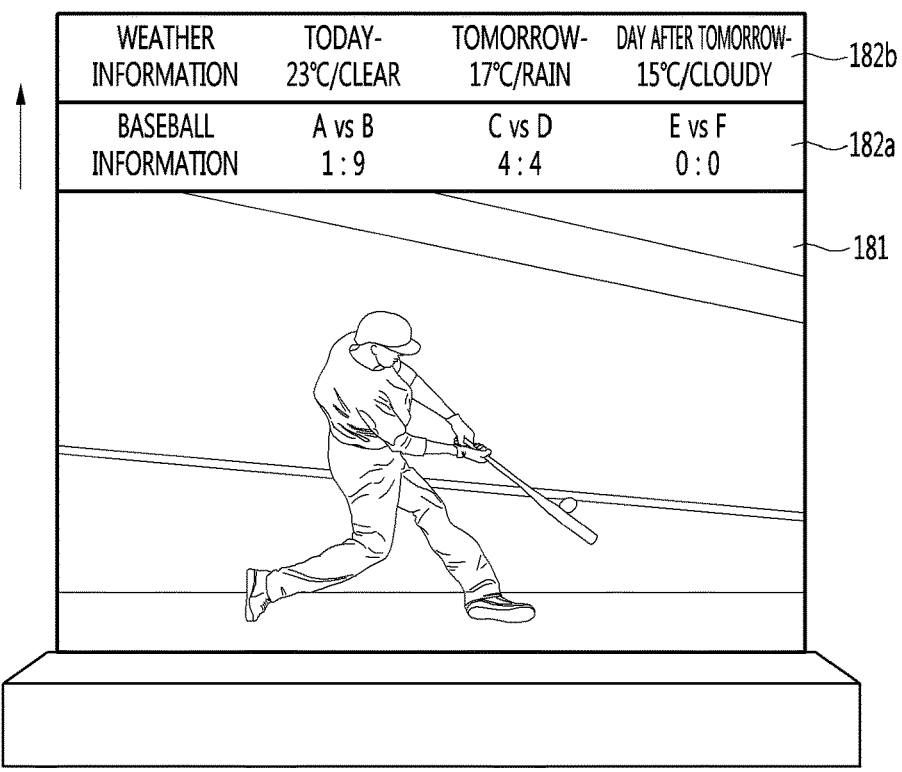

Referring to FIG. 27C, when a display-unit withdrawal command is further received in a state of adding the second region 182a, the controller 170 can add a third region 182b and the display unit 180 can display predetermined content described with reference to FIGS. 25A to 25C, such as weather information, in the third region 182b. Therefore, the display device 100 can display not only information related to the currently displayed content but also external information according to the display-unit withdrawal command.

Figure 28A:
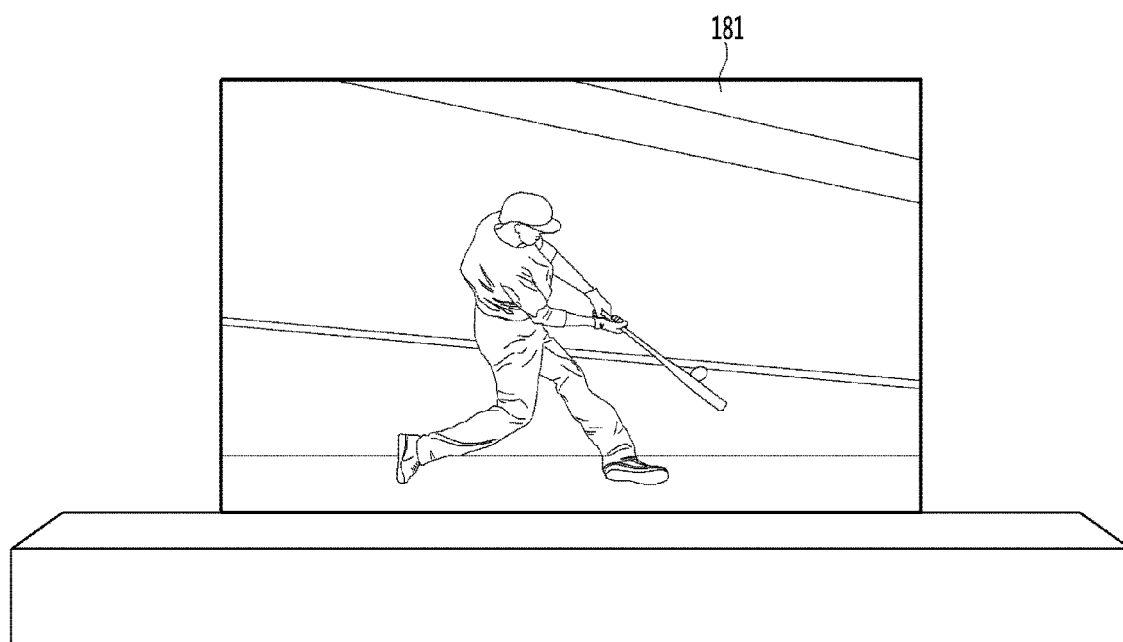
FIGS. 28A to 28C are diagrams illustrating a third example of a method of displaying content based on a display-unit withdrawal command according to an eighth embodiment of the present invention.
Figure 28B:
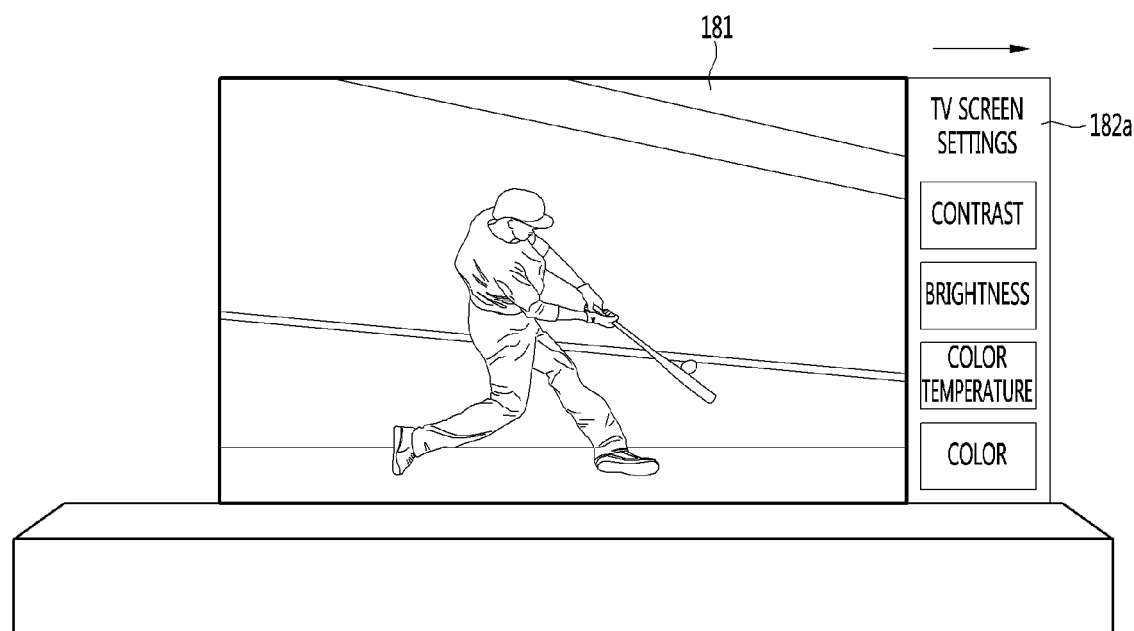

Next, a method of displaying content based on a display-unit withdrawal command according to an eighth embodiment of the present invention will be described with reference to FIGS. 28A to 28C. As shown in FIG. 28A, the display unit 180 can display first content in the first region 181. The controller 170 can receive the display-unit withdrawal command in a state of displaying the first content.

Here, the display-unit withdrawal command may include the display-unit withdrawal command described in the first to seventh embodiments. As shown in FIG. 28B, the controller 170 can withdraw the display unit 180 to add the second region 182a and the display unit 180 can display second content in the second region 182a. For example, the second content may be a screen setting menu. The user may want to acquire information on a portion of the second content displayed in the second region 182a.

The controller 170 can receive a display-unit withdrawal command for displaying information on the portion of the second content displayed in the second region 182a. When a pointer 205 is sensed in one region of the second region 182a, the controller 170 can receive a display-unit withdrawal command for displaying information corresponding to the location of the pointer 205.

Figure 28C:
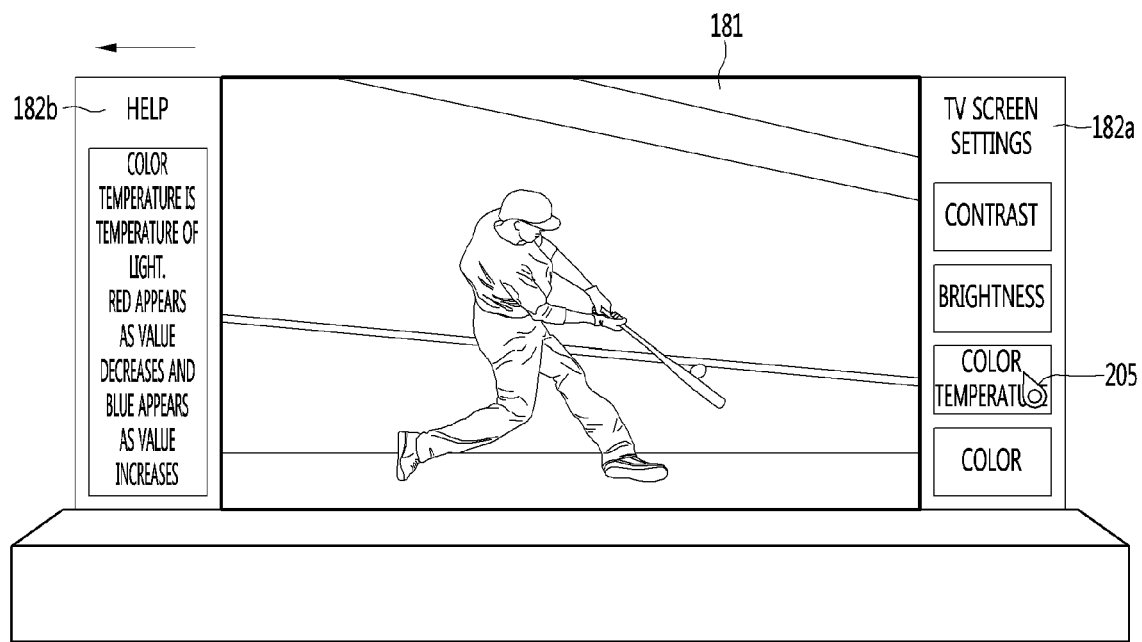

As shown in FIG. 28C, the controller 170 can withdraw the display unit 180 to add the third region 182b and the display unit 180 can display third content, which is information on a portion of the second content, in the third region 182b. Here, the third content may include help information of the second content. Therefore, the display device 100 can immediately display necessary information of the user in another region and the user can simultaneously view content and necessary information.

Next, a method of displaying content based on a display-unit withdrawal command according to a ninth embodiment of the present invention will be described with reference to FIGS. 29A to 29C. The controller 170 can entirely insert the display unit 180. More specifically, the display unit 180 can be wound on the guide bar and the entire display region of the display unit 180 can be wound on the guide bar. The guide bar may be accommodated in a housing 183 shown in FIG. 29A and the housing 183 may be transparent. However, the housing 183 may be merely exemplary and the display device 100 can not include the housing 183.

Figure 29A:
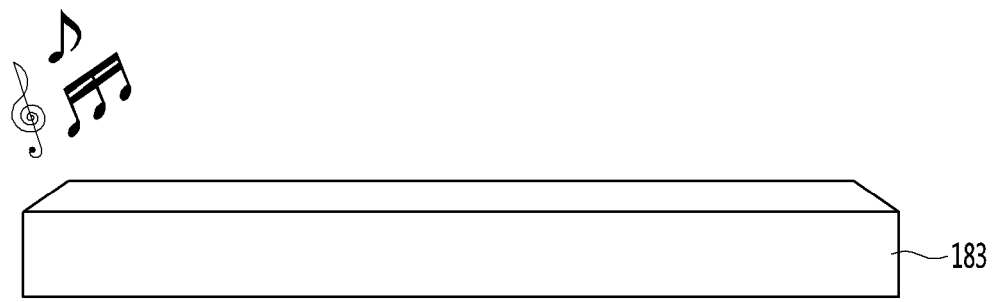
FIGS. 29A to 29C are diagrams illustrating a method of displaying content based on a display-unit withdrawal command according to a ninth embodiment of the present invention.

As shown in FIG. 29A, the entire region of the display unit 180 can be inserted. In particular, when the display device 100 operates in a speaker mode, the display unit 180 can be entirely inserted. The controller 170 can receive an image display command while the display device operates in the speaker mode. The controller 170 can withdraw the display unit 180 when the image display command is received while the display device operates in the speaker mode.

Figure 29B:
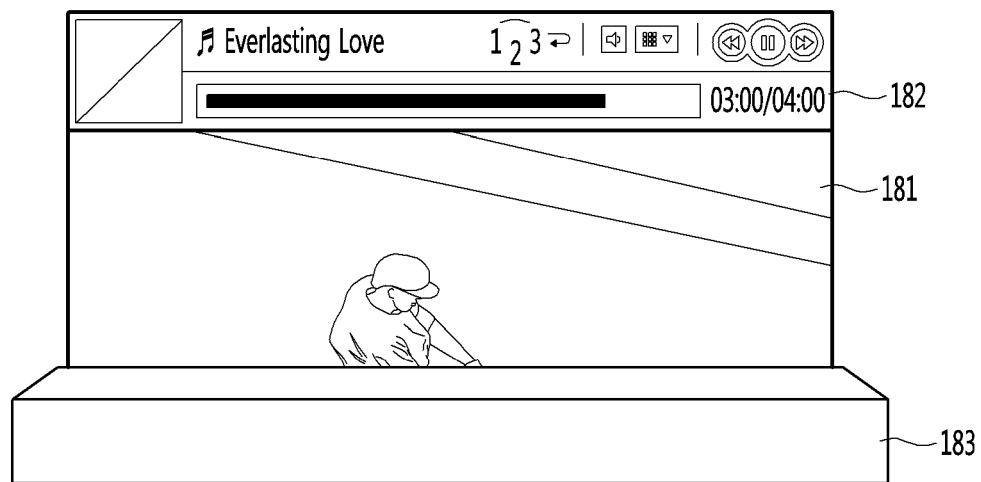

More specifically, as shown in FIG. 29B, the controller 170 can divide the screen into the first region 181 and the second region 182, display content corresponding to the image display command in the first region 181, display an audio controller for controlling the speaker mode in the second region 182, and, at the same time, withdraw the display unit 180.

Figure 29C:
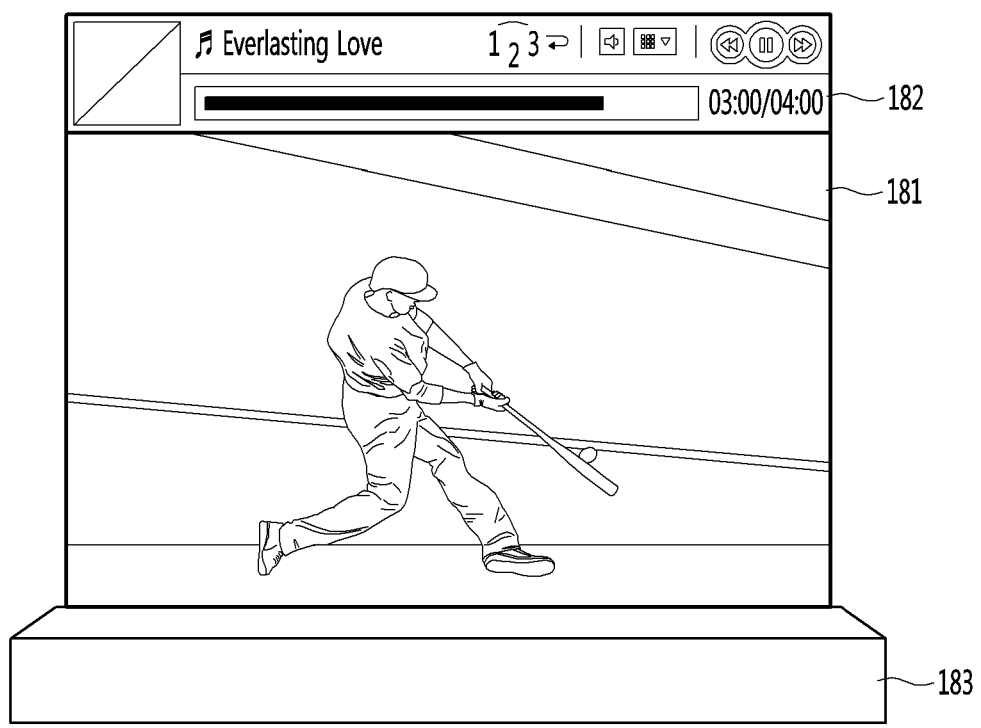

When withdrawal of the display unit 180 is finished, as shown in FIG. 29C, the display unit 180 can display the content in the first region 181 and the audio controller in the second region 182. Therefore, the display device 100 can operate in the speaker mode and, at the same time, display the content. The user can control operation the speaker mode and display of the content on one screen. The type of the above-described display-unit withdrawal command and the type of the displayed content are merely exemplary and thus are not limited thereto.

FIG. 6B will be described again. The controller 170 can sense whether a display-unit insertion command is received (S63). The display-unit insertion command may mean a command for inserting the display unit 180 to remove a region in which the content is currently being displayed.

According to one embodiment, the display-unit insertion command may be an insertion command for specifying a region to be removed. In this instance, the controller 170 can receive the display-unit insertion command including information on the region to be removed and insert the display unit 180 to remove the specified region based on region information.

According to another embodiment, the display-unit insertion command may be an automatic insertion command. For example, the controller 170 can receive a display-unit insertion command through a button provided in the remote control device 200. In this instance, the controller 170 can automatically insert the display unit 180.

When the display-unit insertion command is received, the controller 170 can sense whether the content displayed in the second region may be downsized (S65). More specifically, the controller 170 can analyze the content displayed in the second region in a region having a smaller area than the second region.

When the content displayed in the second region may be downsized, the controller 170 can insert a portion of the display unit 180 to reduce the size of the second region (S67) and display the downsized content in the downsized second region (S69). When the content displayed in the second region may be downsized, the controller 170 can insert the display unit 180 based on the size of the content to be reduced. That is, the controller 170 can insert a portion of the display unit 180 such that the size of the second region is equal to that of the content to be downsized.

Figure 30A:
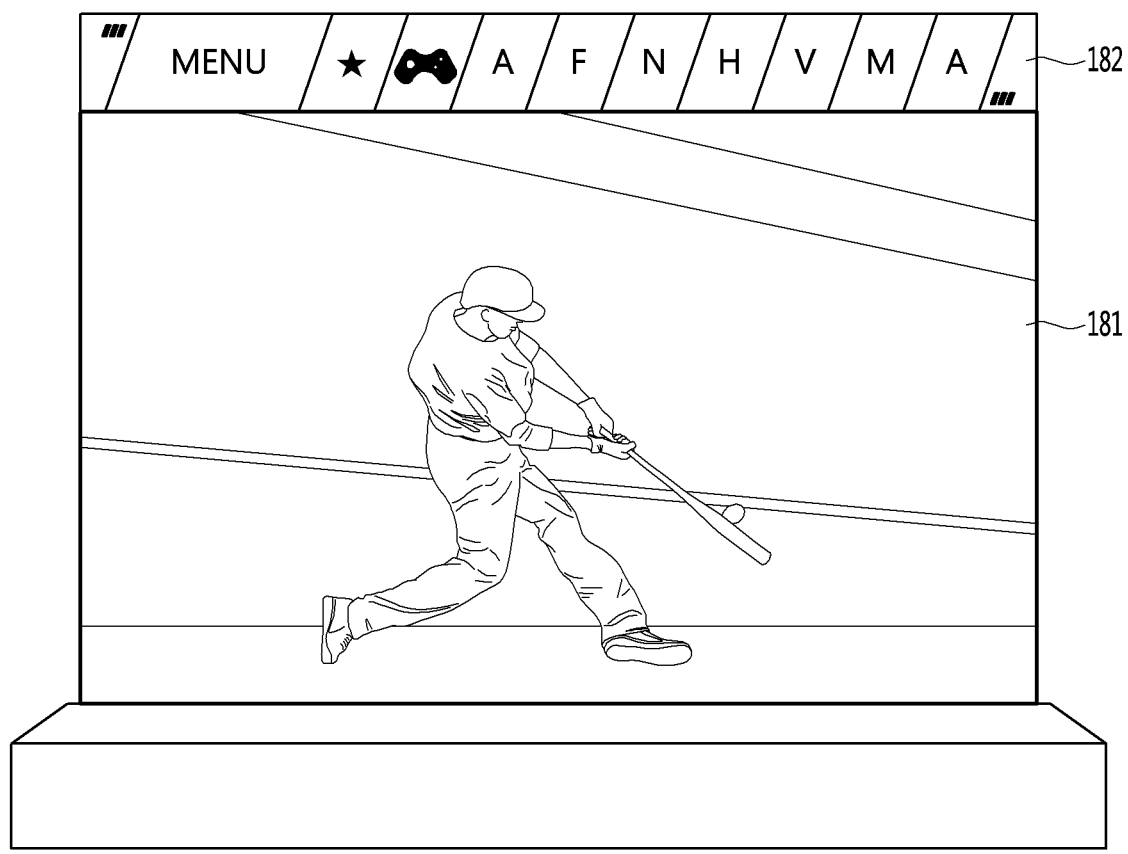
FIGS. 30A to 30C are diagrams illustrating an operation method based on a display-unit insertion command according to an embodiment of the present invention.
Figure 30B:
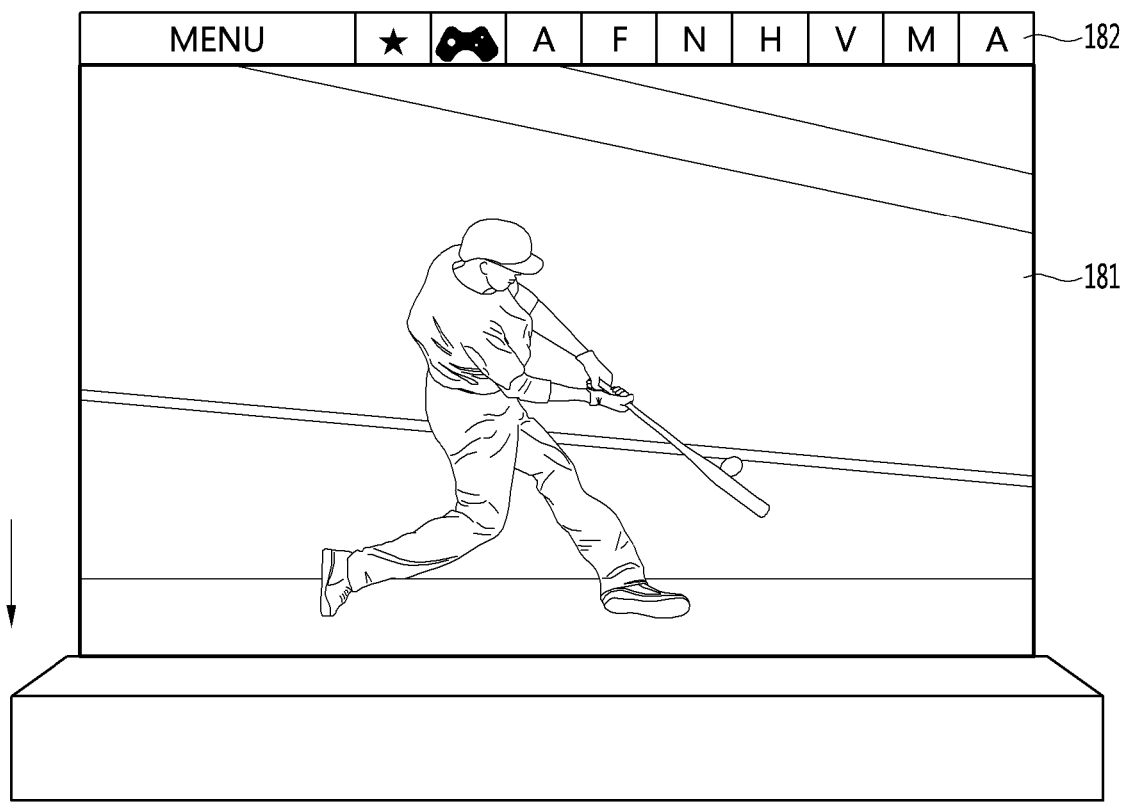
Figure 30C:
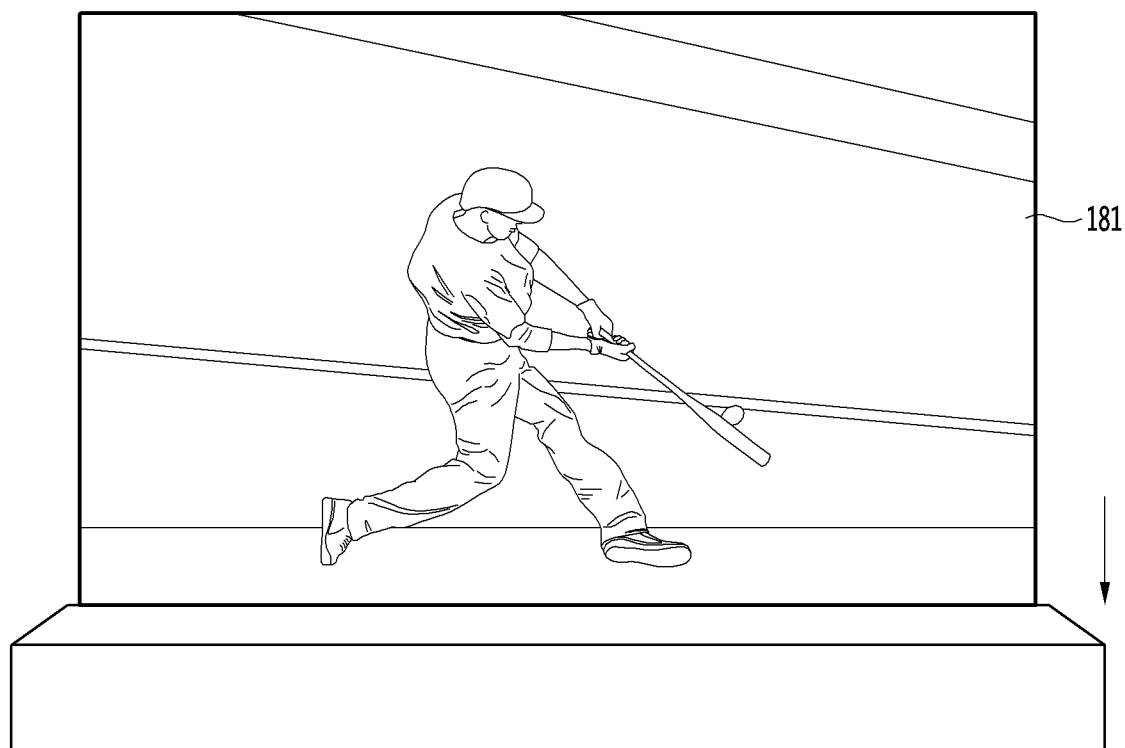

Next, an operation method based on a display-unit insertion command according to an embodiment of the present invention will be described with reference to FIGS. 30A to 30C. As shown in FIG. 30A, the controller 170 can display first content in the first region 181 and display second content in the second region (182). When the display-unit insertion command is received, the controller 170 can determine whether the second content may be downsized.

The controller 170 can insert a portion of the display unit 180 when the second content may be downsized. As shown in FIG. 30B, the display unit 180 can downsize and display the second content in the second region 182 downsized as the portion of the display unit is inserted. In contrast, when the second content may not be downsized, the controller 170 can entirely insert the display unit corresponding to the second region. That is, as shown in FIG. 30C, the controller 170 can insert the display unit 180 to remove the second region 182.

Figure 31A:
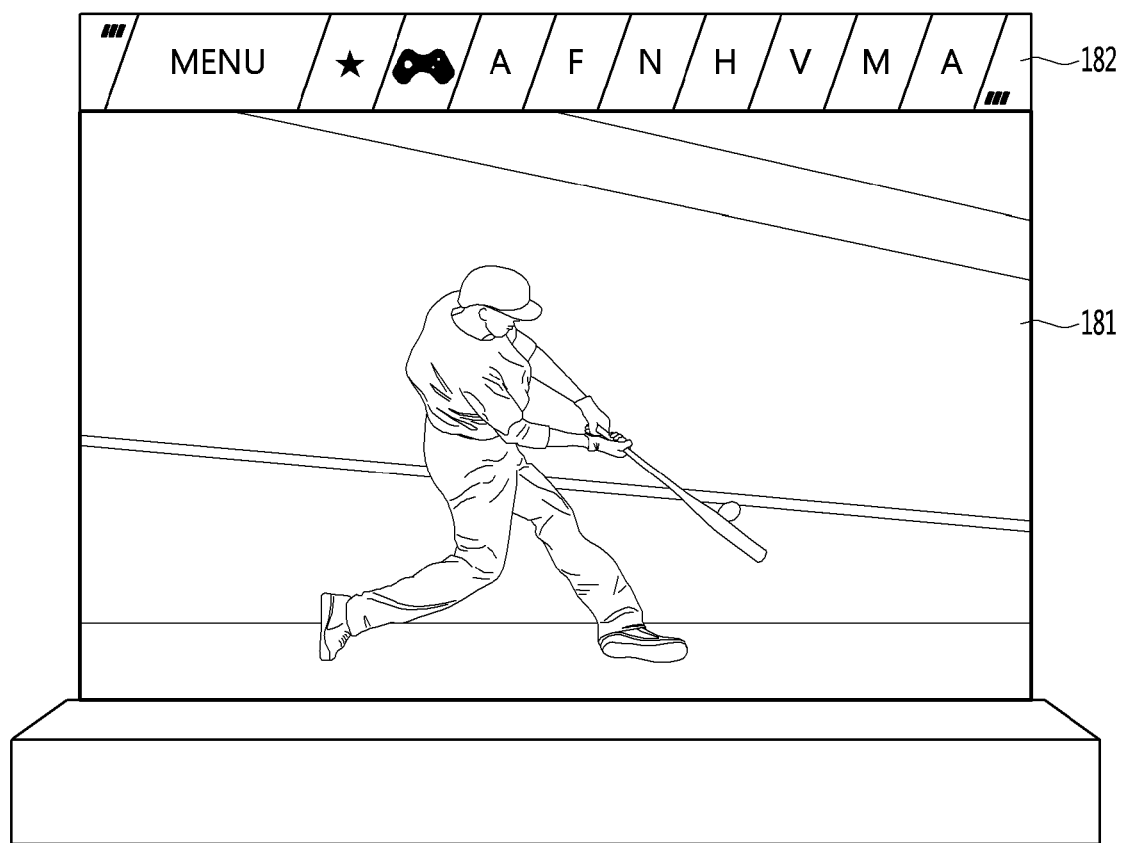
FIGS. 31A to 31C are diagrams illustrating a method of displaying content according to a viewing mode entrance command according to a first embodiment of the present invention.
Figure 31B:
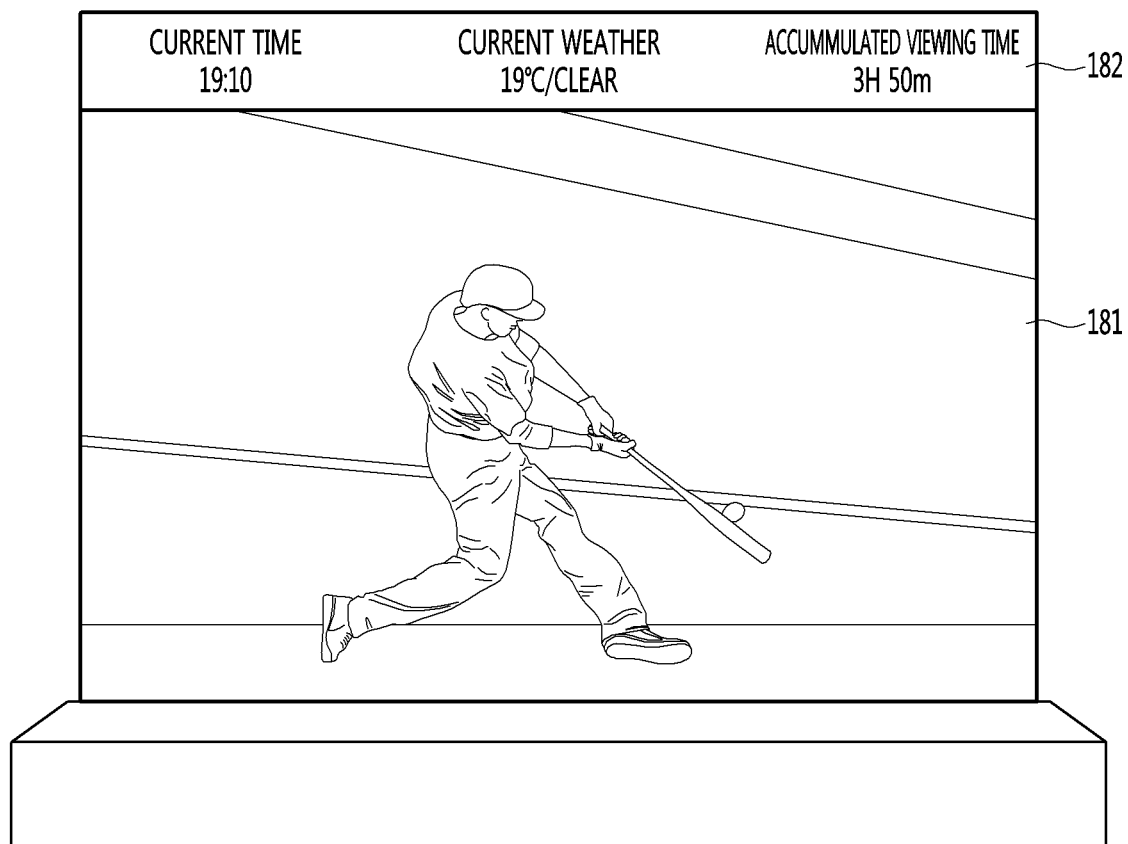
Figure 31C:
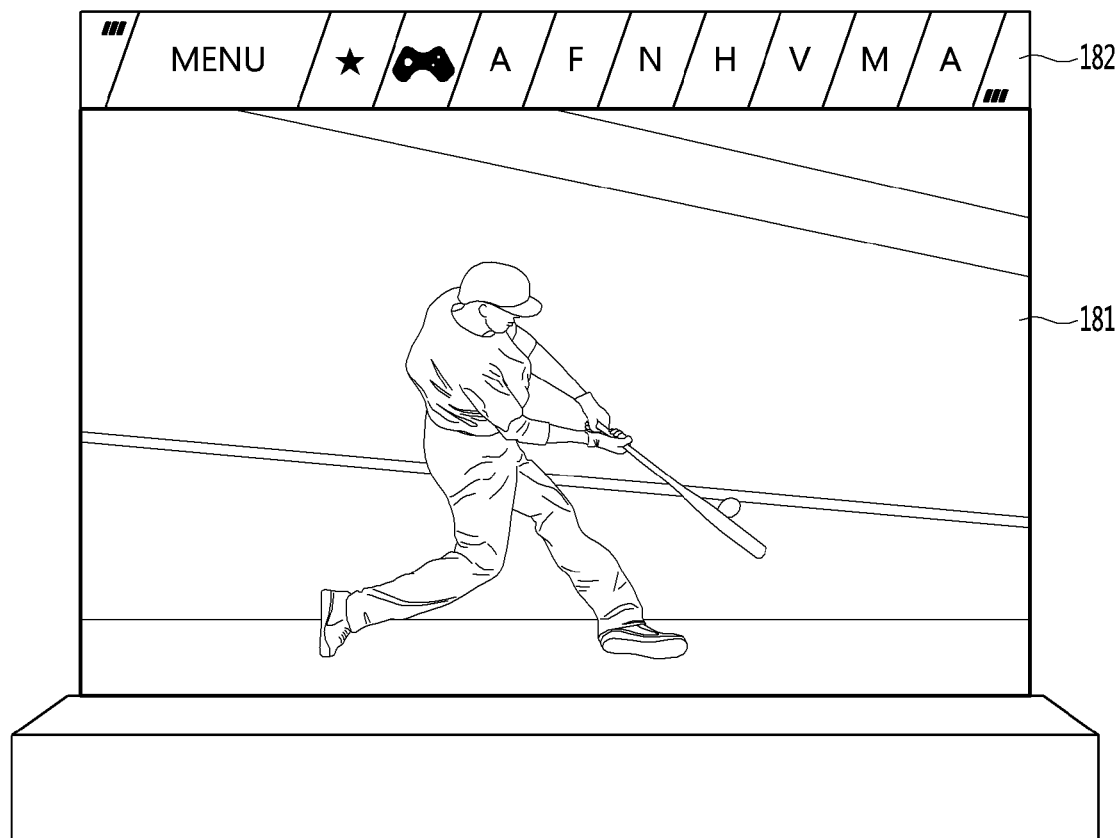

Meanwhile, when the display-unit insertion command is received, the controller 170 can insert the display unit to remove the second region 182 in order shown in FIGS. 31a to 31c, regardless of whether the content may be downsized. Therefore, the display device 100 can downsize and remove an unnecessary content display region step by step.

FIG. 6B will be described again. When the display-unit insertion command is not received, the controller 170 can sense whether a viewing-mode entrance command is received (S71). Here, the viewing-mode entrance command refers to a command for intensively displaying the content displayed in the first region 181, and content displayed in the region other than the first region 181 may be minimized.

According to one embodiment, the controller 170 can receive a viewing-mode entrance command through the button displayed in the remote control device 200 or the menu. According to another embodiment, the controller 170 can receive the viewing-mode entrance command upon sensing that an input signal is not received for a predetermined time.

When the viewing-mode entrance command is received, the controller 170 can display predetermined content in the second region 182 (S73). The controller 170 can predetermine content to be displayed in the second region 182 as the viewing-mode entrance command is received. According to one embodiment, the controller 170 can set content to be displayed in the second region 182 by default. According to another embodiment, the controller 170 can set the content to be displayed in the second region 182 through a user input command.

Next, a method of displaying content based on a viewing-mode entrance command according to a first embodiment of the present invention will be described with reference to FIGS. 31A to 31C. Referring to FIG. 31A, the display unit 180 can display first content in the first region 181 and display second content in the second region 182.

The controller 170 can receive the viewing-mode entrance command. For example, when the input signal is not received for the predetermined time, the controller 170 can receive the viewing-mode entrance command when the input signal is not received for the predetermined time.

As shown in FIG. 31B, when the input signal is not received for the predetermined time, the controller 170 can display predetermined content in the second region 182. The predetermined content may include one or more of a current time, a current weather, and viewing information of the user.

When a user input signal is sensed in a state of displaying the predetermined content according to the viewing-mode entrance command, the controller 170 can display the second content again in the second region as shown in FIG. 31C. Here, the second content may be content displayed before displaying the predetermined content or content corresponding to the user input signal.

Figure 32A:
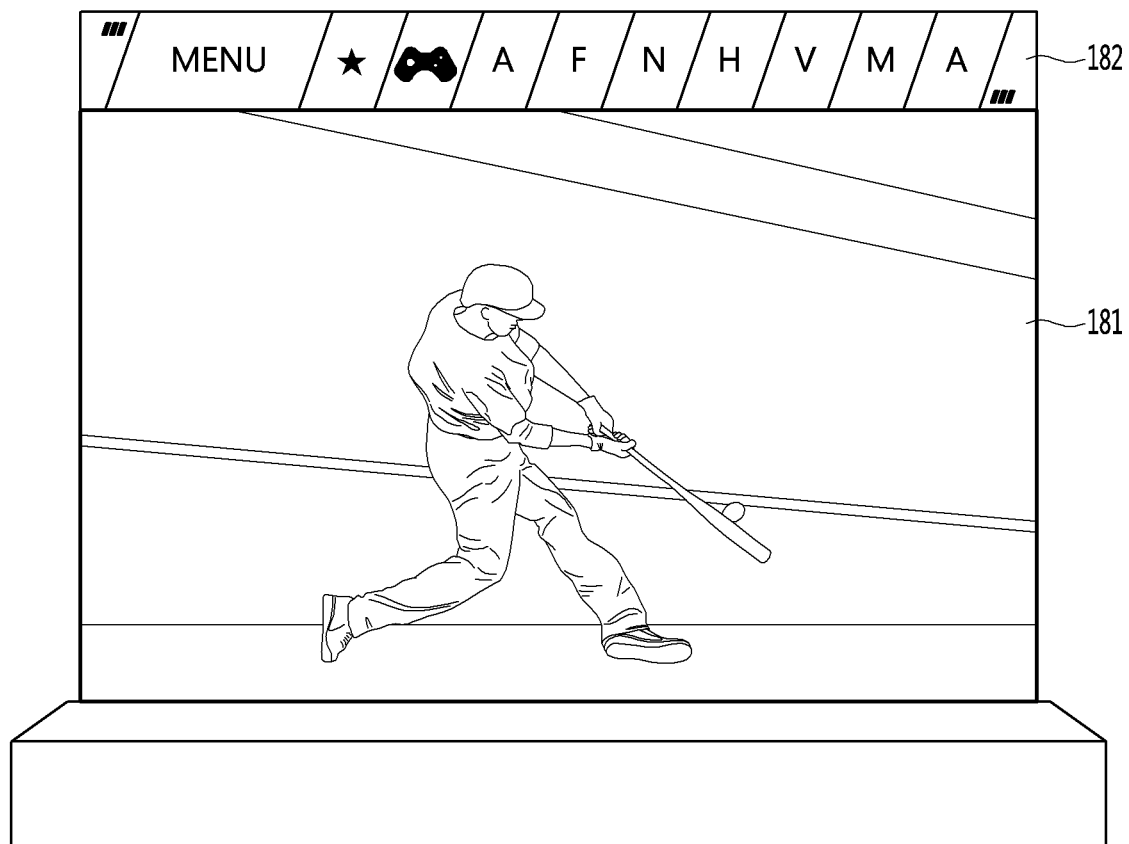
FIGS. 32A to 32C are diagrams illustrating a method of displaying content based on a viewing mode entrance command according to a second embodiment of the present invention.

Next, a method of displaying content based on a viewing-mode entrance command according to a second embodiment of the present invention will be described with reference to FIGS. 32A to 32C. Referring to FIG. 32A, the display unit 180 can display first content in the first region 181 and display second content in the second region 182. The controller 170 can receive the viewing-mode entrance command. For example, when an input signal is not received for a predetermined time, the controller 170 can receive the viewing-mode entrance command.

Figure 32B:
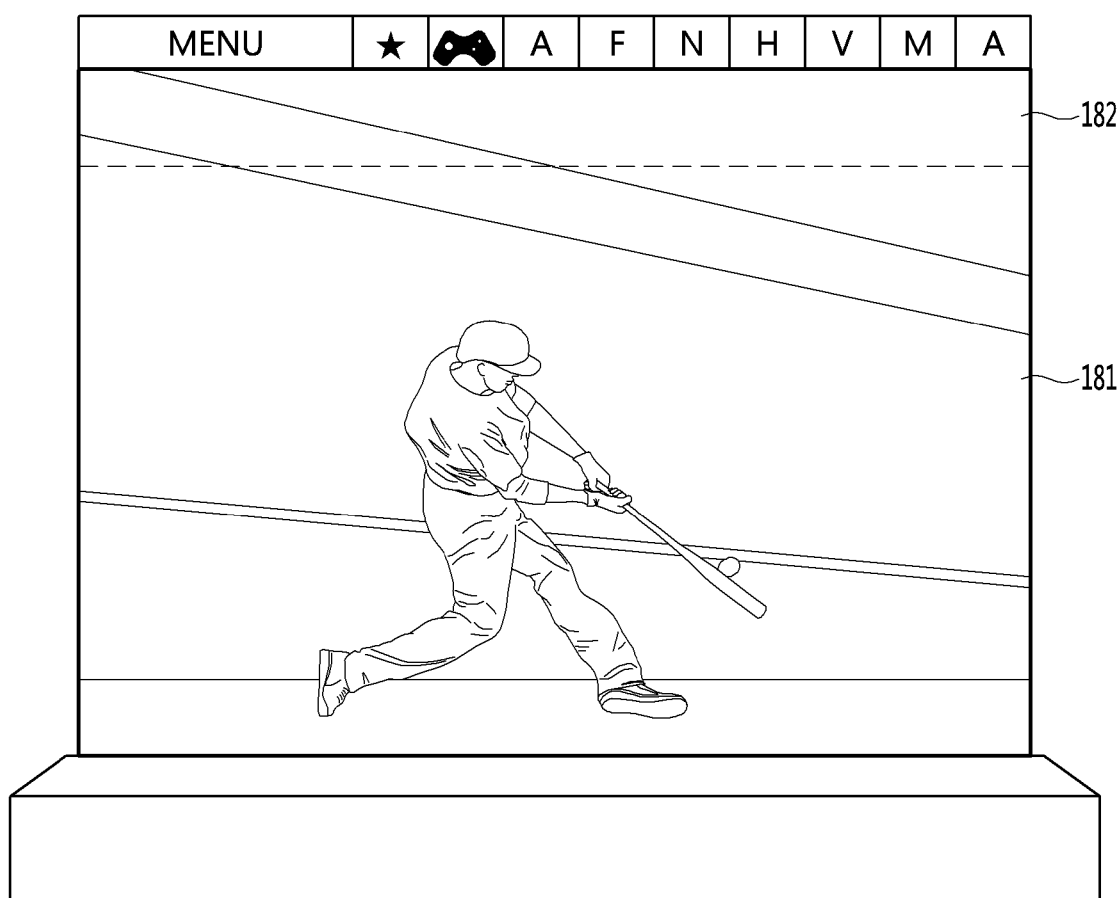
Figure 32C:
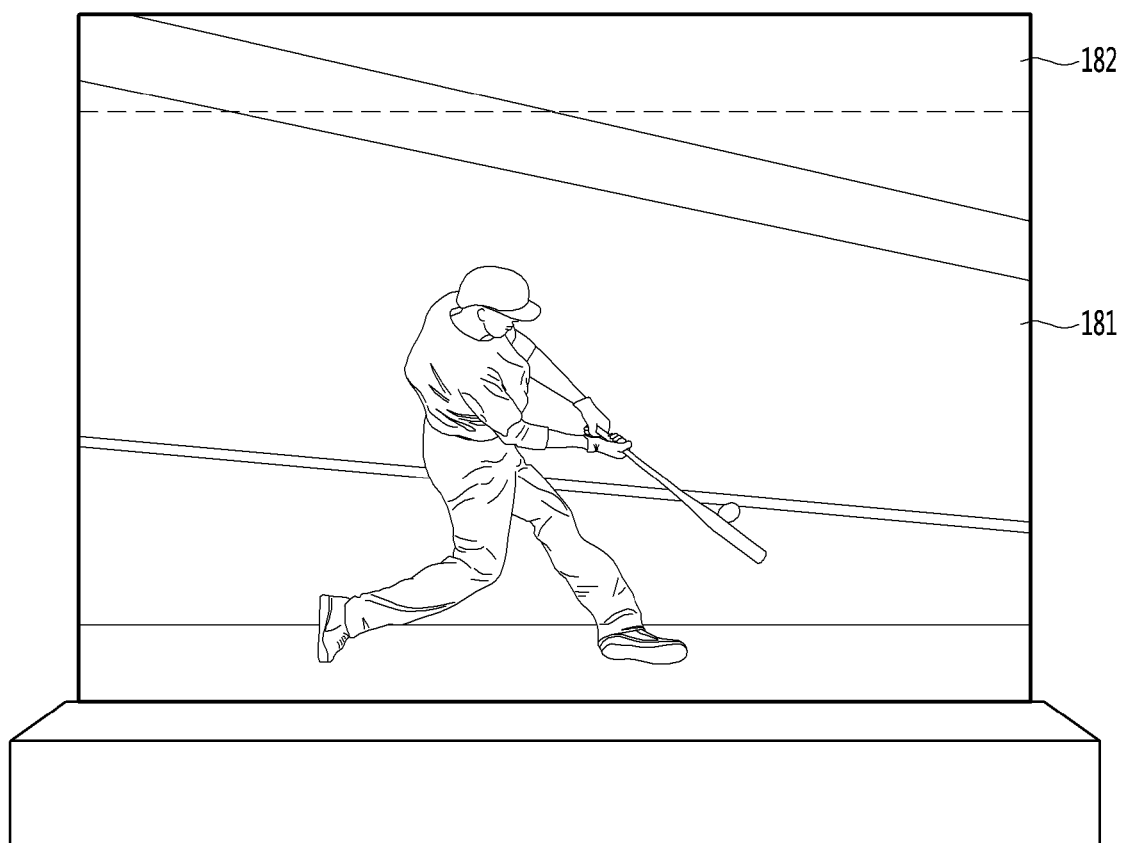

As shown in FIG. 32B, when the input signal is not received for the predetermined time, the controller 170 can downsize and display the second content displayed in the second region 182. The controller 170 can enlarge and display the first content in the region other than the region in which the downsized second content is displayed.

The controller 170 can further receive the viewing-mode entrance command in a state of downsizing and displaying the second content. In this instance, the controller 170 can remove the second content and enlarge the first content in the first region 181 and the second region 182. According to the above-described embodiment, the display device 100 can reduce power consumed to insert the withdrawn display unit 180 again. In addition, the content is displayed in the withdrawn region of the display unit, without wasting the region of the display unit.

Meanwhile, according to another embodiment, when the viewing-mode entrance mode is received, the controller 170 can insert the display unit 180 to remove the second region 182. In this instance, the second region 182 may be removed without user manipulation and thus the user can concentrate on the first content.

FIG. 6B will be described again. The controller 170 can sense whether a power off command is received (S75). When the power off command is received or when the content displayed in the second region cannot be downsized upon receiving the display-unit insertion command, the controller 170 can entirely insert the display unit corresponding to the second region 182 (S77). Therefore, the display device 100 can remove the unnecessary second region 182. The user can withdraw or insert the display unit 180 as necessary.

According to an embodiment, the above-described method can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As can be seen from the foregoing, the video display device in accordance with the embodiments are not limited to the configuration and method of the embodiments described above, but all or some components of the embodiments may be configured to be selectively combined such that various modifications of the embodiments can be implemented.

What is claimed is:

1. A display device comprising:
a housing;
a display unit accommodated in the housing; and
a control unit configured to:
cause the display unit to operate in a speaker mode to play a song while the display unit is fully inserted in the housing,
receive an image display command,
according to the image display command, withdraw the display unit from the fully inserted position in the housing and display a first content corresponding to the image display command in a first region of the display unit, and
display a second content of an audio controller for controlling the speaker mode in a second region of the display unit.

2. The display device according to claim 1, wherein the control unit is further configured to:
in response to a command for displaying a third content, withdraw the display unit to add a third region, and
display the third content in the third region.

3. The display device according to claim 2, wherein the command for displaying the third content includes at least one of a menu display command, a screen setting menu display command, a channel information display command, a time shift execution command, an IOT state display command, a subtitle display command, a user setting information display command and an information related content display command.

4. The display device according to claim 1, wherein the control unit is further configured to:
receive an image switching command for displaying a third content instead of the first content, and
insert or withdraw the display unit based on an aspect ratio of the third content in response to an aspect ratio of the first content being different from an aspect ratio of the third content.

5. The display device according to claim 1, wherein the control unit is further configured to receive a display-unit withdrawal command for setting at least one of a withdrawal direction and a withdrawal length, and
wherein the display unit is withdrawn based on the set withdrawal direction or withdrawal length.

6. The display device according to claim 1, wherein, in response to a command for displaying the first content as a voice command signal being sensed, the control unit is further configured to search for information corresponding to the voice command signal and determine the size of the second region based on an amount of information corresponding to the voice command signal.

7. The display device according to claim 1, wherein when the song is output in the speaker mode, the audio controller displays a name of the song being played in the speaker mode.

8. The display device according to claim 7, wherein the audio controller displays controls to rewind, fast forward and pause the song being output in the speaker mode.

9. The display device according to claim 7, wherein the audio controller displays a total time and a current time of the song being output in the speaker mode.

10. The display device according to claim 7, wherein the audio controller displays a bar graph depicting the total time and the current time of the song being output in the speaker mode.

11. The display device according to claim 1, wherein the audio controller is displayed across an entire width of the display unit and above the first content.

* * * * *